US012651285B2

(12) United States Patent
Mjelde et al.

(10) Patent No.: US 12,651,285 B2
(45) Date of Patent: Jun. 9, 2026

(54) SYSTEM FOR AUTOMATED COLOR CUSTOMIZATION OF BEVERAGES

(71) Applicant: Starbucks Corporation, Seattle, WA (US)

(72) Inventors: Jennica Mjelde, Maple Valley, WA (US); Natarajan Venkatakrishnan, Bellevue, WA (US)

(73) Assignee: Starbucks Corporation, Seattle, WA (US)

( * ) Notice: Subject to any disclaimer, the term of this patent is extended or adjusted under 35 U.S.C. 154(b) by 881 days.

(21) Appl. No.: 17/813,554

(22) Filed: Jul. 19, 2022

(65) Prior Publication Data

US 2023/0038010 A1     Feb. 9, 2023

Related U.S. Application Data

(60) Provisional application No. 63/224,331, filed on Jul. 21, 2021.

(51) Int. Cl.
*G09G 5/02*          (2006.01)
*A47J 31/00*        (2006.01)
(Continued)

(52) U.S. Cl.
CPC ........ *G06Q 30/0621* (2013.01); *A47J 31/007* (2013.01); *A47J 31/41* (2013.01); *G06T 7/90* (2017.01)

(58) Field of Classification Search
CPC ..... G06Q 30/0621; A47J 31/007; A47J 31/41; G06T 7/90; G06F 3/14; G09G 5/02;
(Continued)

(56) References Cited

U.S. PATENT DOCUMENTS 5,062,066 A * 10/1991 Scher ........................ F24C 7/08
                                                                    99/325
5,907,495 A      5/1999 Snyder et al.
        (Continued)

FOREIGN PATENT DOCUMENTS

WO      WO 2009032686 A1      3/2009
WO      WO 2009120527 A2    10/2009
WO      WO 2023/003864 A1      1/2023

OTHER PUBLICATIONS

International Search Report & Written Opinion in International Application No. PCT/US2022/037570 dated Oct. 17, 2022 in 22 pages.

*Primary Examiner* — Tiffany T Tran
(74) *Attorney, Agent, or Firm* — Knobbe, Martens, Olson & Bear, LLP

(57)          ABSTRACT

The disclosure generally relates to a system for creating color-customizable customized beverages (e.g., adding various color ingredients to a beverage to customize the color of the beverage). The system may obtain color mappings (e.g., manual color mappings) that map particular color ingredients to particular colors. The system can generate a three-dimensional color map based on the color mappings to identify additional color mappings. The system can receive a request for a particular beverage with a particular color, and based on the three-dimensional color map, the system can identify a color mapping for the particular color. The system can output an instruction set for the color mapping and/or can cause an automated dispensing platform to dispense one or more particular color ingredients for the beverage based on the color mapping.

41 Claims, 39 Drawing Sheets

(51) Int. Cl.
*A47J 31/41* (2006.01)
*G06Q 30/0601* (2023.01)
*G06T 7/90* (2017.01)

(58) Field of Classification Search
CPC ............. G09G 2354/00; B01F 33/8442; G07F
13/025; G07F 13/065
See application file for complete search history.

(56) References Cited

U.S. PATENT DOCUMENTS

| | | | | |
|---|---|---|---|---|
| 6,081,253 A | * | 6/2000 | Luke ........................ | G09G 5/06 |
| | | | | 345/604 |
| 2005/0199646 A1 | | 9/2005 | Moy | |
| 2006/0081653 A1 | * | 4/2006 | Boland ................. | G16H 20/60 |
| | | | | 222/243 |
| 2008/0062192 A1 | | 3/2008 | Voliter et al. | |
| 2009/0069932 A1 | * | 3/2009 | Rudick ................ | B67D 1/0888 |
| | | | | 700/239 |
| 2015/0305551 A1 | * | 10/2015 | Rosati ..................... | A47J 31/56 |
| | | | | 99/280 |
| 2016/0107133 A1 | * | 4/2016 | Sugino ................... | G01N 21/25 |
| | | | | 366/142 |
| 2017/0280022 A1 | * | 9/2017 | Kuroiwa ............ | H04N 1/00068 |
| 2018/0207595 A1 | | 7/2018 | Bacallao et al. | |
| 2018/0357695 A1 | | 12/2018 | Wolff et al. | |
| 2021/0213153 A1 | | 7/2021 | Kwok | |
| 2022/0346402 A1 | * | 11/2022 | Mora ........................ | A23F 5/32 |

* cited by examiner

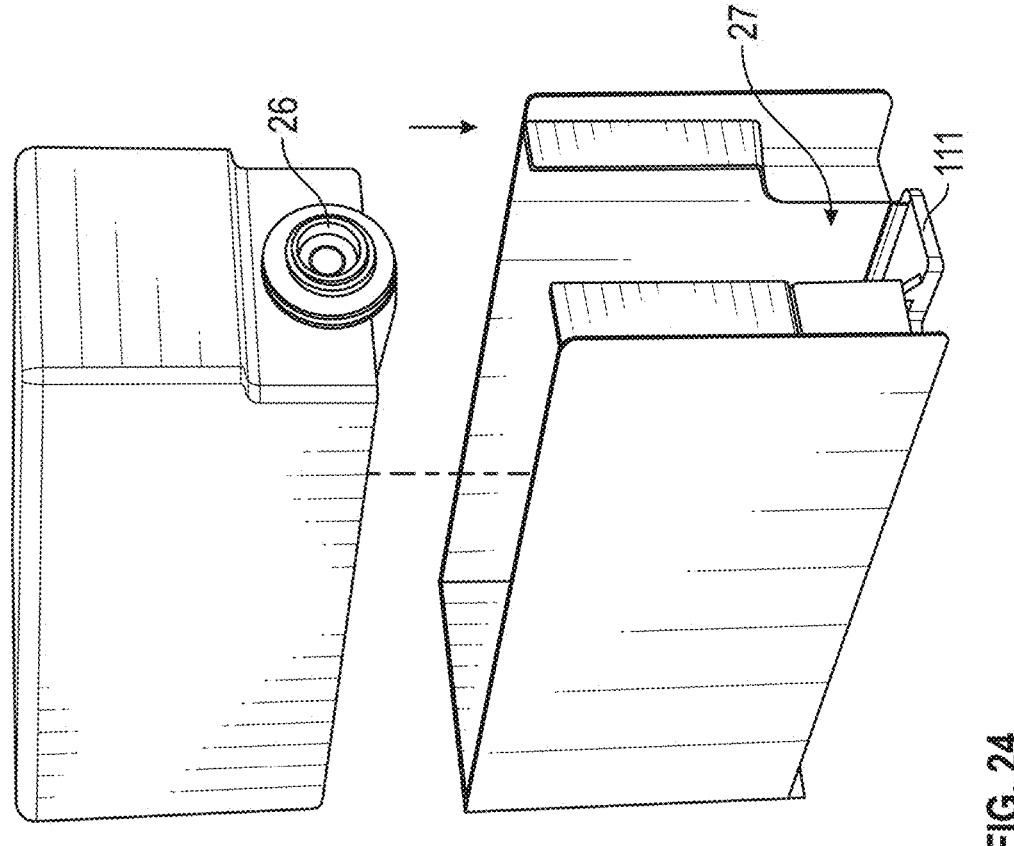
FIG. 24
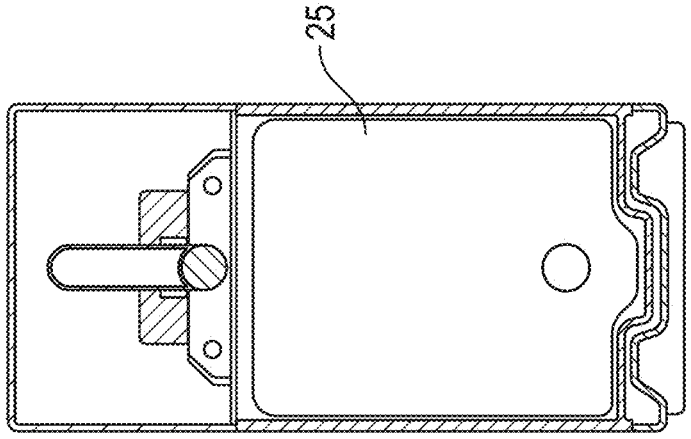

Barista Selecting
Beverage to Dispense

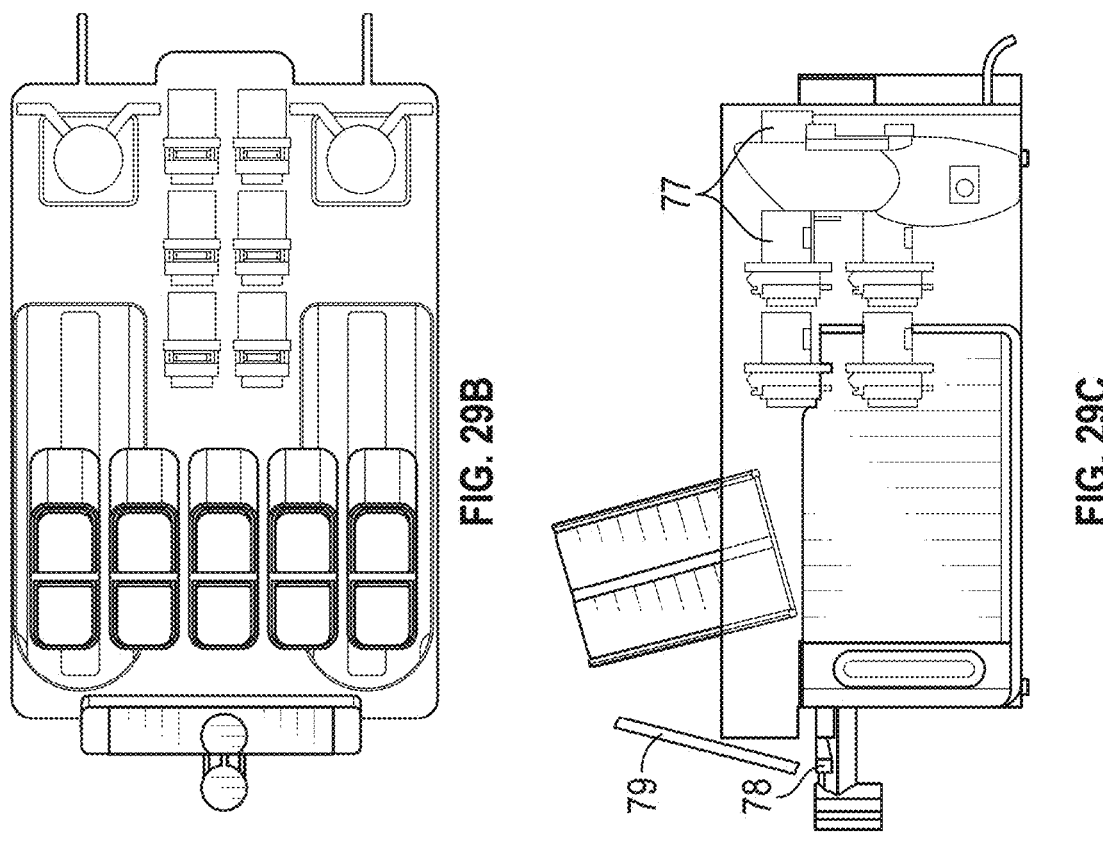
FIG. 29B
FIG. 29C
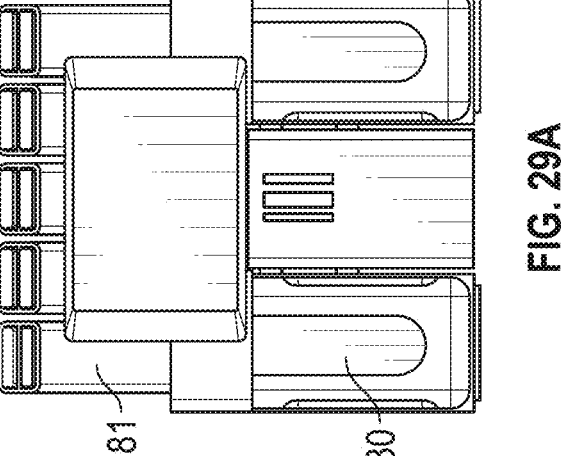
FIG. 29A

86

Cleaning

Fluid Path

21

Fresh 100%

Waste 0%

84

87

Start
Clean

Rinsing

Fluid Path

Fresh 50%

Waste 50%

Drying

Fluid Path

Fresh 0%

Waste 100%

End

202

204

206

200

236

Iced Black Tea Lemonade: 30 colors

238

NONFAT COLD FOAM:
52 colors

250

251  CUSTOMIZATION OF BEVERAGE COLOR

252  OBTAIN ONE OR MORE FIRST COLOR MAPPINGS FOR A BEVERAGE

254  GENERATE A THREE-DIMENSIONAL COLOR MAP FOR THE BEVERAGE

256  IDENTIFY A DESIRED BEVERAGE COLOR

258  OBTAIN A PARTICULAR COLOR MAPPING FROM THE THREE-DIMENSIONAL COLOR MAP BASED ON THE DESIRED BEVERAGE COLOR

260  OUTPUT INSTRUCTIONS FOR CREATING THE DESIRED BEVERAGE COLOR

SYSTEM FOR AUTOMATED COLOR CUSTOMIZATION OF BEVERAGES

FIELD

The present disclosure generally relates to a system for creating color-customizable customized beverages (e.g., adding various color ingredients to a beverage to customize the color of the beverage).

BACKGROUND

Customized beverages can be created by adding different quantities of sauces, syrups, and flavors (each with different colors) to a base beverage, such as coffee or tea. The color of the beverage may be based on the ingredients used and the color of the beverage may not be customizable at the point of sale.

Sauces, syrups, and flavors are currently dispensed using disposable mechanical pumps as shown in FIG. 1 or reusable mechanical pumps as shown in FIG. 2. The sauce, syrup, or flavor is filled in the pump containers 2 and 4. A barista pumps the sauce, syrup, or flavor by manually pushing down on the pump levers 1 and 3 to dispense fixed volumes of sauces, syrups, and flavors thru the pump nozzles 5 and 6.

BRIEF DESCRIPTION OF THE DRAWINGS

FIGS. 22-27 illustrate partial exploded views of the modular dispenser shown in FIG. 21.

FIGS. 29A-29C illustrate a front view, top view, and side view of an automated dispensing system that may be used in connection with an aggregator.

Various embodiments are depicted in the accompanying drawings for illustrative purposes and should in no way be interpreted as limiting the scope of the embodiments. Furthermore, various features of different disclosed embodiments can be combined to form additional embodiments, which are part of this disclosure.

DETAILED DESCRIPTION

Coffee or tea beverages usually have a base of coffee or tea extracts mixed with dairy enhanced by a variety of textures, tastes, flavors, colors, and/or aromas. One can create different textures, tastes, flavors, colors, and aromas by adding different quantities of ingredients or modifiers (e.g., sauces, syrups and flavors) or adding the same ingredients or modifiers in different sequences. For example, to create a menu offering of 70 handcrafted coffee beverages, there may be 10 flavors, 2 syrups, and 7 sauces. Flavors are usually alcohol based. Examples of some flavors are vanilla, toffee nut, and hazelnut. Sauces are usually multiple ingredients blended together in a water solution. Examples of some sauces are white chocolate mocha, chai, and mocha. Syrups are usually liquid forms of sugar or sugar-free substitutes.

Figure 2:
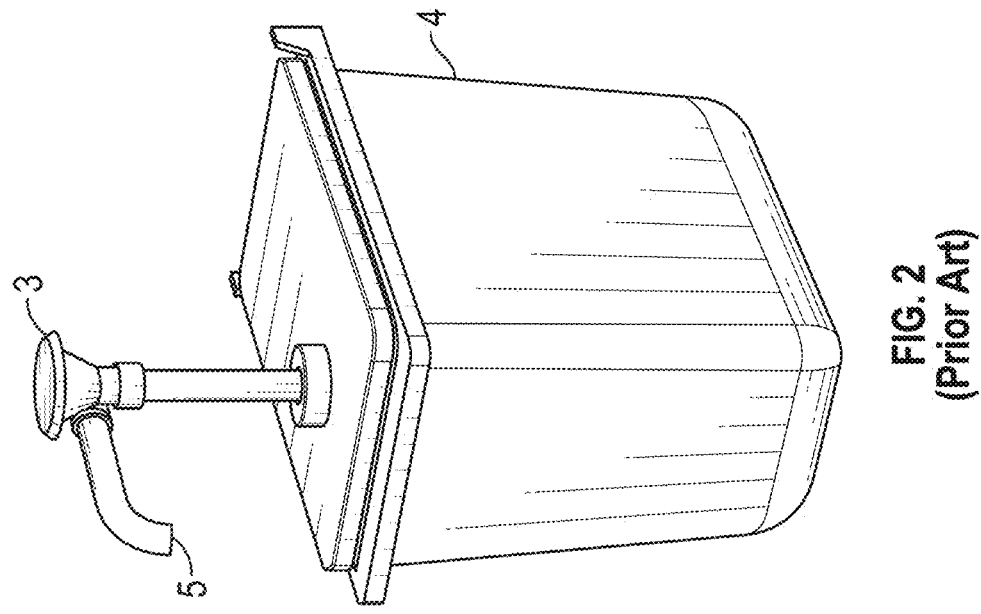
FIGS. 1 and 2 illustrate prior art pump containers.
Figure 1:
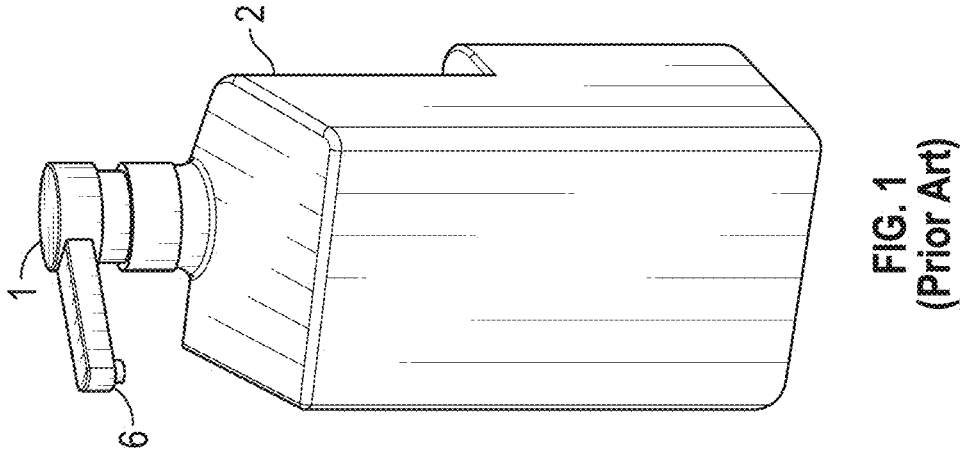

Currently, flavors, sauces, and syrups are dispensed using disposable mechanical pumps as shown in FIG. 1 or reusable mechanical pumps as shown in FIG. 2. The syrup, sauce, or flavor is filled in the pump containers 2 and 4. The barista pumps the flavor, sauce, or syrup by manually pushing down on the pump levers 1 and 2 to dispense fixed volumes of flavors, sauces, and syrups thru the pump nozzles 5 and 6.

Sauces are inherently dense and viscous. Hence, it requires a lot of effort to manually push down on the pump lever. For very viscous sauces, forces in excess of 20 pounds to 30 pounds are required to dispense the sauce from a mechanical pump, such as those illustrated in FIGS. 1 and 2. Each beverage may require multiple pumps for multiple shots or doses. For a barista making hundreds of beverages on a shift, pumping sauces or other ingredients frequently with this high force can lead to arm fatigue and potential injuries.

A recipe for a creamy coffee beverage could be to dispense hot espresso coffee extract into a cup, followed by two pumps of vanilla syrup, followed by a pump of white chocolate mocha sauce, followed by a fixed volume of steamed almond milk, and finished with two pumps of toffee nut flavor. The recipe for a non-creamy beverage could be the same ingredients and quantities but dispensed in a different order (e.g., dispense a pump of white chocolate mocha sauce, followed by two pumps of vanilla syrup, followed by a fixed volume of steamed almond milk, and followed with two pumps of toffee nut flavor, and finished by dispensing a hot espresso coffee extract on top). Different beverages are made not only by varying the type and quantities of ingredients or modifiers (e.g., sauces, syrups, and flavors), but also by changing the order in which they are added to the beverage.

A coffee store may offer a menu with 80-100 hand-crafted beverages. This means that each barista must memorize the recipes for each of the 80-100 beverages, including the ingredients or modifiers (e.g., sauces, syrups, and flavors) in each beverage, the number of pumps, shots, or doses, and the order in which the ingredients or modifiers are added. This creates a lot of complexity and memorization effort, which creates a challenge to expansion of the size and variety of the menu (e.g., variety of beverages).

If the coffee store uses disposable pumps as shown in FIG. 1, it leads to negative environmental impact due to discarding of the plastic containers once they are empty. If the coffee store uses reusable pumps as in FIG. 2, then the pumps must be disassembled and manually cleaned regularly (e.g., every week), which requires a lot of manual effort and additional time expended by employees, thereby increasing labor costs and reducing employee morale. In addition, each mechanical pump unit is customized to the sauce, syrup, or flavor being dispensed because of their unique density and viscosity. Errors (e.g., malfunctions) happen when the sauce, syrup, or flavor is filled in the wrong pump container (e.g., a pump unit designed for a different sauce, syrup or flavor).

When a coffee store introduces a new beverage recipe that uses a new type of sauce, syrup, or flavor, it must procure a new pump unit or system customized to the new ingredient. This is expensive as a new container needs to be manufactured and filled for every new type of ingredient. This leads to lot of complexity in the store as the store must procure, store, and use a variety of pumps for all the different ingredients (e.g., sauces, syrups, and flavors). The baristas must also be retrained on the new recipes.

Customers like to adjust the amount of ingredients, modifiers, or enhancers (e.g., sauce, syrup, and flavor) in their beverages to suit their individual taste and health needs. For example, a customer may want half the sugar and twice the amount of vanilla flavor of the normal recipe for a particular beverage. The current pump systems allow for a reduction in a discrete number of manual pumps, but do not allow for a fraction of a pump of an ingredient (e.g., syrup, sauce, or flavor) to be pumped. This is inherently problematic to the customer experience as customers want more customization with precise control. In addition, baristas may want to simplify the mental and physical efforts required in the beverage preparation process.

In accordance with several embodiments, the systems described herein advantageously automate the dispensing of ingredients, modifiers, or enhancers (e.g., sauces, syrups, flavors, tastes, colors, reductions). The systems include modular dispensers, or dispenser modules, that can dispense any type of ingredient without any force (e.g., any manual pumping force) exerted by the barista. A user interface may guide the barista through the sequence of dispensing (including the recipes for various beverages), thereby avoiding memorization of recipes, while also doing away with the complexity of cleaning (e.g., of manually cleaning multiple reusable pump containers or units on a regular basis).

Figure 3:
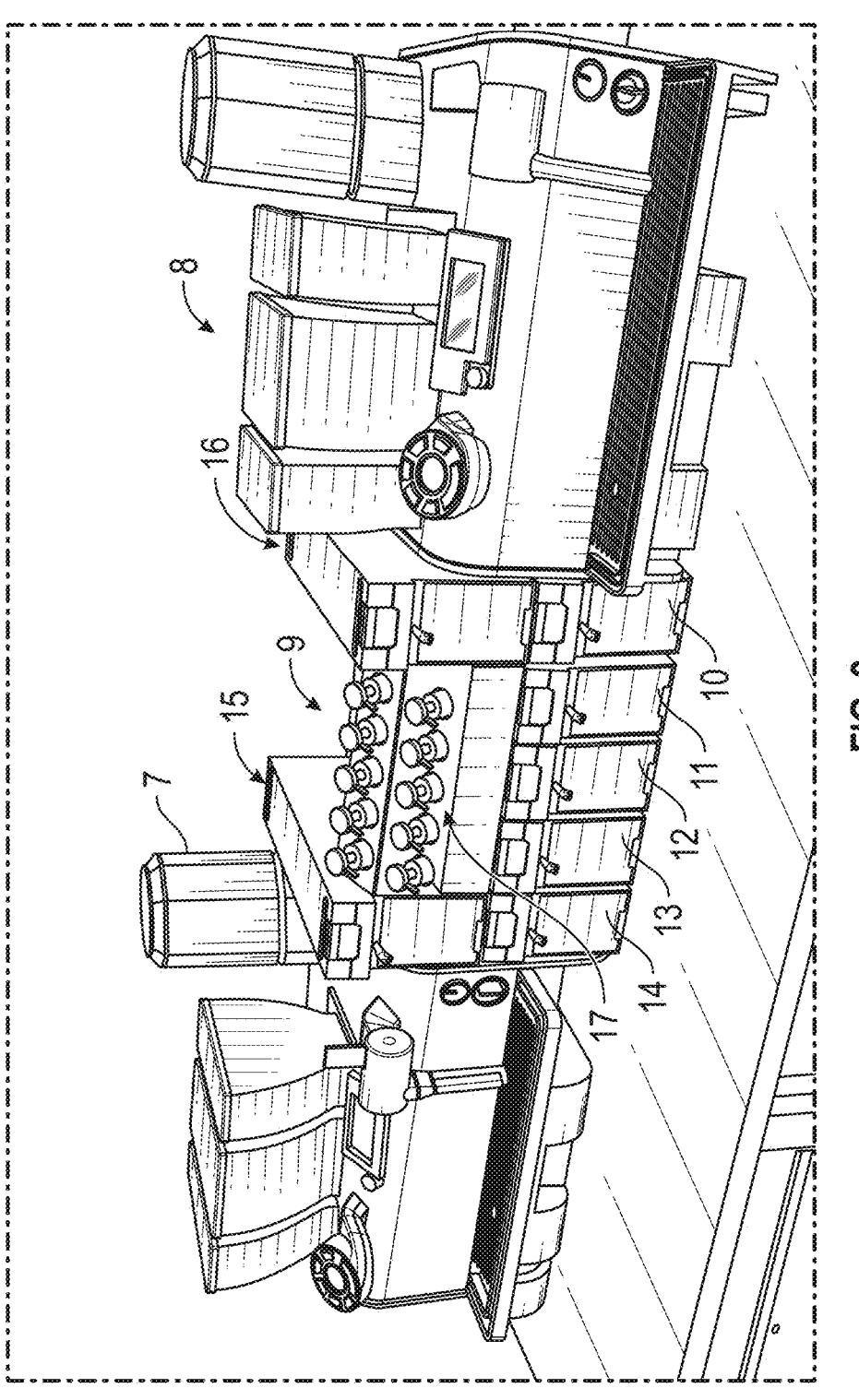
FIGS. 3 and 3A illustrate automated dispensing systems.

FIG. 3 shows an automated dispensing system 9 according to an embodiment of the present disclosure. Coffee espresso machines 7, 8 extract coffee liquor out of coffee beans. The automated dispensing system 9 may be located or positioned to sit between two espresso machines for easy access by two baristas working on each of the coffee espresso machines. The automated dispensing system 9 comprises one or more individual modular dispensers, or dispenser modules 10-16. The automated dispensing system 9 may include a shelf 17, for example between modular dispensers 15, 16 of the dispensing system 9, to store one or more manual pumps for less frequently-used flavors or other ingredients, modifiers, or enhancers. The individual modular dispensers 10-16 are modular (meaning, for example, they can be added to or removed from the system 9 quickly and easily in different configurations without impacting other modular dispensers or operation of the system 9). The individual modular dispensers 10-16 may be controlled from, or by, one or more controllers. For example, the individual modular dispensers 10-16 may be controlled from, or by, a single centralized controller that supplies power and control signals (which may include data or other information, such as recipe information) to each of the modular dispensers 10-16. In other configurations, each modular dispenser may be controlled by its own dedicated local controller or subgroups of modular dispensers may be controlled by a controller.

Figure 3A:
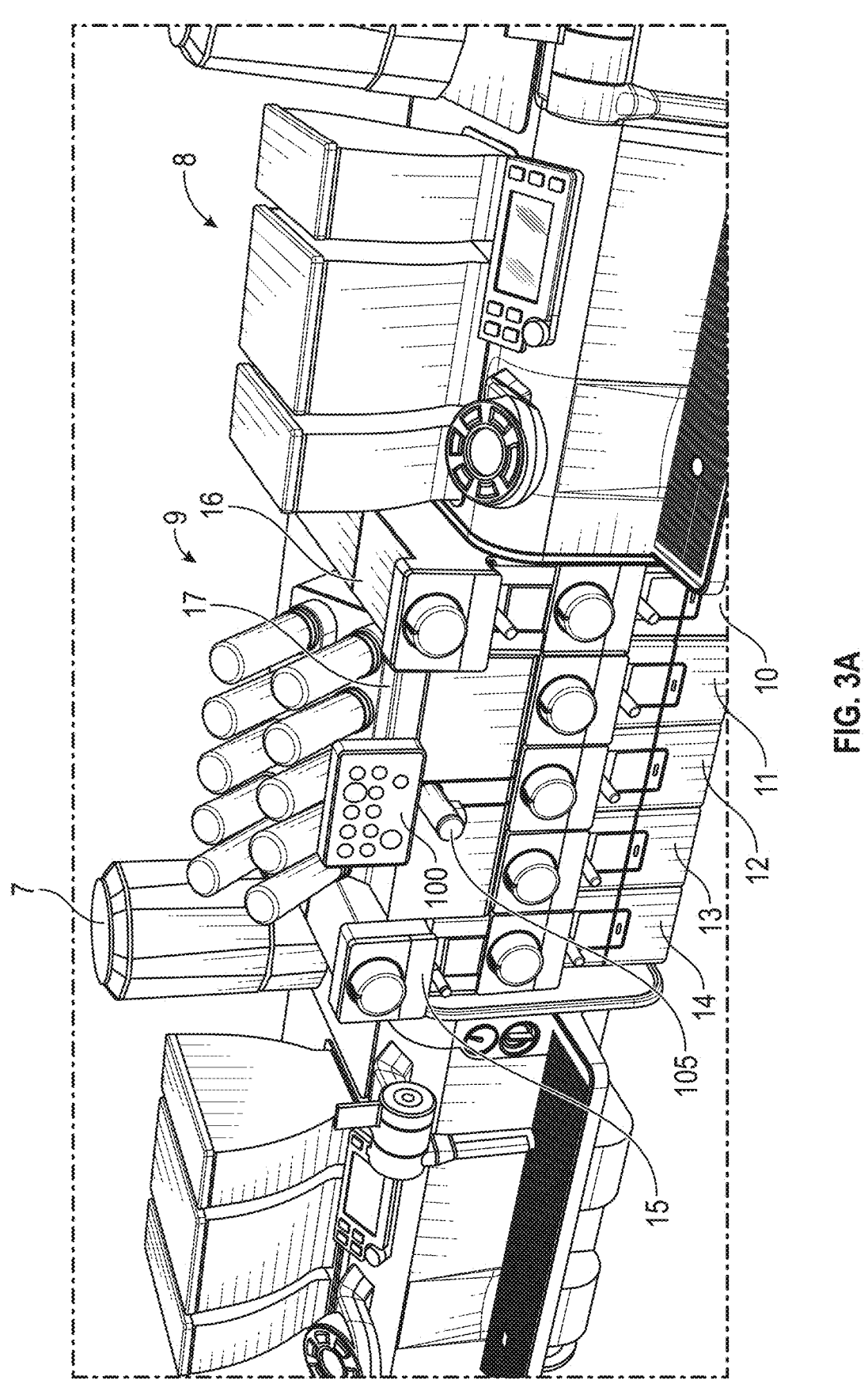

FIG. 3A shows another embodiment of the automated dispensing system 9 with bottles, cartridges, and/or pouches instead of manual pumps as shown in FIG. 3. The automated dispensing system 9 of FIG. 3A may replace a shelf with an integrated flavor holding portion. The system 9 may include a central display screen 100 as an alternative to, or in addition to, individual display screens on the modular dispensers 10-16. The display screen 100 may comprise a touchscreen display configured to receive user input based on pressing of graphical buttons or icons on a graphical user interface of the display screen 100 in addition to displaying graphics, animations, and alphanumeric textual information to the barista. The automated dispensing system 9 may also include a centralized dispenser spout 105. The dispenser spout 105 may dispense water (either hot or cold water) or a prepared beverage. In some implementations, the automated dispensing system includes a centralized water dispensation system to dispense water. The display screen 100 may also display information or instructions to the barista or other user (e.g., to prompt action or to indicate errors, warnings or alerts).

Individual modular dispensers 10-16 may replace conventional manual pump systems with an electrical pump system to alleviate arm fatigue and mind fatigue. The automated dispensing system 9 may also advantageously increase throughput and reduce errors in beverage preparation, thereby enhancing customer satisfaction and experience. As explained further below, the dispense instructions (e.g., number of pumps or shots or doses) may be input by an individual barista through a user input device (e.g., touchscreen display or user interface buttons) on the modular dispenser or remote from the modular dispenser, especially if the dispense instructions deviate from a standard recipe for the beverage. Alternatively, the dispense instructions may be automatically received by the automated dispensing system 9 from a point of sale system or remote server. Even when the dispense instructions are received from a point of sale system or other remote system, the user (e.g., barista) may be able to modify the dispense instructions manually (e.g., if a customer changes their mind after an initial time of sale).

Figure 4:
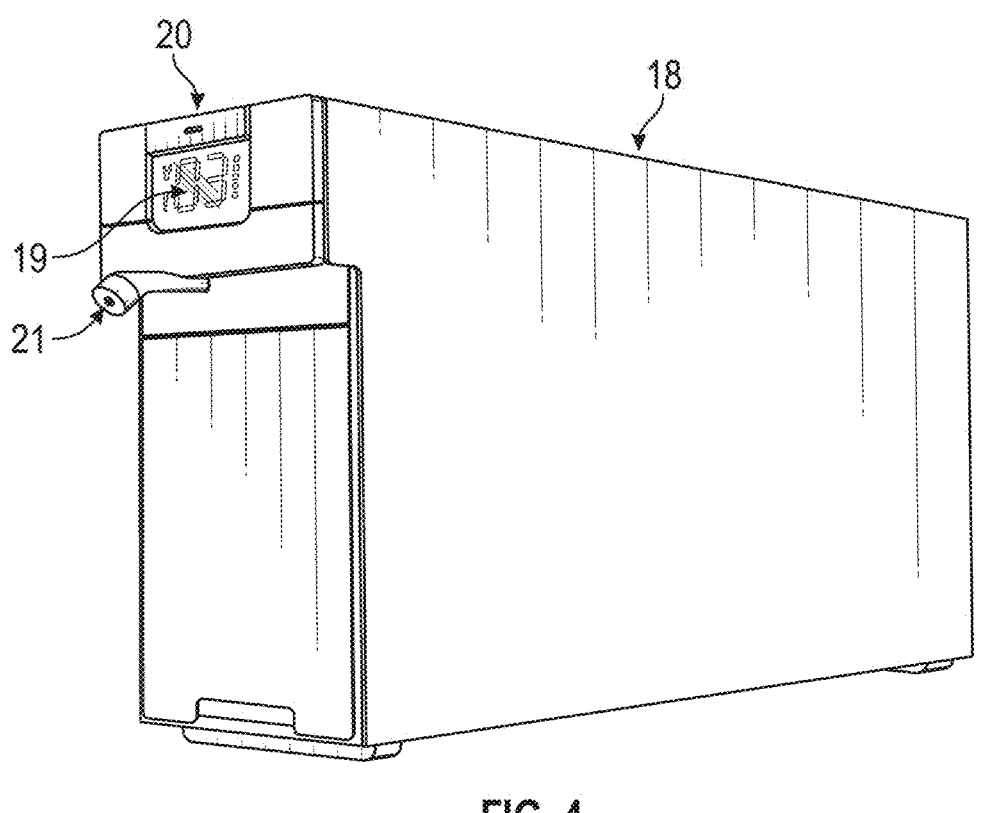
FIG. 4 illustrates a modular dispenser, or dispenser module, that may be used with the automated dispensing systems shown in FIGS. 3 and 3A.

FIG. 4 shows an embodiment of one of the modular dispensers 10-16 having a housing 18 that houses internal components of a respective modular dispenser 10-16. As shown in FIG. 4, each modular dispenser 10-16 may include a display 19 that shows operational dispensing information for that modular dispenser 10-16 to the barista. The information can include number of pumps (e.g., shots or doses) being dispensed, volume being dispensed, amount of sauce or other ingredient left in the modular dispenser, cleaning status, etc. The display 19 showing the operational status of the modular dispenser 10-16 enables the barista to react and change the settings, if required and/or desired. The display 19 can be in the form of light indicators, LEDs, LCD displays, OLED displays or any other form of display. Each modular dispenser 10-16 may include input devices 20, such as a lighted button input device. A barista can click or press the button or other input device to change the status/value on any of the icons on the display 19. This can also be accomplished by making the display 19 a touch screen, so that the barista can directly change values on the display 19 by touching them with his or her finger. The display 19 may have the capability to show multiple languages. The desired language may be selected by the barista or other user. Other types of input devices 20 may include a switch, knob, wheel, slide key, capacitive touch sensor, voice recognition input devices (e.g., a microphone), remote input devices, etc. Each modular dispenser 10-16 also includes a dispensing spout 21 positioned sufficiently high to allow a cup or other vessel to be placed beneath it.

Each modular dispenser 10-16 can be changed or adapted to dispense any ingredient by changing certain pump characteristics or dispensing parameters (e.g., the pump speed, timing, volumetric dispensation, and algorithm of dispensing). This changing or adjustment can be performed remotely in a digital twin or can be performed at the local machine unit. For example, the ingredient in a particular modular dispenser can be identified (or selected) using the user interface (e.g., button 20 and/or display 19) on the particular modular dispenser or the ingredient in the particular modular dispenser can be identified (or selected) in the remote server. Once the appropriate ingredient is selected, the particular modular dispenser may be automatically programmed with the necessary pump characteristics.

The modular dispenser 10-16 can also have a sensing or reading device that can identify the ingredient (e.g., sauce, syrup, or flavor) being loaded into the modular dispenser and automatically program itself to dispense the ingredient (for example, the specific speed or timing needed for optimal dispensation). As one example, the modular dispenser can have a load cell to sense the ingredient based on weight or mass. As another example, the identification of the ingredient can be a barcode, RFID tag, NFC tag, QR code or any other identifiable information on the packaging containing the ingredient.

The modular dispenser 10-16 can be hot swapped with another modular dispenser, for example if a modular dispenser malfunctions, runs out of ingredient, or is in low demand. The new modular dispenser can adopt (e.g., automatically or based on user interaction) the dispensing characteristics of the replaced modular dispenser. The modular dispenser may include the same or different ingredient. The system 9 can recognize the ingredient in the modular dispenser regardless of the location of the modular dispenser within the system 9. Accordingly, the modular dispensers may be positioned in any order or stackable configuration preferred by a store manager or by individual baristas.

Figure 5:
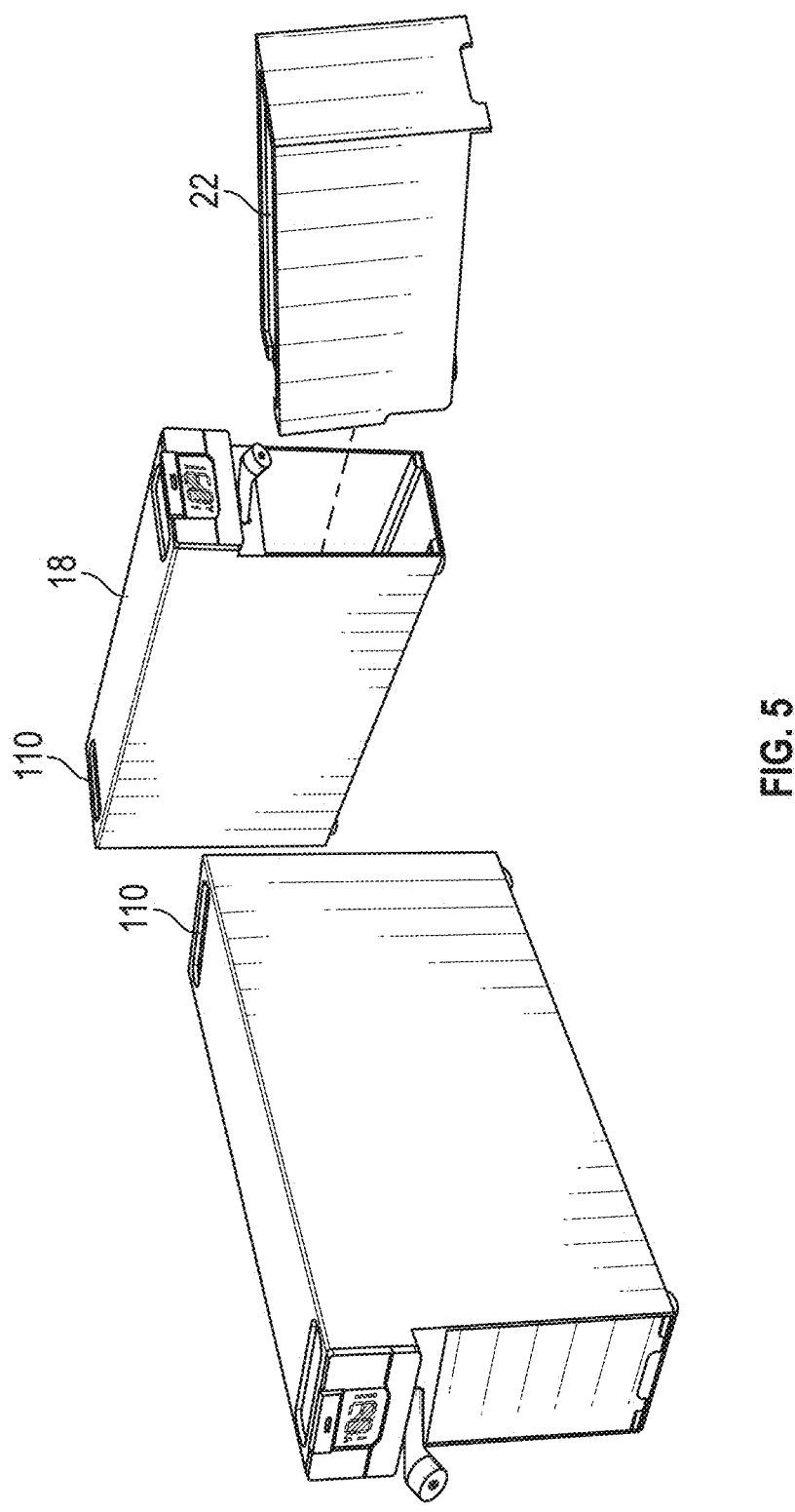
FIGS. 5, 6, 7 and 8 illustrate partial exploded views of the modular dispenser shown in FIG. 4.
Figure 6:
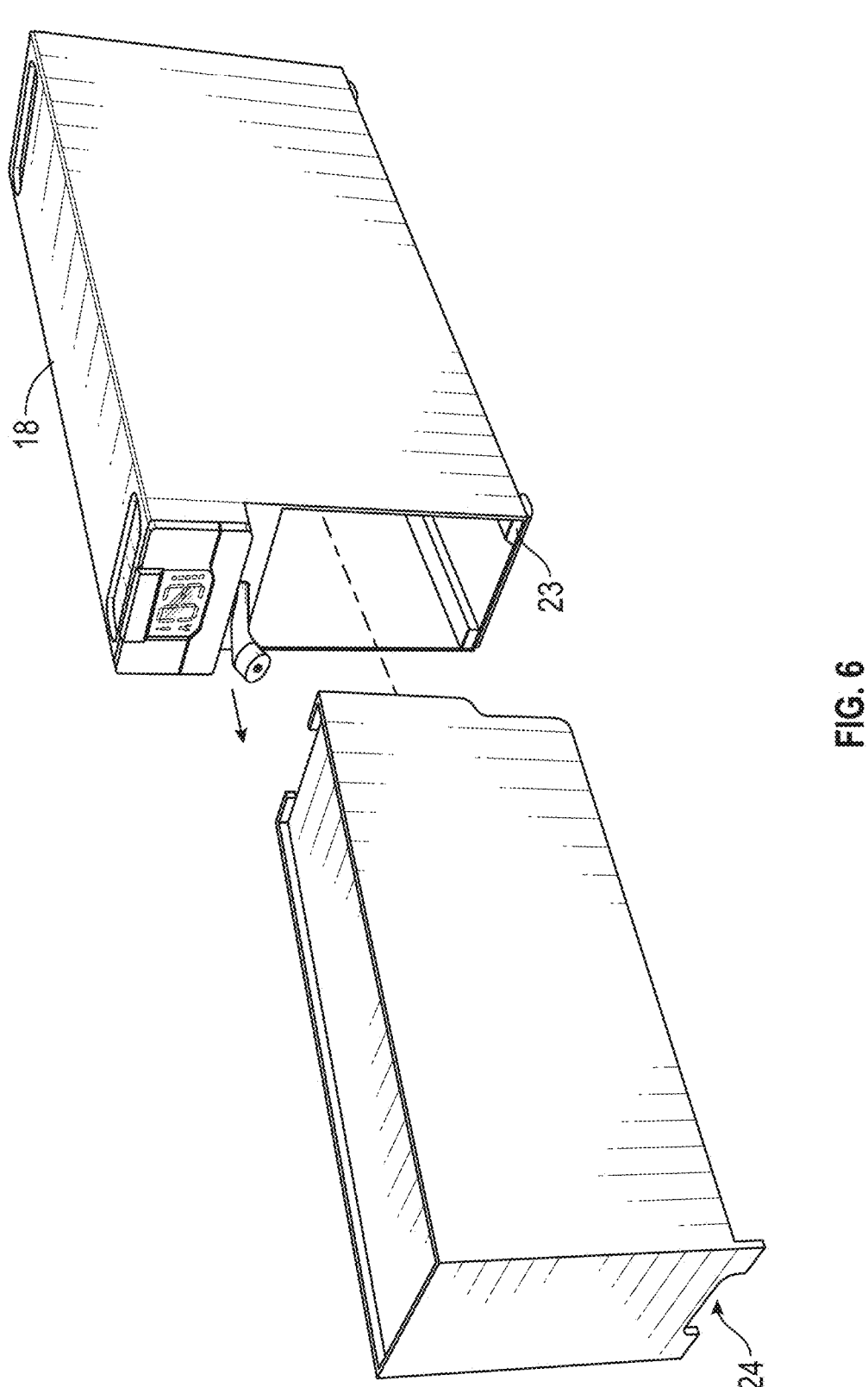

FIGS. 5 and 6 show one possible construction of the modular dispensers 10-16. The modular dispenser 10-16 may include a tray 22 to hold the ingredient, modifier, or enhancer (e.g., sauce, syrup or flavor) to be dispensed. The ingredient can be poured into the tray 22 or can be loaded into the tray 22 in a bag holding the ingredient (e.g., sauce, syrup or flavor). The tray 22 can be made from metal, plastic or a biodegradable material. The tray 22 may include a pull feature 24 to facilitate pulling out of the tray 22 from the housing 18. As shown, the pull feature 24 can include a cutout or notch at the bottom of a front surface of a front panel of the tray 22. The pull feature 24 may alternatively include a knob or other protruding member that can be grabbed and pulled by one or more fingers. The tray 22 may comprise an injection molded enclosure having about a 3 liter capacity. The capacity of the tray 22 may range from 1.5 liters to 5 liters (e.g., 1.5 liters to 4.5 liters, 2 liters to 4 liters, 2.5 liters to 3.5 liters, 3 liters to 5 liters, overlapping ranges thereof, or any value within the recited ranges).

The tray 22 may be removably positioned (e.g., inserted) in a housing 18. The modular dispenser housing 18 may include guiding features 23 incorporated into the housing 18 and/or tray 22 so that the tray 22 can be easily pushed in and pulled out of the housing 18. The guiding features 23 may comprise guide rails stamped into the housing 18 or grooves formed in the housing floor. The housing 18 may comprise a sheet metal enclosure in one configuration. The housing 18 may be formed of a metal, plastic or other polymeric material. The housing 18 may include one or more detents 110 on an upper surface to facilitate stacking of modular dispensers 10-16 on top of each other. The detents 110 may be positioned, sized, and shaped to receive locking features 34 (e.g., feet or pegs) disposed on a bottom surface of another modular dispenser.

Figure 7:
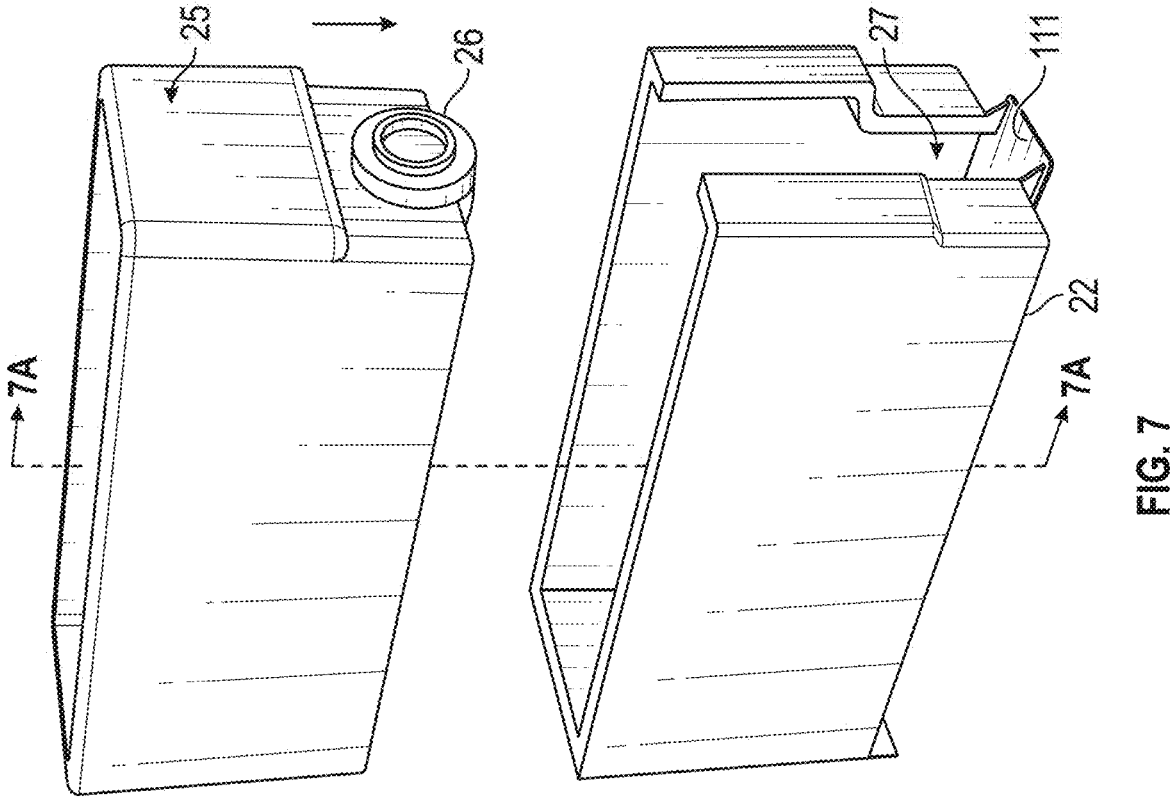
Figure 7A:
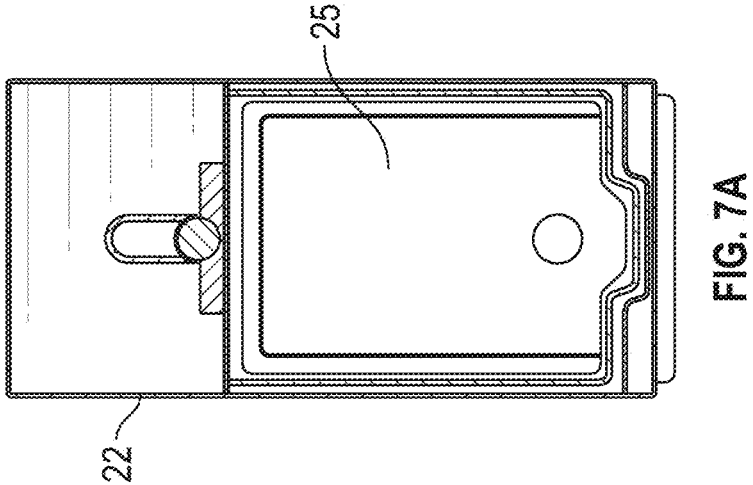
FIG. 7A is a cross-section view of FIG. 7.

In some implementations, the ingredient (e.g., syrup, sauce, or flavor) can be packaged into a bag 25 with a valve 26 that can be easily loaded into (e.g., lowered in a vertical direction into an upper opening of) the dispensing tray 22. FIG. 7 shows an ingredient bag 25 having a valve 26 that slides into a locating feature 27 on a rear surface of the tray 22. The locating feature 27 may include a tray keying slot configured to receive a valve cap of the valve 26. A rear surface of the tray may include a drip catch feature designed to catch any drips from the valve 26. FIG. 7A is a cross-section view showing the bag 25 loaded inside the tray 22. The capacity of the bag 25 may range from 1.5 liters to 5 liters (e.g., 1.5 liters to 4.5 liters, 2 liters to 4 liters, 2.5 liters to 3.5 liters, 3 liters to 5 liters, overlapping ranges thereof, or any value within the recited ranges, such as 3 liters).

Figure 8:
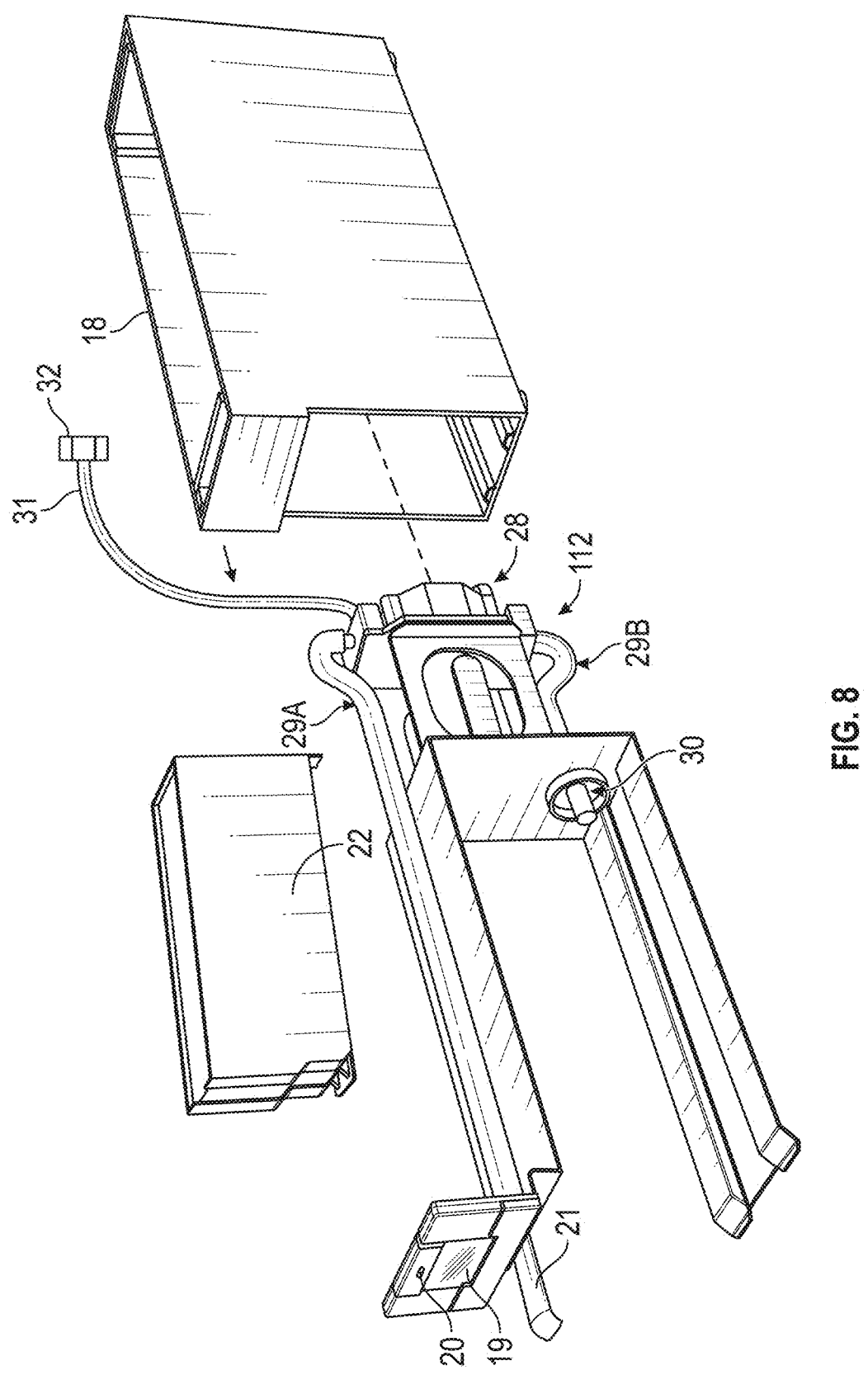

As shown in FIG. 8, each modular dispenser housing 18 may hold a removable pump frame 112 that can slide in and out of the housing 18. The pump frame 112 includes a pump 28, such as a positive displacement pump (including but not limited to a peristaltic pump), attached at the rear of the pump frame 112. Various type of pumps 28 can be used within the dispensing system 9 to pump the ingredients. For example, the dispensing system 9 may include individual modular dispensers 10-16 with two or more different types of pumps. For example, a first set of modular dispensers may include a first type of pump for low viscosity and low density ingredients, and a second set of modular dispensers may include a second type of pump for high viscosity and high density ingredients.

The pump 28 draws in the ingredient (e.g., syrup, sauce, flavor) through an inlet tube 29B and pumps the ingredient out through an outlet tube 29A into a cup or pitcher thru the dispenser spout 21. The outlet tube 29A may include a flow meter to measure a volumetric dispensation of the ingredient. The dispenser spout 21 may have special features to incorporate air or water into the pumped ingredient as the ingredient exits the spout 21 (e.g., to generate froth). The inlet tube 29B terminates in a fluid connector 30.

The fluid connector 30 may be a quick connect fitting or coupling, e.g., the connector 30 should seal to the bag 25 in a leak-proof manner as soon as the bag 25 is attached to the connector 30. The connector 30 may include a self-sealing valve. The connector 30 may alternatively comprise a threaded or flanged connection.

The pump 28, the display 19 and the input device 20 are connected to a main controller 38 through an electrical wire harness 31 that terminates in an electrical connector 32. The harness 31 and connector 32 have the requisite conductors to transmit power and two-way communications (e.g., data) to/from the pump 28, display 19, and input device 20. The pump 28, display 19, and input device 20 may or may not have embedded software to make these devices function. All the functional hardware and software to make these devices function could be built into the main controller in some configurations.

The individual modular dispenser may have a self-priming mechanism that may be actuated by the user interface. Priming may only need to be initiated after a cleaning cycle and upon refilling supply lines. Once the pump has been primed, the ingredients can be changed without losing prime.

The system 9 can pump and dispense enough ingredient to fill all the input and output lines (e.g., outlet tube 29A and inlet tube 29B) for the pump 28 in order to prevent air pockets in the ingredient that could make dispensation inaccurate. When there is air in the outlet tube 29A, it is easier to pump and the motor runs faster. The modular dispenser 10-16 can sense the motor speed to prime the pumping system. If motor speed is high, it means there is air in the pumping system, and the pump 28 keeps pumping until the air pockets are pushed out and the speed of the motor drops to the normal operating limits.

Each modular dispenser can include a load cell at a bottom of the modular dispenser or of the tray 22 so that the modular dispenser can sense a weight or mass of ingredient in the bag 25 or tray 22 and alert a barista to change out the bag 25 when ingredient is low without losing priming.

Figure 9:
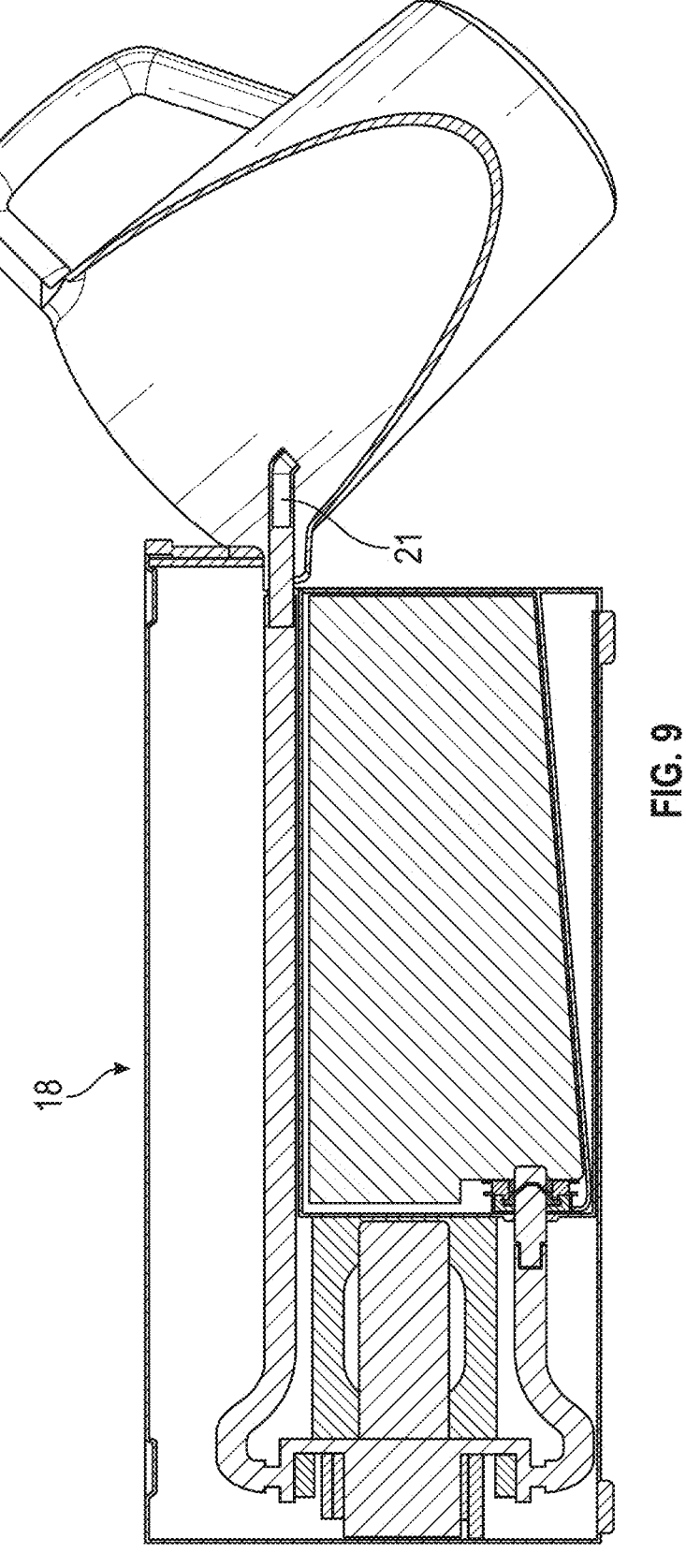
FIG. 9 illustrates a cross-section of a modular dispenser.

The modular dispenser 10-16 may be designed so that the ingredient can be easily dispensed into a pitcher, cups and glasses as shown in FIG. 9. For example, a height and angle of the dispenser spout 21 may be positioned to facilitate dispensation of the ingredient. A length of the housing 18 may range from 350 mm to 600 mm (e.g., between 350 mm and 500 mm, between 400 mm and 500 mm, between 450 mm and 600 mm, overlapping ranges thereof, or any value within the recited ranges). A height of the housing 18 may range from 175 mm to 350 mm (e.g., between 175 mm and 250 mm, between 200 mm and 250 mm, between 250 mm and 350 mm, overlapping ranges thereof, or any value within the recited ranges). A counter height from counter to dispenser spout 21 may range from 125 mm to 200 mm (e.g., from 125 mm to 150 mm, from 140 mm to 160 mm, from 150 mm to 200 mm, overlapping ranges thereof, or any value within the recited ranges, such as about 150 mm).

Figure 10:
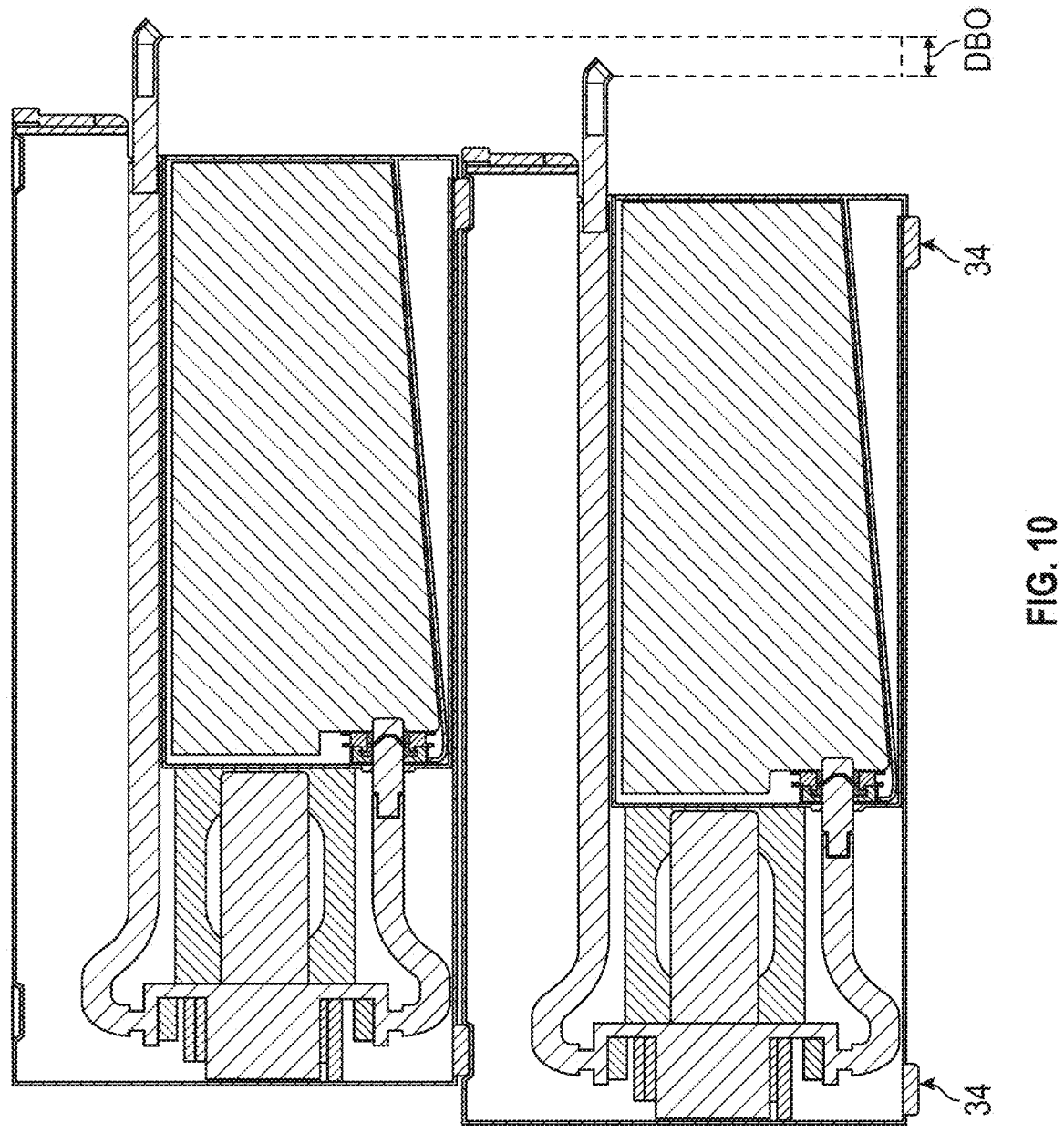
FIG. 10 illustrates an implementation including stacked modular dispensers.

As shown in FIG. 10, the modular dispensers 10-16 may be designed so that two or more modular dispensers 10-16 can be stacked on top of each other using locating and locking features 34. The modular dispensers 10-16 may be stacked such that the dispenser spout 21 of an upper modular dispenser is offset from the dispenser spout 21 of a lower modular dispenser by a drip bypass offset (DBO) distance. For example, the spout 21 of the lower modular dispenser may be rearward of the spout 21 of the upper modular dispenser. This may be accomplished by staggering the position of the upper modular dispenser relative to the lower modular dispenser. The offset (DBO) prevents the spout 21 of the upper modular dispenser from dripping onto the spout 21 of the lower modular dispenser.

Figure 11:
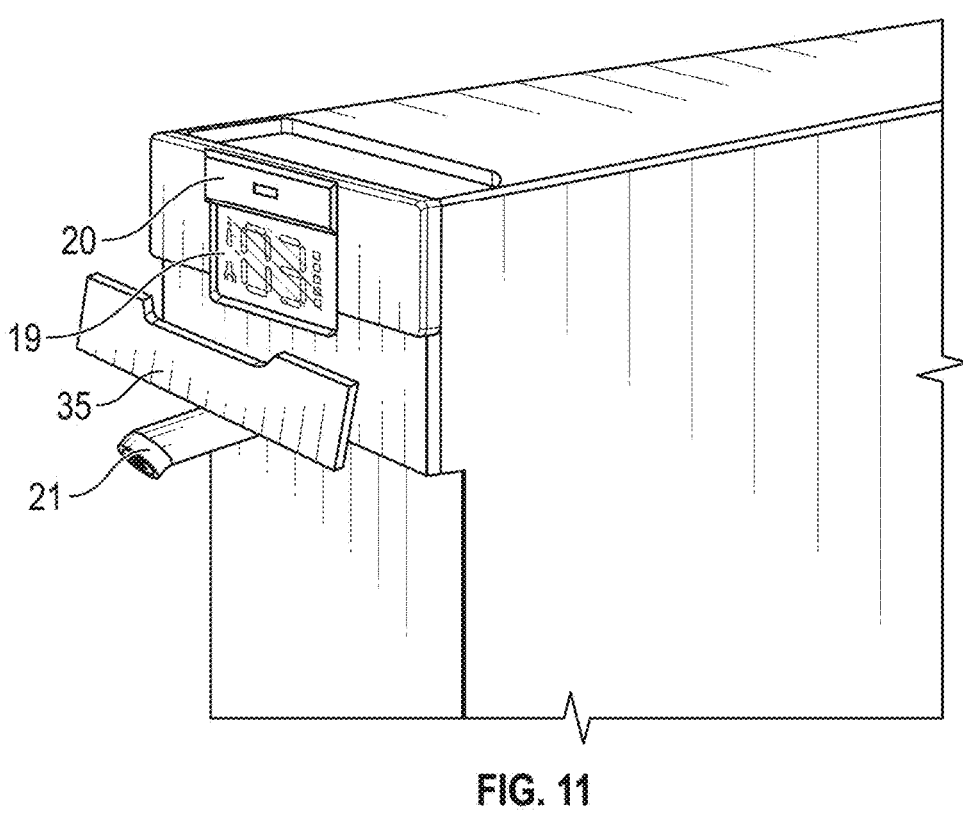
FIG. 11 illustrates a label plate for a modular dispenser.

Each modular dispenser can include a badge 35 to show the ingredient currently stored in that particular modular dispenser, as shown in FIG. 11. The badge 35 can be fastened (e.g., removably fastened) to the modular dispenser using magnets, adhesives or screws. The badge 35 may be positioned above the dispensing spout 21 and below the display 19 (or user input device 20 if there is no display 19). The badge 35 may comprise a label or plate.

Figure 12:
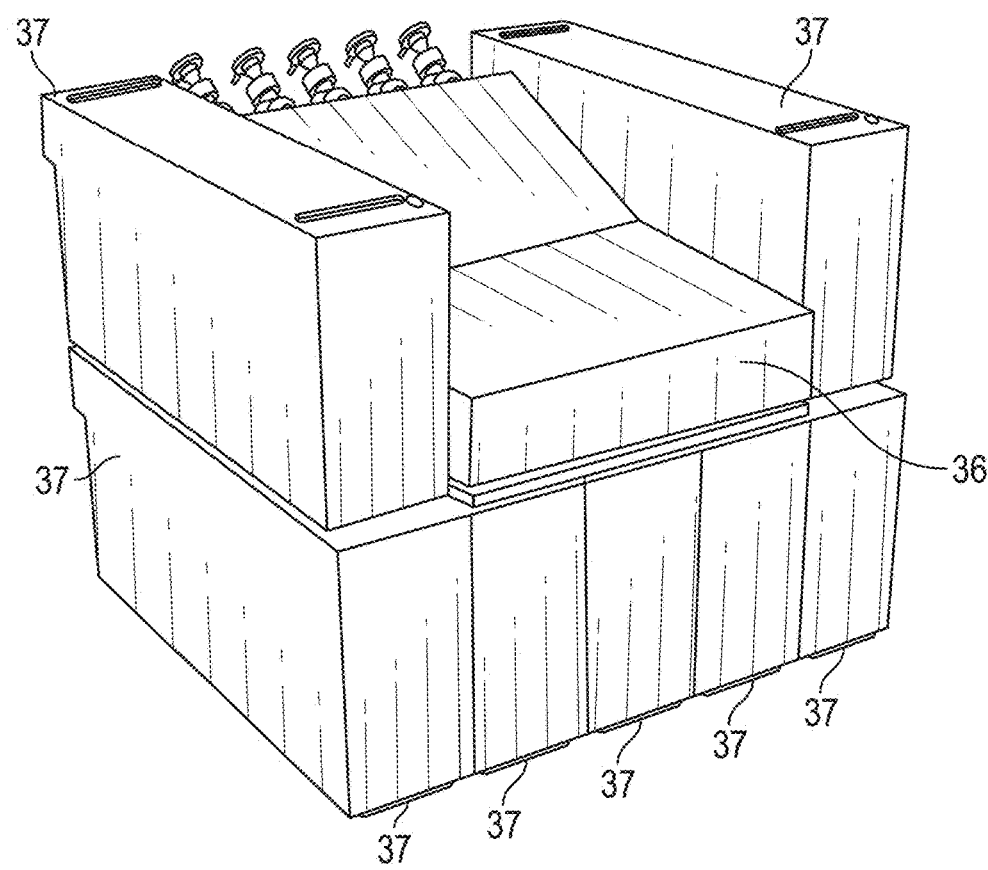
FIG. 12 illustrates a rear view of the dispensing system shown in FIG. 3.

FIG. 12 shows a perspective rear view of the dispensing system 9. In FIG. 12, the individual modular dispensers 37 (e.g., modular dispensers 10-16) are controlled by a main, or central, controller unit 36. The central controller unit 36 has the processing capability and power required to run the individual modular dispensers 37. This centralized control makes the design cost-efficient and easily upgradeable. In this modular design, the controller 36 can be upgraded for features and functionality without upgrading the individual modular dispensers 37.

Figure 13:
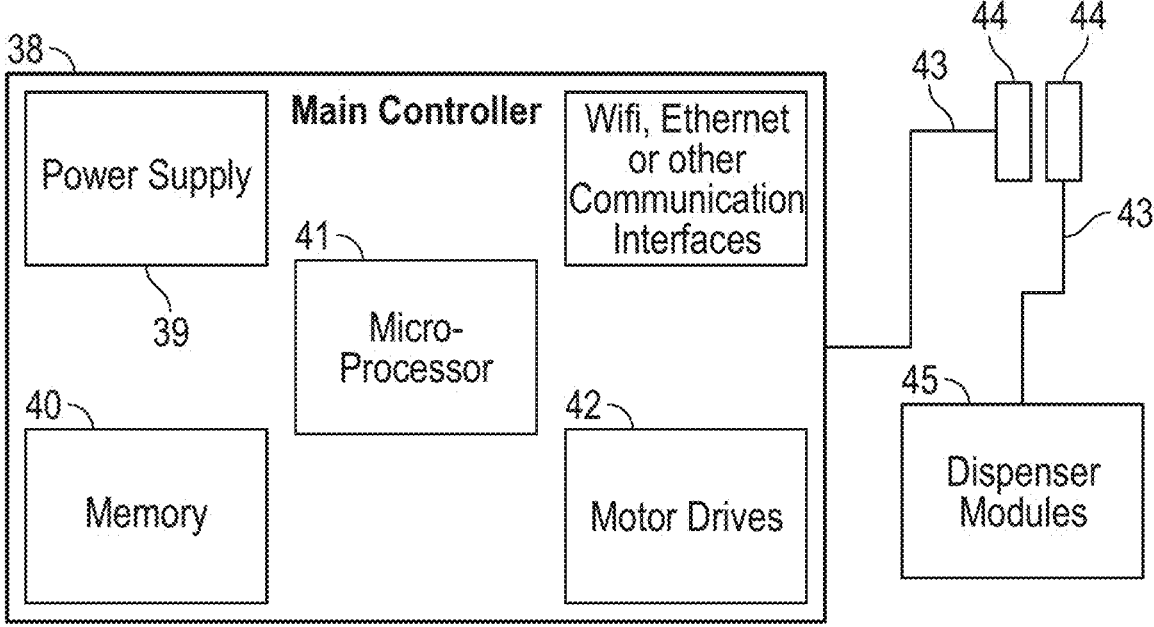
FIG. 13 shows a block diagram of an automated dispensing system.

FIG. 13 shows a schematic block diagram illustrating an example controller architecture that can be used with the dispensing system 9. The main controller 38 (which may include the structural and function features described in connection with controller 36) can house a power supply 39 to power all the modular dispensers, or dispenser modules, described herein (e.g., modular dispensers 10-16, 37, 45), a microprocessor 41 to process all algorithms or execute stored program instructions, memory 40 to store recipes and algorithms (e.g., program instructions, color customization, sequences, cleaning algorithms), and motor driver hardware 42 to control operation of the motor(s) in the modular dispensers 45. The main controller 38 is connected to the individual modular dispensers 45 thru electrical wire harnesses 43 with enough conductors to transmit power and communicate (e.g., two-way communications) with the modular dispensers 45. The harness 43 terminates in a sealed connector 44. The modular dispensers 45 have corresponding harnesses 44 and connectors to interface with the main controller 38. In other implementations, the communicative coupling may occur via wireless connection (e.g., Bluetooth, WiFi, or other wireless communication protocol connections).

The housing 18 may hold a common power supply and logic board separate from the individual modular dispensers 45. Each modular dispenser may simply connect to the common control system through an electrical connector. The modular dispensers 45 may be powered by a household plug in the country of use (e.g., 110 V or 220 V). The main controller 38 for the dispensing system also has a port for battery power, so that the system 9 can be run on battery, when the main power is shut down. Each modular dispenser 45 can be manually operated, for example hand cranked, to dispense ingredient in case of electronic malfunction or power outage (see FIG. 20).

In certain embodiments, the main controller 38 not only makes the individual modular dispensers 45 dispense as per the recipes, but also keeps track of the system 9 health and communicates with a remote server for recipe updates and software upgrades. The main controller 38 can also schedule cleaning of the individual modular dispensers 45 (e.g., based on the ingredient, based on an amount of ingredient dispensed, or based on a regular time schedule). The main controller 38 can be able to decode modular dispensers 45 running simultaneously as well as be able to use a plurality of communication channels to communicate to pump modular dispensers 45.

The main controller (or dispensing equipment controller) 38 of FIG. 13 has a Wi-Fi, Ethernet, and/or other communication interface to communicate with various devices (e.g., a remote server) over the Internet or other communications network to receive information on new recipes and software updates and also to transmit information on consumption of sauces and beverages being made to a remote server.

The main controller 38 can query the Wi-Fi or Ethernet access point in the location to find the store identity or location and store it in memory 40. This way, the main controller 38 can transmit store specific information to a remote server. Recipes, software updates, or other information can also be sent from the remote server to the memory 40 of the main controller 38 of the dispensing system 9.

The dispensing equipment can also maintain a digital version—the digital twin—of its functionality on a remote server. Changes to this digital twin can result in changes in software functionality in the main controller (dispensing system controller) 38.

More modular dispensers can be added to the automated dispensing system 9 by daisy-chaining several controllers (e.g., main controllers 38 or separate individual or group controllers) in series and connecting modular dispensers to them.

Location-specific dispensing algorithms can be incorporated into the dispensing controller (e.g., main controller 38). For example, a sauce dispense volume in one location could be half the dispense volume in another location.

In a simple manual mode, a barista can use the dispensing system 9 in FIG. 3. The number of pumps of the ingredient, modifier, or enhancer being dispensed or the volume of ingredient being dispensed is shown on the display 19 as in FIG. 4. Using the input device 20, the barista can toggle to decrease or increase the number of pumps (e.g., shots or doses) or volume being dispensed. When the barista has made the selection, a cup or other vessel is placed below the dispensing spout 21. The main controller 38 retrieves the algorithm for dispensation from its memory 40 and sends the power, dispense and display signals to the respective modular dispenser 45. The pump 28 in the modular dispenser 45 then dispenses the exact volume of ingredient into the vessel through the dispensing spout 21 when activated by the barista or upon detecting the vessel (e.g., upon detecting a vessel placed underneath the spout using a proximity sensor). Each actuation of a user input device (e.g., input device 20) may be equivalent to one dose or all the doses needed for that particular beverage recipe. Light indicators (e.g., light indicators in input devices 20 or light indicators, such as LED icons or indicators, on the display 20) may also alert the barista that the bag is empty or maintenance is needed. Audible alerts may additionally or alternatively be generated.

Figure 14:
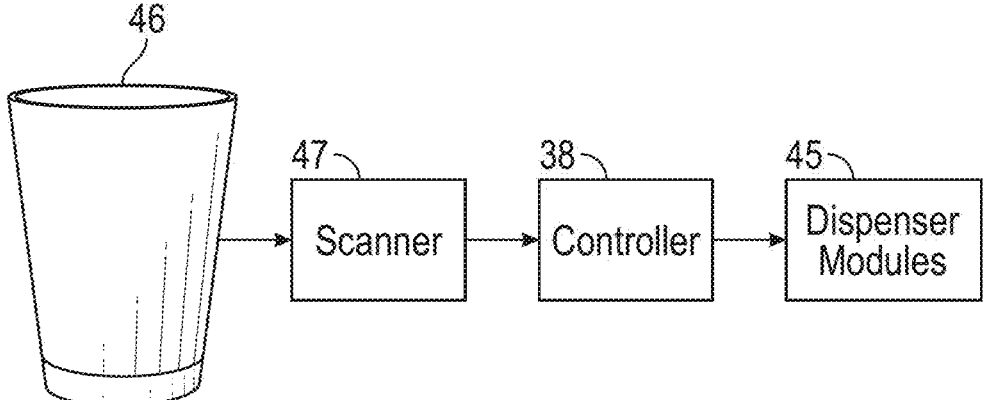
FIG. 14 shows a flow diagram of an automated mode of the automated dispensing system.

In the automated mode shown in FIG. 14, the barista scans in a bar code or QR code 46 (or other identification element, such as an alphanumeric textual label or NFC tag) through an optical or digital scanner 47. The identification element may be located, for example, on a cup or other vessel. The beverage information is then transmitted to the main controller 38 of the automated dispensing system 9. The main controller 38 retrieves the recipe from its memory 40 or from a remote server, and then supplies power and the appropriate dispensing algorithm to the modular dispenser 45 to dispense the right amount of ingredient(s) when activated by the barista or upon detecting the vessel positioned beneath the dispensing spout 21.

Figures 15A, 15B, 15C, 15D:
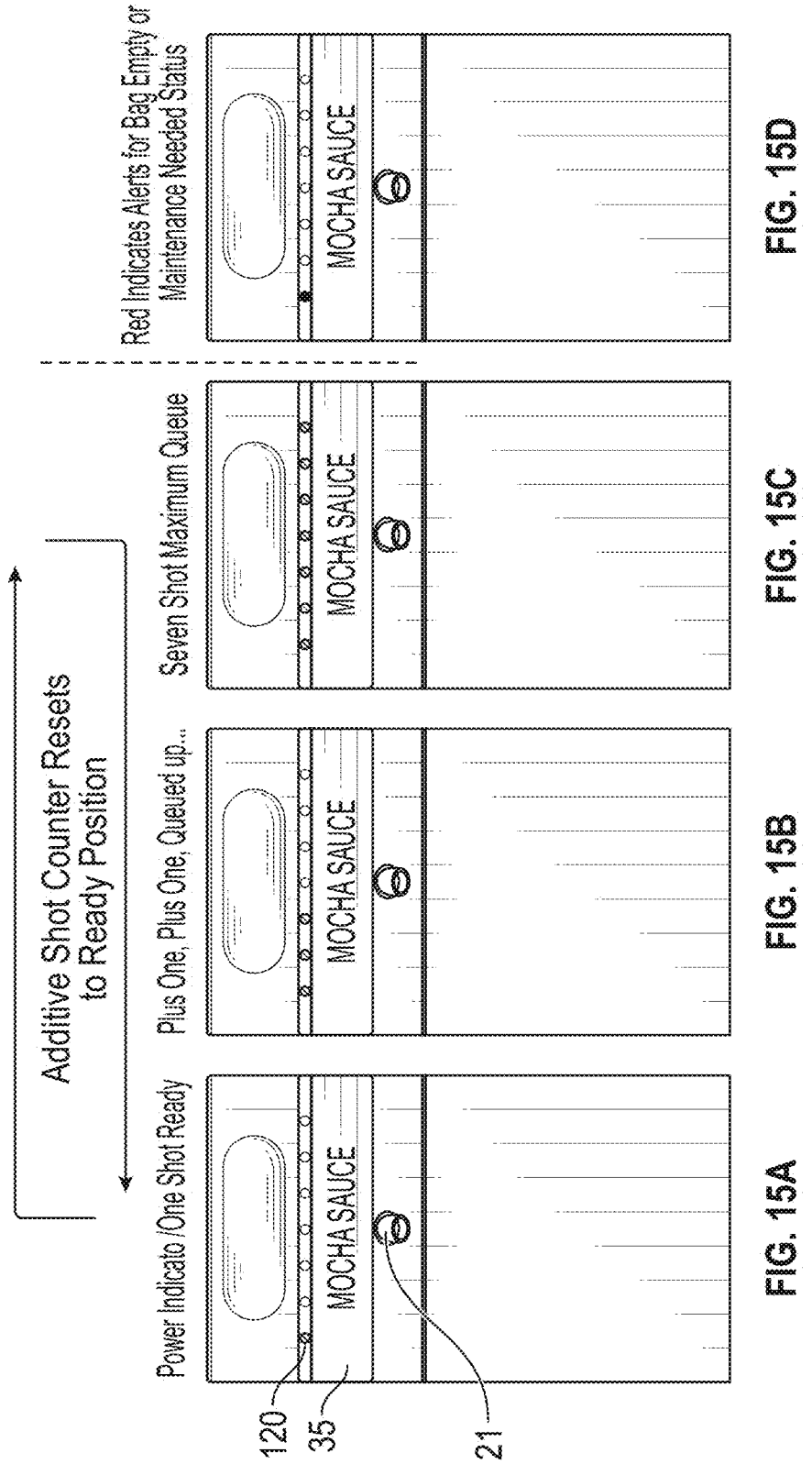
FIGS. 15A-15D illustrate operation of an individual modular dispenser having a user interface with light indicators.

With reference to FIGS. 15A-15D, the barista can adjust the amount of the ingredient (e.g., syrup, sauce or flavor) based on the customer preference. For example, light indicators 120 integrated into the display 19 or positioned surrounding the display 19 (e.g., below, above, or to a side of the display 19) may show the number of pumps (e.g., shots or doses) of ingredients desired by the customer. For example, FIG. 15A shows one pump or dose as indicated by a slash in a first circle of the light indicators indicating that the light is lit up. FIG. 15B shows three pumps or doses (corresponding to three lit-up light indicators) and FIG. 15C shows seven pumps or doses (corresponding to seven lit-up light indicators), which is a maximum queue amount in the illustrated embodiment. However, other maximum pump (or dose) amounts may be implemented (e.g., fewer than seven or greater than seven as desired and/or required). The light indicators 120 or other indicator (e.g., alphanumeric LED indicator) may indicate the number of pumps to be dispensed automatically or may instruct the barista of the number of pumps to be dispensed manually. Each actuation of a user input device (e.g., input device 20) may be equivalent to one dose or all the doses needed for that particular beverage. As the doses are dispensed, the display 19 may decrease the number of remaining doses (e.g., by darkening or turning off a light indicator or decreasing a number value). With reference to FIG. 15D, one or more of the light indicators 120 may also alert the barista that the bag 25 in a tray 22 of a particular modular dispenser is empty or that maintenance is needed. For example, a first one of the light indicators 120 may be lit up with a different color (e.g., red color indicated by the filled-in dark first light indicator in FIG. 15D) to indicate that the bag is empty or that maintenance is needed. In some implementations, the light indicator may flash in addition or as an alternative to a different color. An audible, graphical, or textual alert may also be generated. A first light indicator may also be used to indicate power is on for the modular dispenser.

Figure 15E:
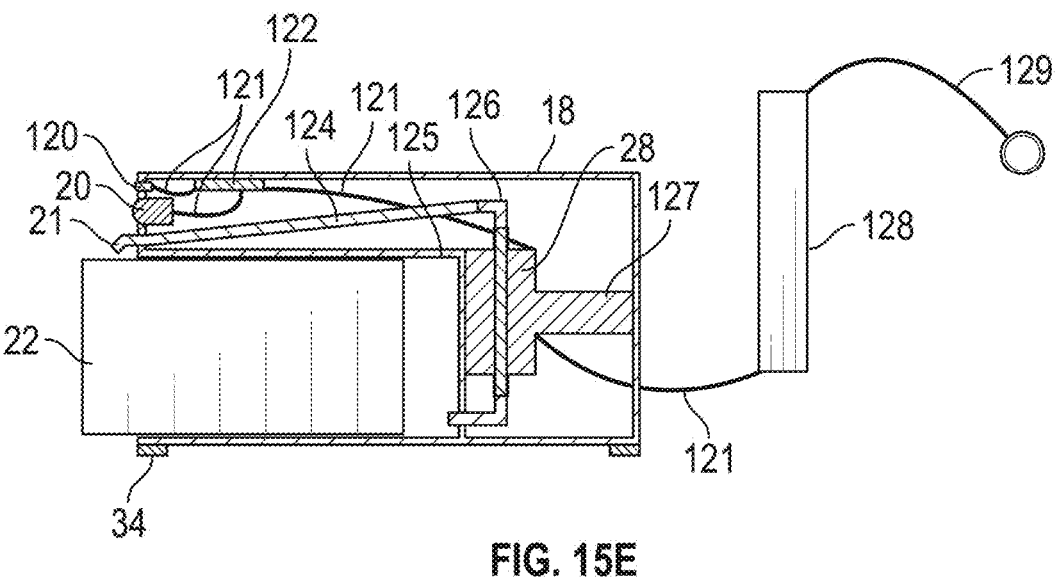
FIG. 15E shows a block diagram and partial side cross-section view of a modular dispenser, or dispenser module.

FIG. 15E shows a schematic side cross-section/block diagram of an embodiment of an individual modular dispenser 45 similar to that shown in FIGS. 15A-15D, although certain components may be repositioned in FIG. 15E. The modular dispenser 45 includes a housing 18 that houses internal components. A removable tray 22 can be inserted and removed from the housing 18 as described previously. The modular dispenser also includes a user input device 20 (e.g., press button) and/or display 19 (e.g., touchscreen display) and a dispensing spout 21 as previously described. The light indicators 120 (which may comprise 1, 2, 3, 4, 5, 6, 7 or more than 7 discrete light indicators) may be positioned as shown to be seen from a front side of the modular dispenser 45. The light indicators 120 may be positioned above or below the display 19 and/or user input device 20.

The modular dispenser 45 includes electronic circuitry (e.g., a printed circuit board assembly (PCBA)) configured to facilitate operation of (electrical connection or communication to and/or from) the light indicators 120, display 19, user input device 20. Power and/or data signals may be communicated between various components via wire harnesses 121. A supply line 124 facilitates transfer of contents from the tray 22 (or a bag 25 in the tray 22) to the dispensing spout 21. The supply line 124 may be comprised of separate sections connected by a tube fitment or coupler 126 (e.g., to help navigate sharp turns).

The modular dispenser 45 may include an access panel 125 that may be removed to access the pump 28 and/or pump motor 127 (e.g., DC motor) and/or supply line 124 for maintenance purposes. The motor 127 and/or pump may be electrically connected to a master power and logic housing 128 (e.g., main controller 38 or individual modular controller) configured to supply power signals and data communications to the modular dispenser 45 via a wire harness 121. The master power and logic housing 128 may be electrically coupled to a standard power socket or electrical outlet 129 on a wall of a coffee store. In some configurations, the power may alternatively or additionally be provided by a battery (e.g., rechargeable battery or replaceable battery) such that power can be maintained even during a power outage or to make the system more portable.

Figure 16:
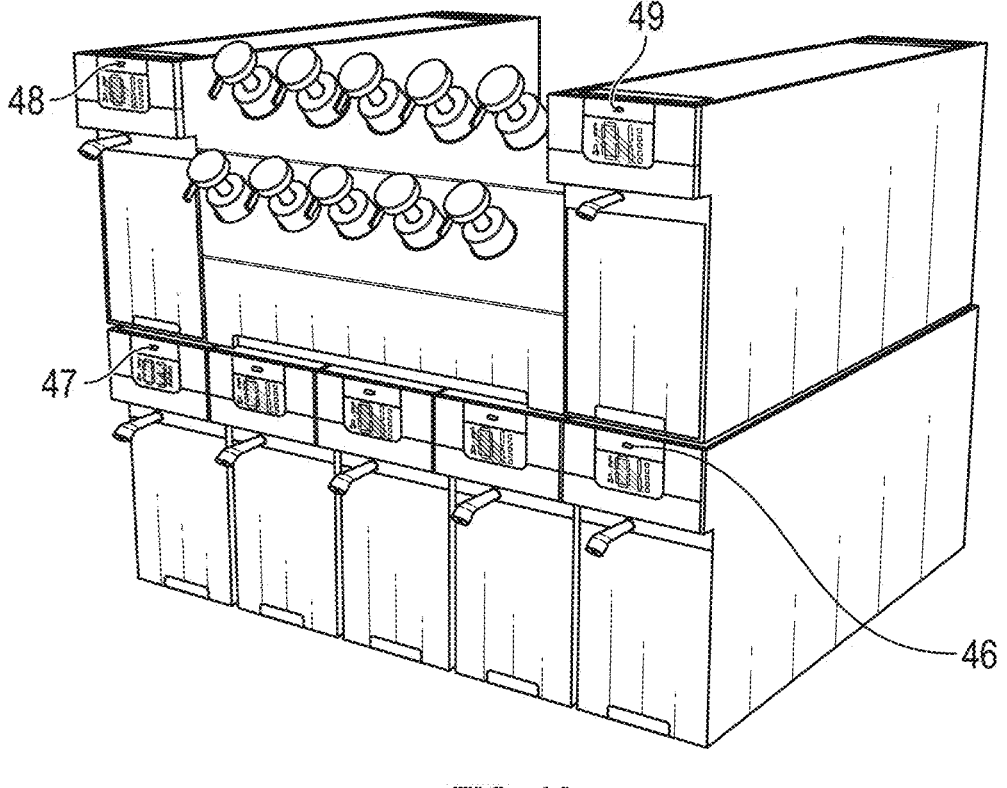
FIG. 16 illustrates an automated dispensing system with multiple modular dispensers.

With reference to FIG. 16, the automated dispensing system 9 can also prompt the barista to follow a particular dispensing sequence by lighting up display lights 46-49 (which are shown positioned within an area of the user input device 20) in a sequential manner. When a particular display light is on, the barista takes the cup to that modular dispenser to automatically or manually dispense the ingredient (e.g., syrup, sauce or flavor) stored in that particular modular dispenser. Multiple baristas can work with the automated dispensing system 9 simultaneously, for example, by changing the color of the light or another aspect of the indicator (e.g., providing multiple different light indicators on each modular dispenser) for each separate order. That way, two or more baristas can be prompted on a beverage sequence at the same time.

Figure 17:
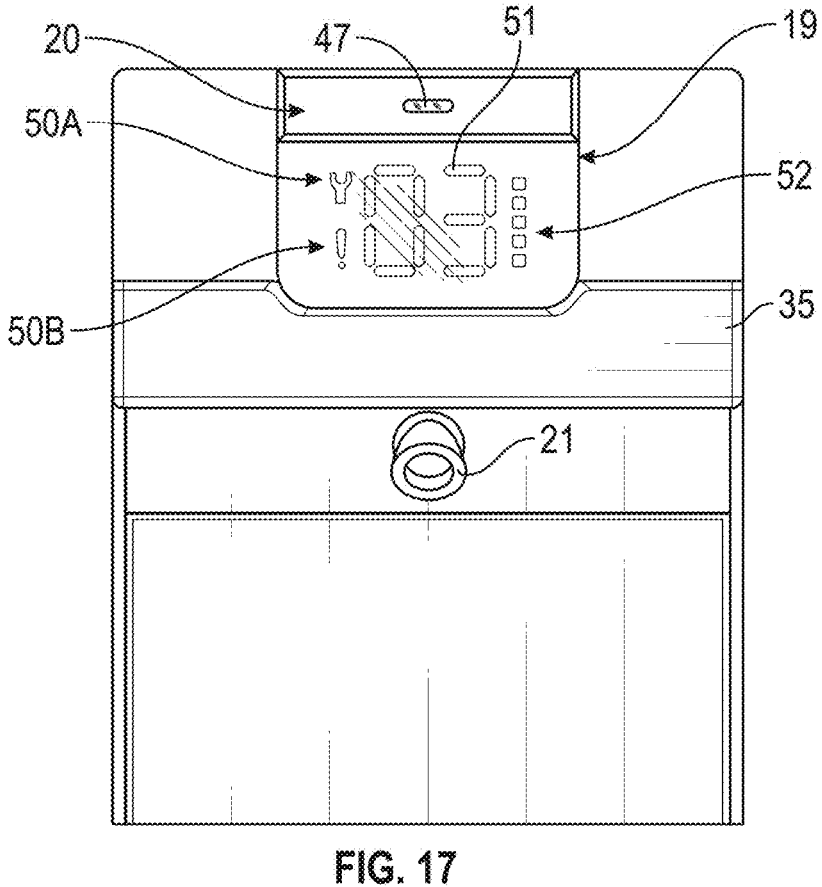
FIG. 17 illustrates a partial enlarged view of a user interface of an individual modular dispenser.

As shown in FIG. 17, the display 19 for the modular dispensers (e.g., any of modular dispensers 10-16, 37, 45) can have multiple icons or indicators to indicate different operational parameters. For example, a cleaning icon or indicator 50A may prompt a barista or other user that a cleaning cycle should be performed or is being performed. As another example, an error indicator 50B (illustrated as an exclamation mark as one example icon) may indicate that an error has occurred that requires attention (such as erroneous bag loading). As a further example, a third icon or indicator 52 may include a visual gauge or series of lights or other indicators to indicate an amount of ingredient (e.g., sauce, syrup or flavor) remaining modular dispenser in order to prompt the barista to change out the ingredient bag before it is depleted to avoid having to re-prime the supply line or pump. The display 19 may also include a numerical indicator 51 (e.g., alphanumeric LED indicator) to indicate a number of pumps, shots or doses to be dispensed (which can be adjusted by the barista) as described above by pressing the user input device 20.

Figure 18:
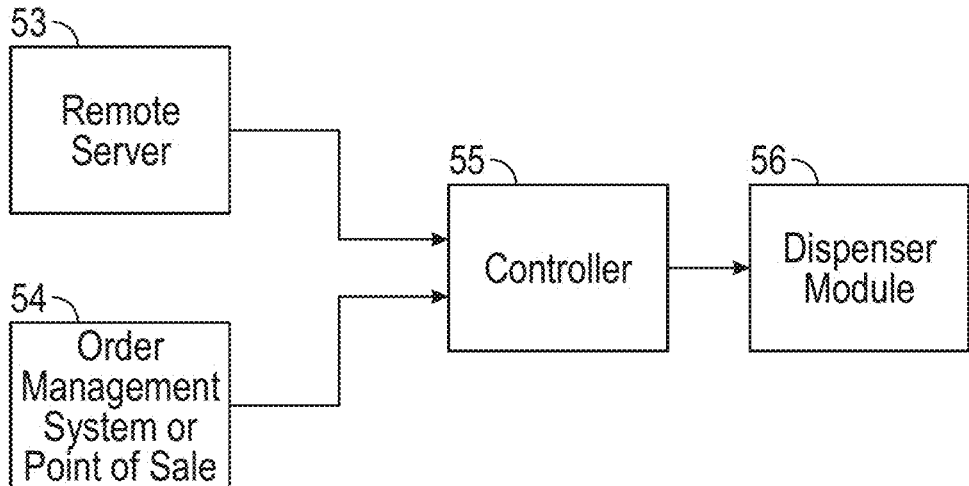
FIG. 18 shows a flow diagram of an automated mode of a dispensing system.

With reference to FIG. 18, the order of the dispensing sequence can also originate remote from the dispensing system 9. The order can originate in a remote server 53 or in an order management system or point of sale system 54 and communicated to the controller 55 (e.g., main controller 38) that can retrieve the recipe from memory (e.g., memory 40) and prompt the modular dispenser 56 (e.g., any of modular dispensers 10-16, 37, 45) to dispense an appropriate amount of ingredient (e.g., sauce, syrup or flavor).

Figure 19:
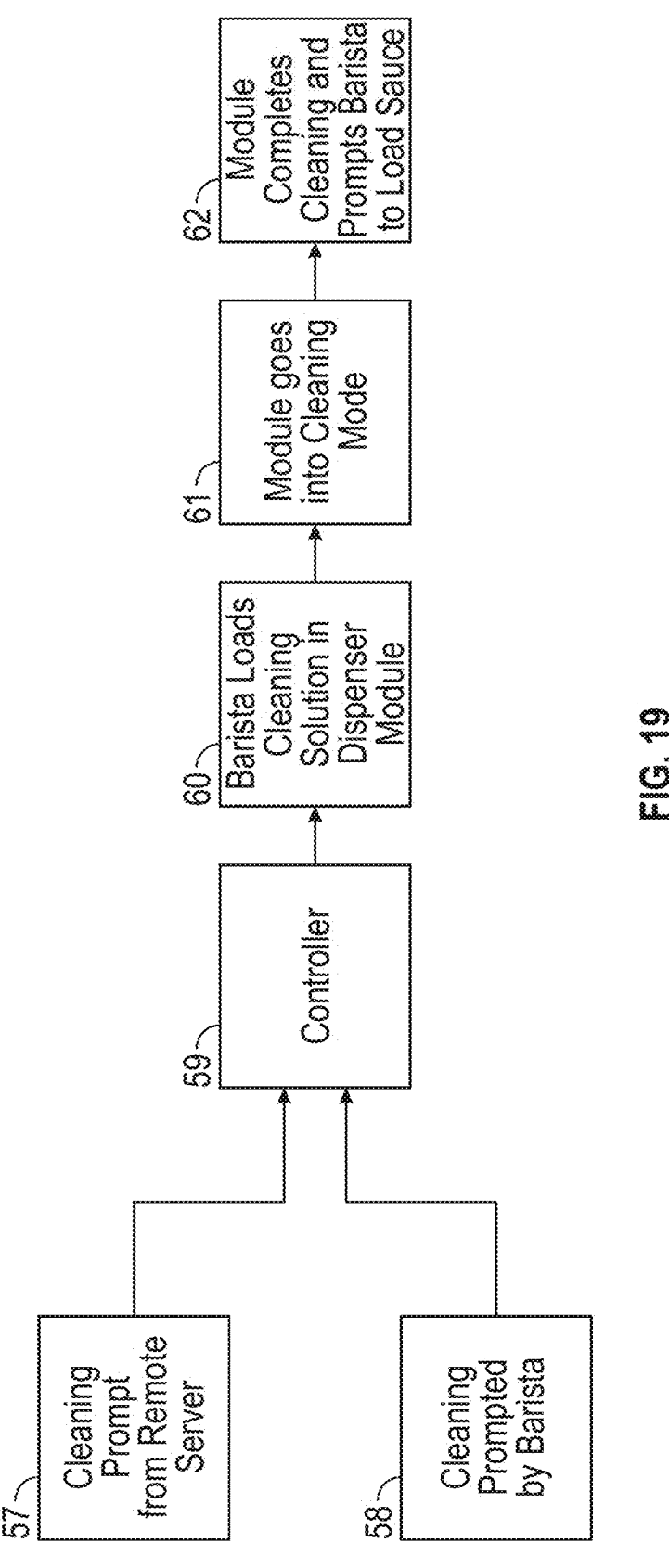
FIG. 19 shows a flow diagram for cleaning a modular dispenser.

In accordance with several embodiments, cleaning is an important part of the automated dispensing system 9 as this equipment is used to dispense food or beverage substances. Cleaning can be prompted in a timely manner (e.g., periodically according to a predetermined schedule or based on actual usage). FIG. 19 illustrates a schematic flow diagram of a cleaning process. The cleaning prompt can originate remotely at Block 57 (e.g., from a remote server) or from a controller (e.g., main controller 38, controller 55) at Block 59 or the cleaning prompt can also be manually initiated by the barista at Block 58. The controller can send an individual modular dispenser a prompt or instruction to display the cleaning icon 50A on the display at Block 59. The barista then loads a cleaning solution in the dispenser tray (e.g., tray 22) at Block 60 and directs (e.g., by pressing a user input) the modular dispenser to go into a cleaning mode at Block 61. In some implementations, the cleaning mode may be entered automatically upon loading of the cleaning solution and pressing the tray back into modular dispenser. The modular dispenser completes the cleaning cycle and prompts the barista to reload the ingredient at Block 62. The capability to have a cleaning cycle for each individual modular dispenser without any disassembly of the equipment is useful as each ingredient may have different cleaning requirements. In addition, the other modular dispensers connected to the dispensing system 9 may still be used while one or more modular dispensers are being cleaned.

Figure 20:
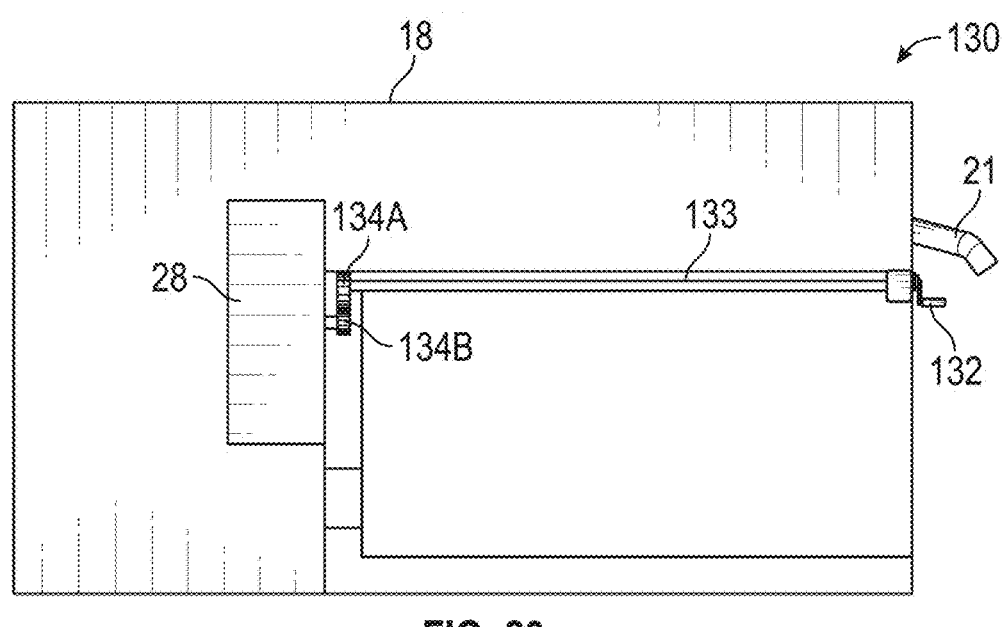
FIG. 20 shows a block diagram of a manually operable modular dispenser.
Figure 21:
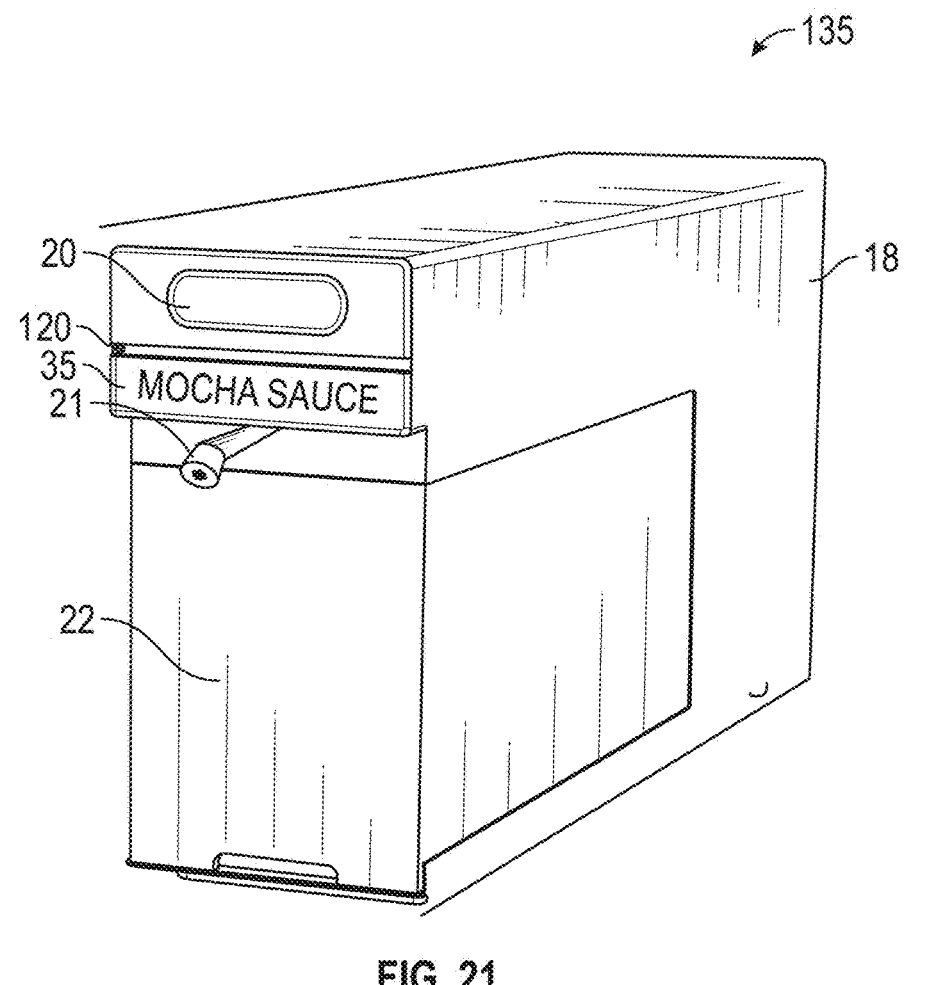
FIG. 21 illustrates a modular dispenser, or dispenser module, that may be used with the automated dispensing systems.
Figure 22:
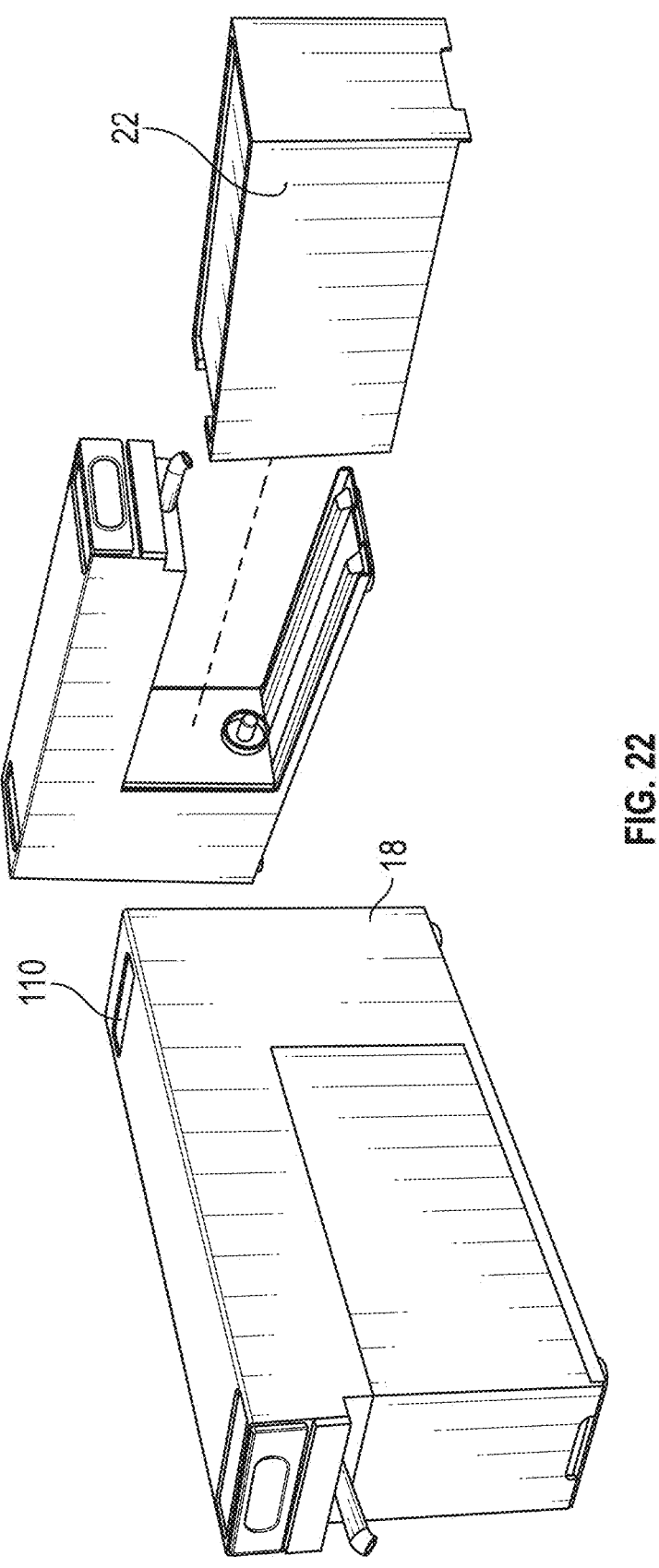
Figure 23:
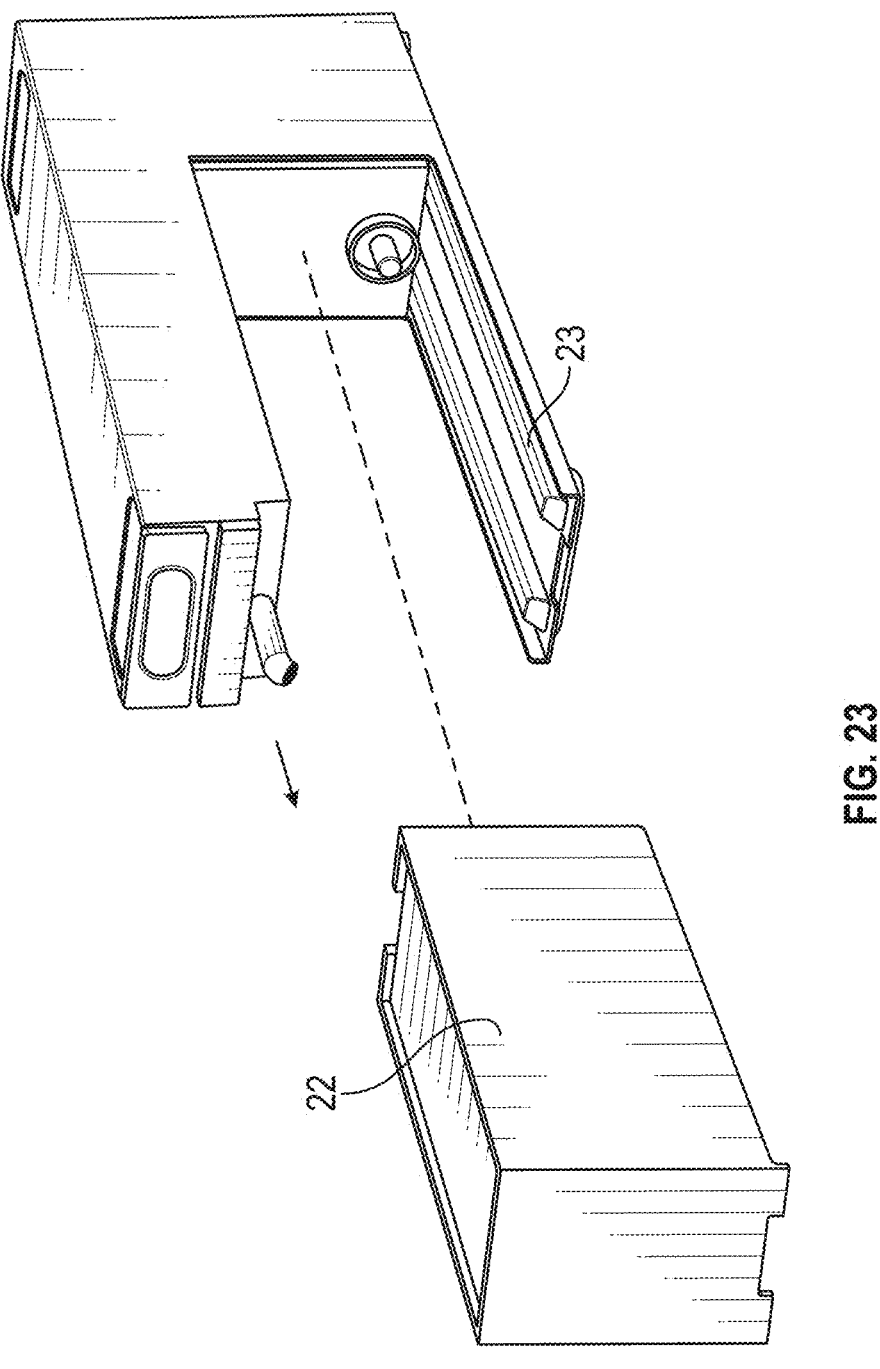
Figure 25:
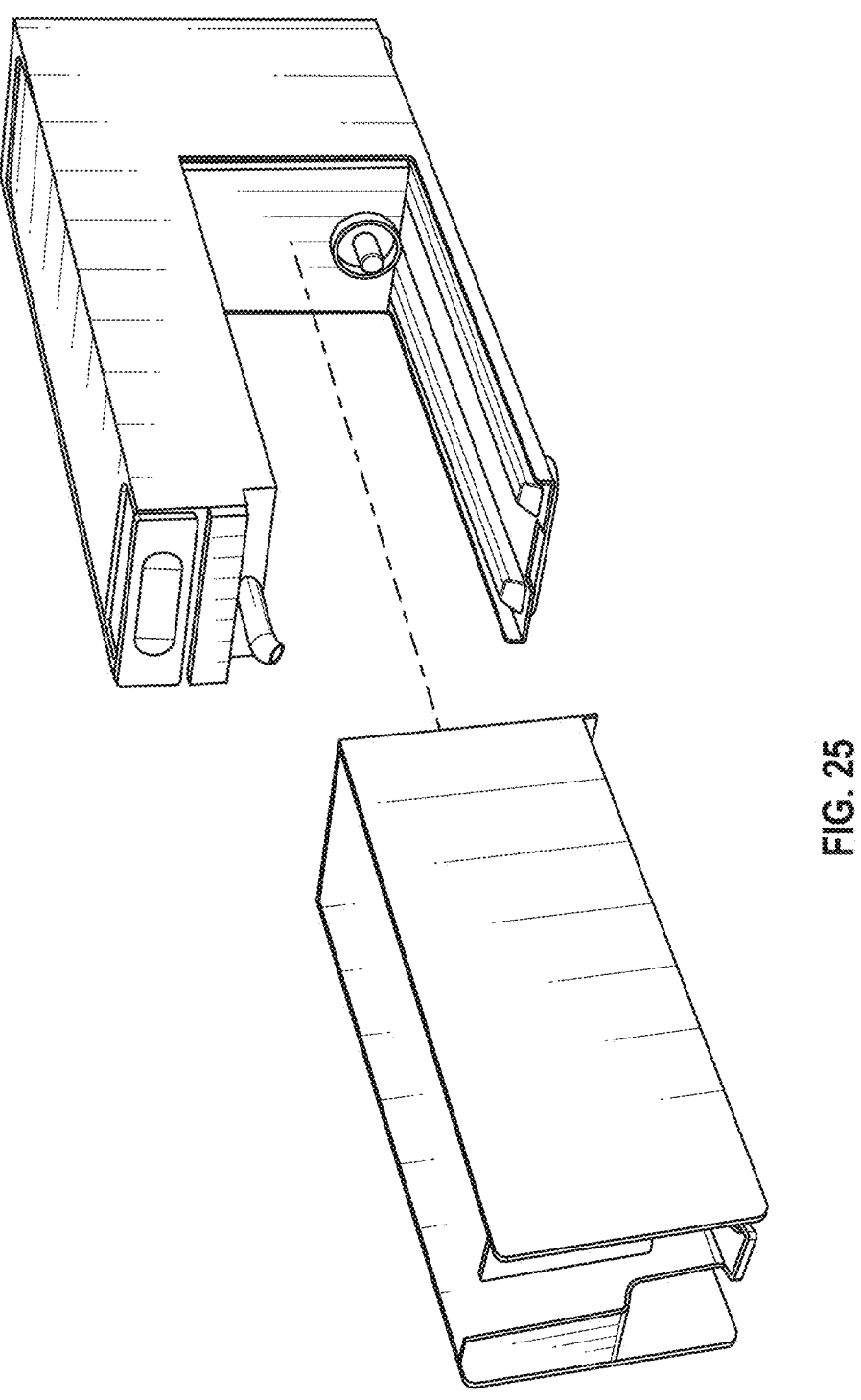

FIG. 20 shows a block diagram of a manually-operable modular dispenser 130. The manual operation may be incorporated into any of the modular dispensers described herein. The manual operation mechanism comprises a ratcheting system that includes a hand crank 132 that is operably coupled to a drive shaft 133. Rotation of the hand crank 132 causes corresponding rotation of the drive shaft 133. The drive shaft 133 is mechanically and operably coupled to one or more gears. Rotation of the drive shaft 133 may rotate a first gear 134A attached to the drive shaft 133. The first gear 134A may be mechanically and operably coupled to a second gear 134B that in turn is mechanically and operably coupled to a motor/pump assembly of the modular dispenser 130. The hand crank 132 may be located at various locations (e.g., a front surface of the housing 18 below or adjacent the dispensing spout 21). The manual operation mechanism may advantageously facilitate operation of the modular dispenser 130 even when power is lost. Other manual operation mechanisms may be implemented as well (e.g., more than two or fewer than two gears).

Figure 26:
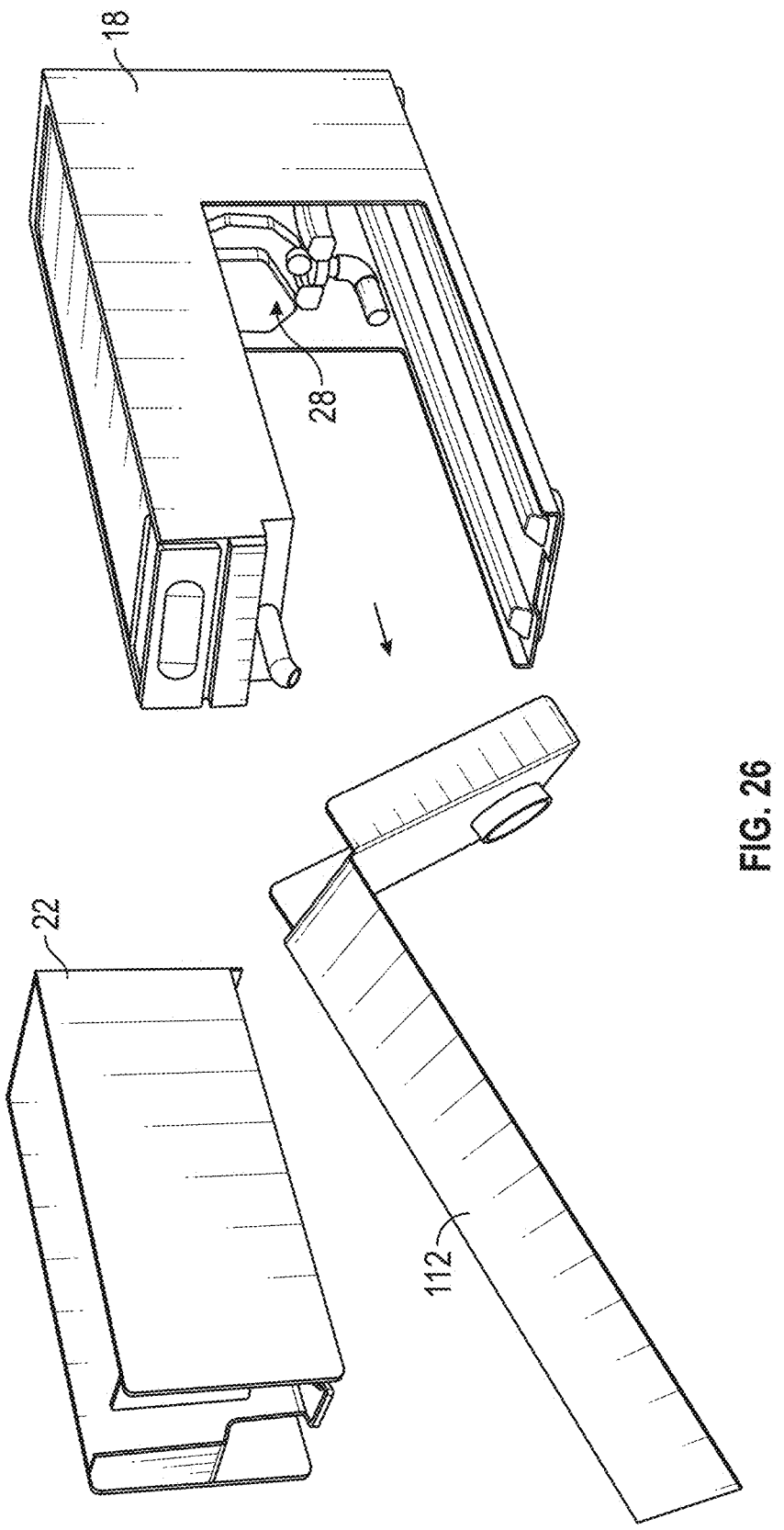
Figure 27:
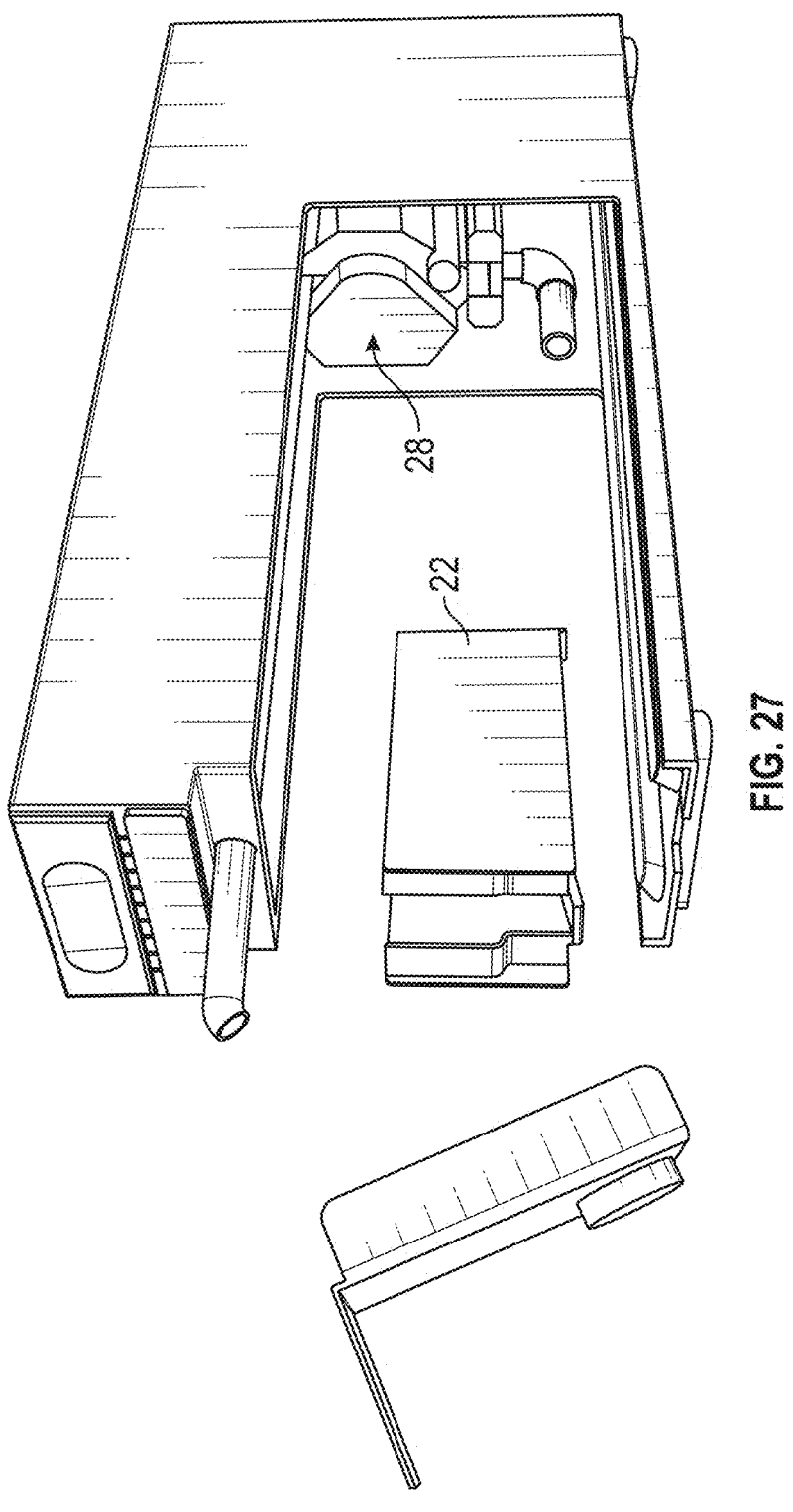

FIGS. 21-27 illustrate another embodiment of a modular dispenser 135 without a display screen 19. The modular dispenser 135 may include structural and functional features similar to the modular dispensers described herein (e.g., housing 18, a user input device 20, a dispensing spout 21, a tray 22, guiding features 23, pump 28, a label plate 35, light indicators 120). The tray 22 may include similar tray features as described herein (e.g., pull feature 24, bag 25, valve 26, locating feature 27, drip catch feature 111). The modular dispenser 135 may include a simplified user interface that includes an enlarged user input device 20. As shown in FIGS. 26 and 27, the pump frame 112 (e.g., an access panel of the pump frame 112) may be removed to access the pump 28 for maintenance.

FIGS. 28A-28D schematically illustrate a sample workflow or operation and show an example embodiment of an aggregator 63 that can be incorporated into or can be communicatively and operably coupled to the automated dispensing systems 9 described herein. The aggregator 63 may be configured to efficiently process customer orders to facilitate high throughput while maintaining quality control and accuracy of customer orders communicated to the automated dispensing system.

Figure 28A:
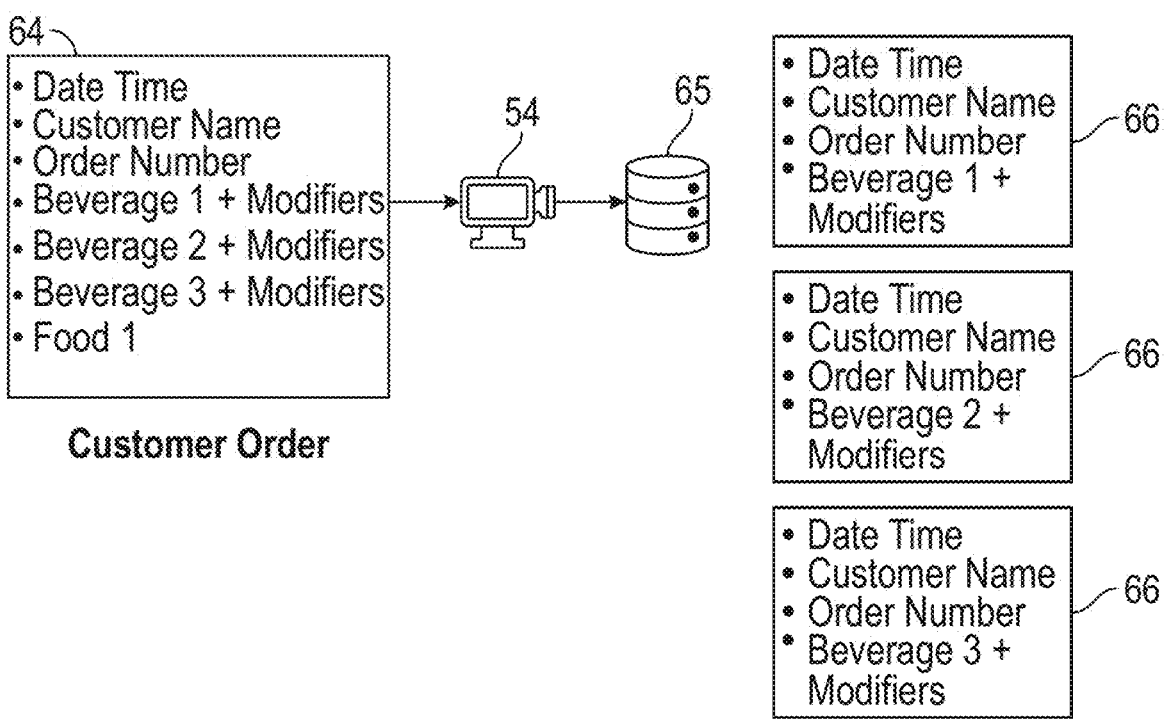
FIGS. 28A-28D schematically illustrates an aggregator of an automated dispensing system and operation of an aggregator.

With reference to FIG. 28A, customer orders may be received by the order management or point of sale system 54 from (1) a barista entering a customer order locally at a coffee store in response to oral instructions from a customer ordering at an in-store counter or via a drive-thru ordering system, (2) a customer entering a customer order locally via an in-store self-service kiosk, (3) a customer using a mobile order and pay software application, (4) a customer using an online ordering method, and/or other source. FIG. 28A shows an example customer order 64 and example data or information that may be captured and received by the point of sale system 54. The customer order information may include, for example, a date, time, customer name, and the beverage and/or food items ordered by the customer, along with any modifiers or ingredients (e.g., flavors, sauces, or syrups, or reduction of sugar).

The point of sale system 54 may then send the customer order data or information to a server or store production controller 65. The server or store production controller 65 may be located in the coffee store and may be communicatively coupled to the point of sale system 54 via a communication cable (e.g., Ethernet cable) or via a wireless connection (e.g., Wi-Fi connection via a wireless network such as a local area network or a Bluetooth connection). In some implementations, the server or store production controller 65 may not be located in the coffee store and may be located at a remote location (e.g., a remote server) and communicatively coupled to the point of sale system 54 via a telecommunications network (e.g., the Internet, Telex network, wireless radio network, etc.).

The store production controller 65 is configured to, upon execution of instructions stored on a non-transitory storage medium, disaggregate the customer order data into separate, individual food or beverage item orders 66. Each individual item order 66 includes a customer order number, a customer name, a name of the food and/or beverage items, and a list of any requested modifiers or ingredients (e.g., sauce, syrup, flavor, or reduction of sugar) for each food and/or beverage item.

Figure 28B:
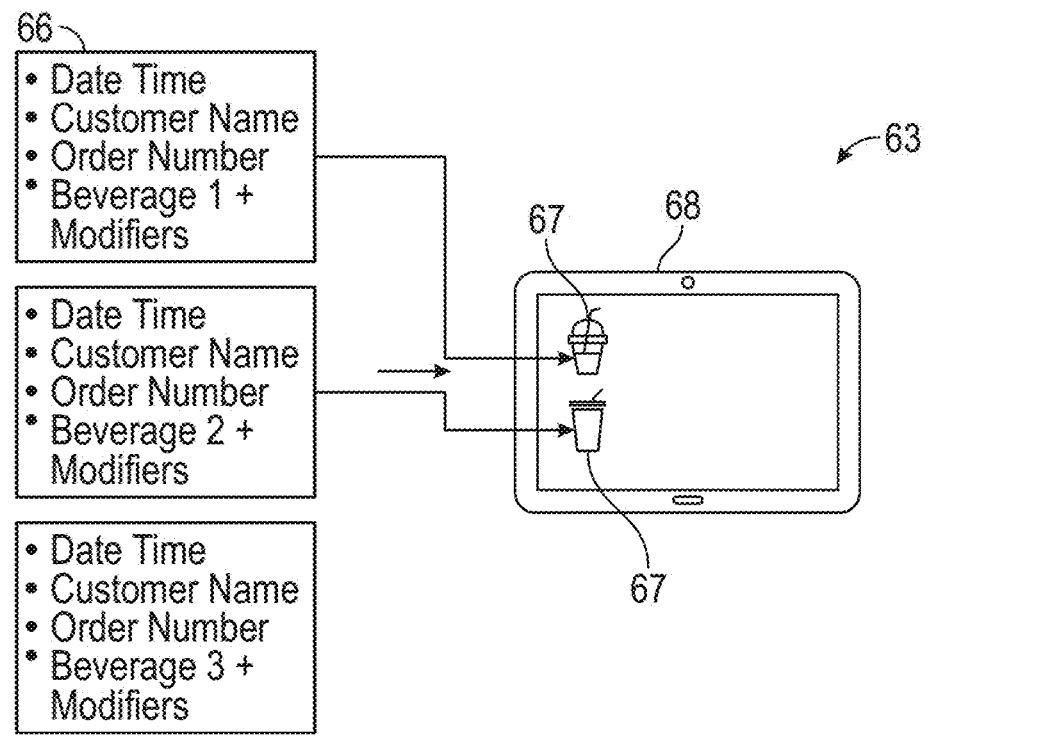

With reference to FIG. 28B, each disaggregated individual item order 66 is sent to the aggregator 63 in sequence. In several implementations, the individual item orders 66 may be published as webhooks (e.g., messages or notifications with information sent between network resources). The aggregator 63 includes software instructions stored in memory that are executed to cause an icon 67 associated with each individual item order 66 (at least the beverage item orders) to appear on a display screen 68 of the aggregator 63. The icons may be customized to look like particular beverages or types of beverages.

Figure 28C:
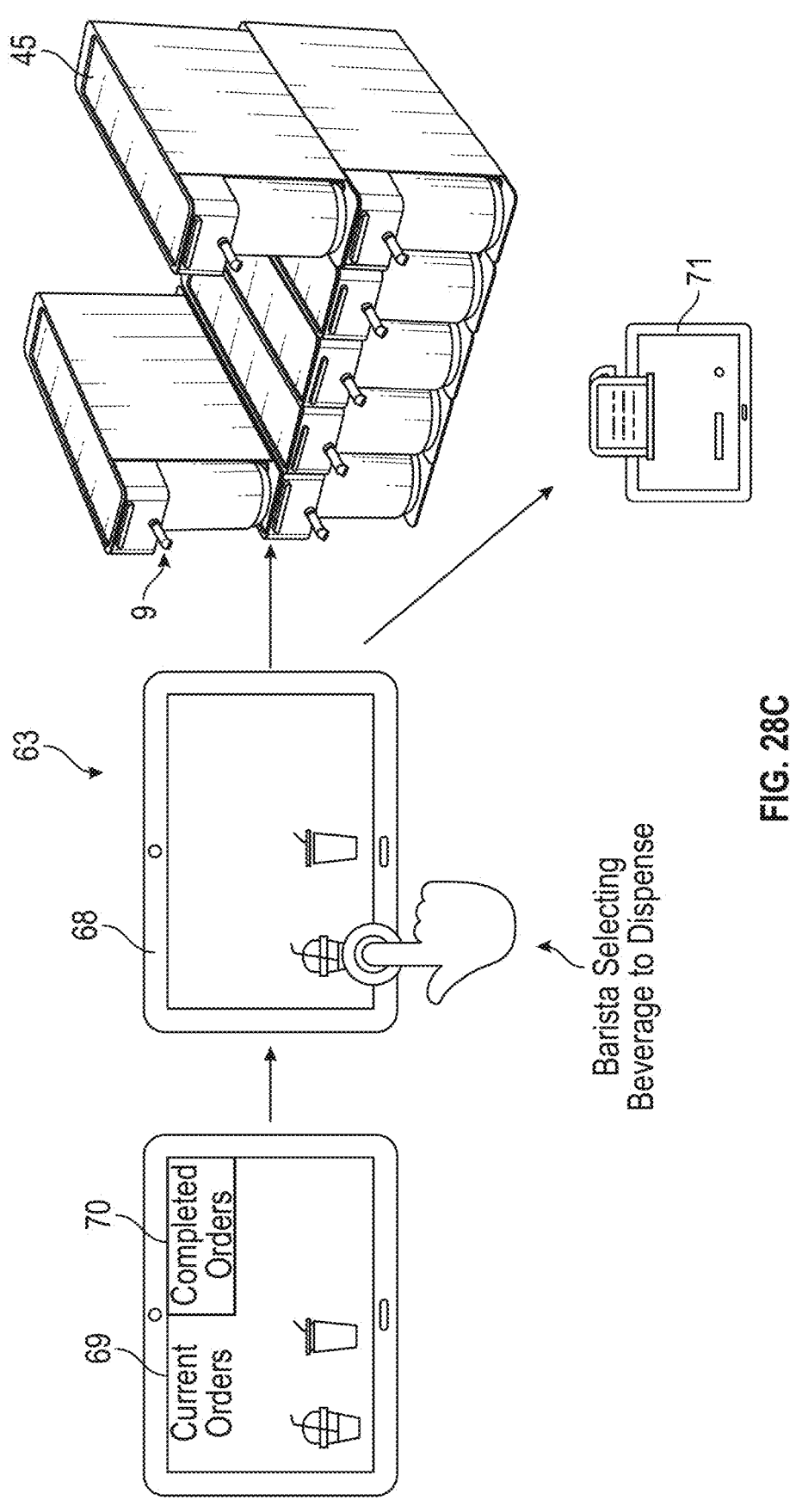

Turning to FIG. 28C, the display screen 68 may comprise a touch screen display (e.g., LCD or OLED display) that allows a barista or operator to both visualize output on the display screen 68 and to provide input to cause the aggregator 63 to send control signals to the modular dispensers (e.g., modular dispensers 10-16, 37, 45, 56, 135) of the automated dispensing system 9 (e.g., to the main controller 38, 55). For example, a barista may select a beverage to be made by touching the display screen 68 at the location of the icon 67 corresponding to the beverage with his or her finger. The display screen 68 may be configured to have two pages or tabs. A first page or tab 69 may be configured to display pending customer orders and a second page or tab 70 may be configured to display completed orders. A barista may toggle between the two tabs using the touch screen display or a user input device (e.g., button).

Upon selection of an icon by the barista, the aggregator 63 is configured to send the beverage item data or information (e.g., beverage name and ingredients or modifiers) corresponding to the selected icon to the modular dispensers 10-16, 37, 45, 56, 135 (e.g., to the main controller 38, 55 of an automated dispensing system 9 including the modular dispensers 10-16, 37, 45, 56, 135). The main controller 38, 55 may then execute instructions to prepare the beverage based on the beverage item data or information received from the individual beverage item order 66 and based on recipe information for the particular beverage stored in memory (e.g., memory 40). The aggregator 63 may also send the beverage item data or information for each individual item order 66 to a label printer 71 (e.g., which may be communicatively coupled via a wired or wireless connection, such as Ethernet, Wi-Fi or Bluetooth connection) so that a label can be automatically printed with the individual item order information and placed on a beverage cup or other vessel.

Figure 28D:
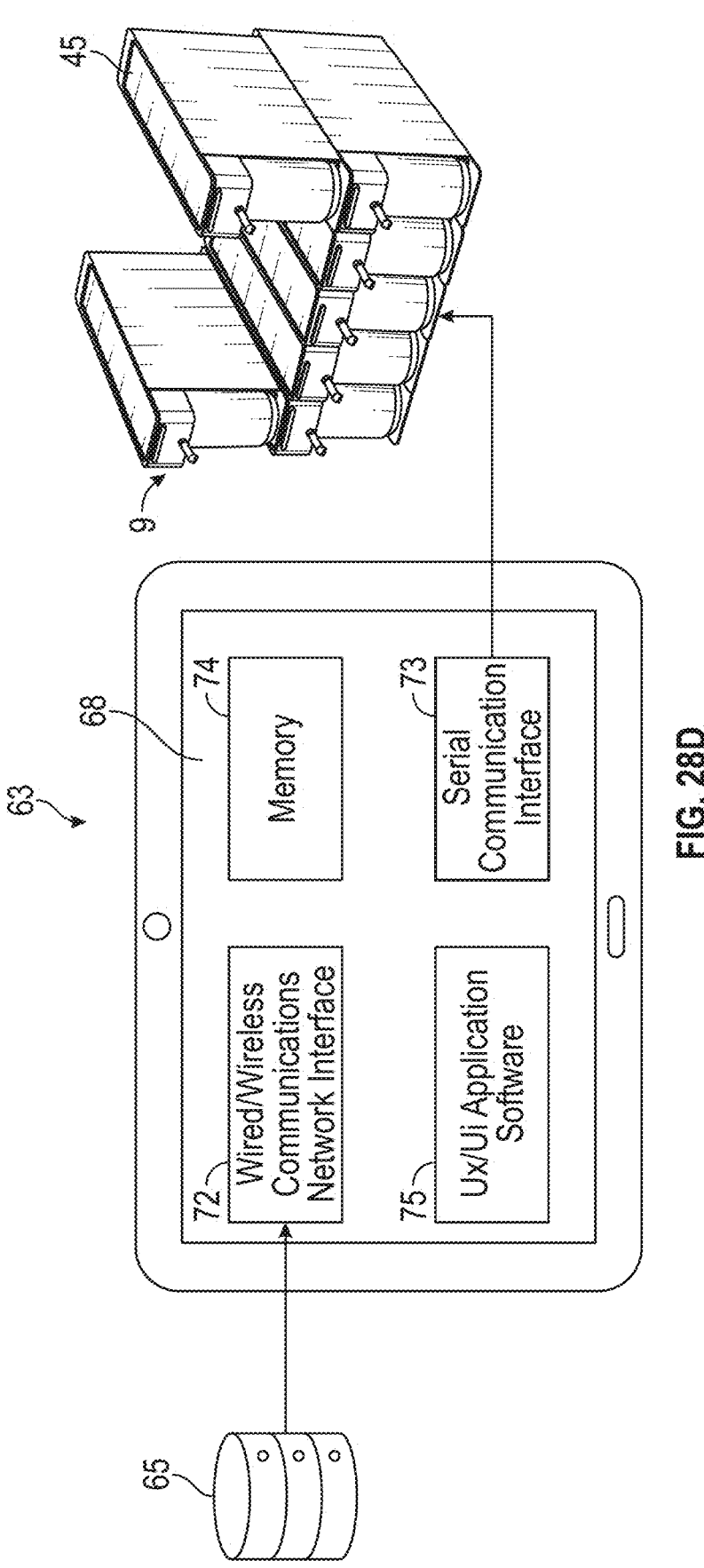

With reference to FIG. 28D, the aggregator 63 is a standalone unit or module having its own local processor or controller, memory, and display. The aggregator 63 may be implemented using hardware, software, and/or firmware. The aggregator 63 includes communications network interface hardware 72 (e.g., a wired Ethernet network interface card and/or one or more wireless network interface cards, such as a Wi-Fi and/or Bluetooth network interface card) to enable wired and/or wireless communications with the store production controller 53 or a remote server. The aggregator 63 also includes serial communications interface hardware 73 to facilitate one-way or two-way communication (e.g., data transmission, control signals) with the main controller 38, 55 of the automated dispensing system 9 over a serial bus link. A parallel bus link may be used in alternative embodiments.

The aggregator 63 further includes local memory 74. The local memory 74 may store a backup copy of beverage recipes for the automated dispensing system 9 and may store firmware of the aggregator 63. The local memory may include, for example, RAM memory, flash memory, ROM memory, EPROM memory, EEPROM memory, and/or the like. The aggregator 63 may include user experience/user interface software 75 stored in memory to be executed by one or more processors (e.g., digital signal processor, microprocessor, graphics processing unit, special-purpose processor). The user experience/user interface software 74 may be executed to generate icons for display on the display screen 68 corresponding to various beverages, to generate the two pages or tabs of pending orders and past orders, to react to touch screen input received from the barista, and to display and adjust content on the display screen 68 (e.g., display brightness, alerts, notices, etc.).

Turning to FIGS. 29A-29C, in accordance with several embodiments, an automated modular dispensing system or unit 76 (e.g., automated dispensing systems 9 described herein) can advantageously comprise a system or unit adapted and configured to aggregate ingredients or modifiers (e.g., sweetener, flavor and color) simultaneously. FIGS. 29A-29C show a front, top and side view, respectively, of the modular dispensing system 76. The modular dispensing system 76 comprises a series of pump and motor assemblies 77, supply lines 78, a display 79, sweetener, sauce or syrup cartridges 80 and color or flavor concentrate cartridges 81. The pump and motor assemblies 77 may be various sizes and can be combined to create endless combinations and permutations of customized beverages. The size of the pump may be dependent, for example, on a liquid viscosity and a desired dose of the ingredient or modifier.

Figure 30:
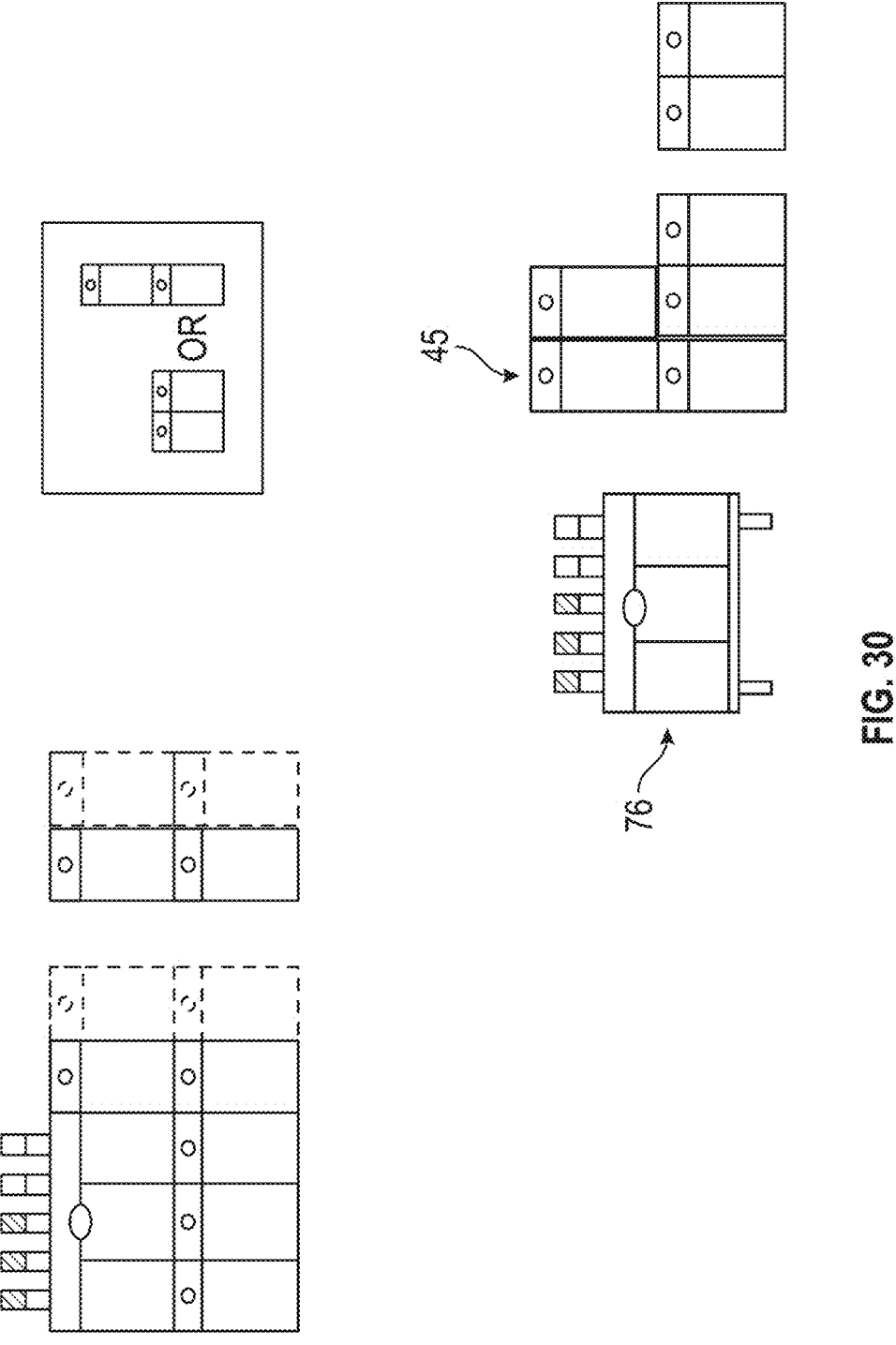
FIG. 30 illustrates various examples of modular configurations of an automated modular dispensing system including multiple dispenser modules.

With reference to FIG. 30, the modular dispensing system or unit 76 can work independently or in series with other modular dispensers (e.g., modular dispensers 10-16, 37, 45, 56, 135) described herein. FIG. 30 show various configurations of modular systems in which modular dispensers may be stacked vertically and/or placed horizontally adjacent to each other (e.g., depending on a particular space or area of a coffee store and surrounding equipment). The system is adaptable and modular to suit the needs or desires of a particular coffee store manager or baristas.

Figure 31:
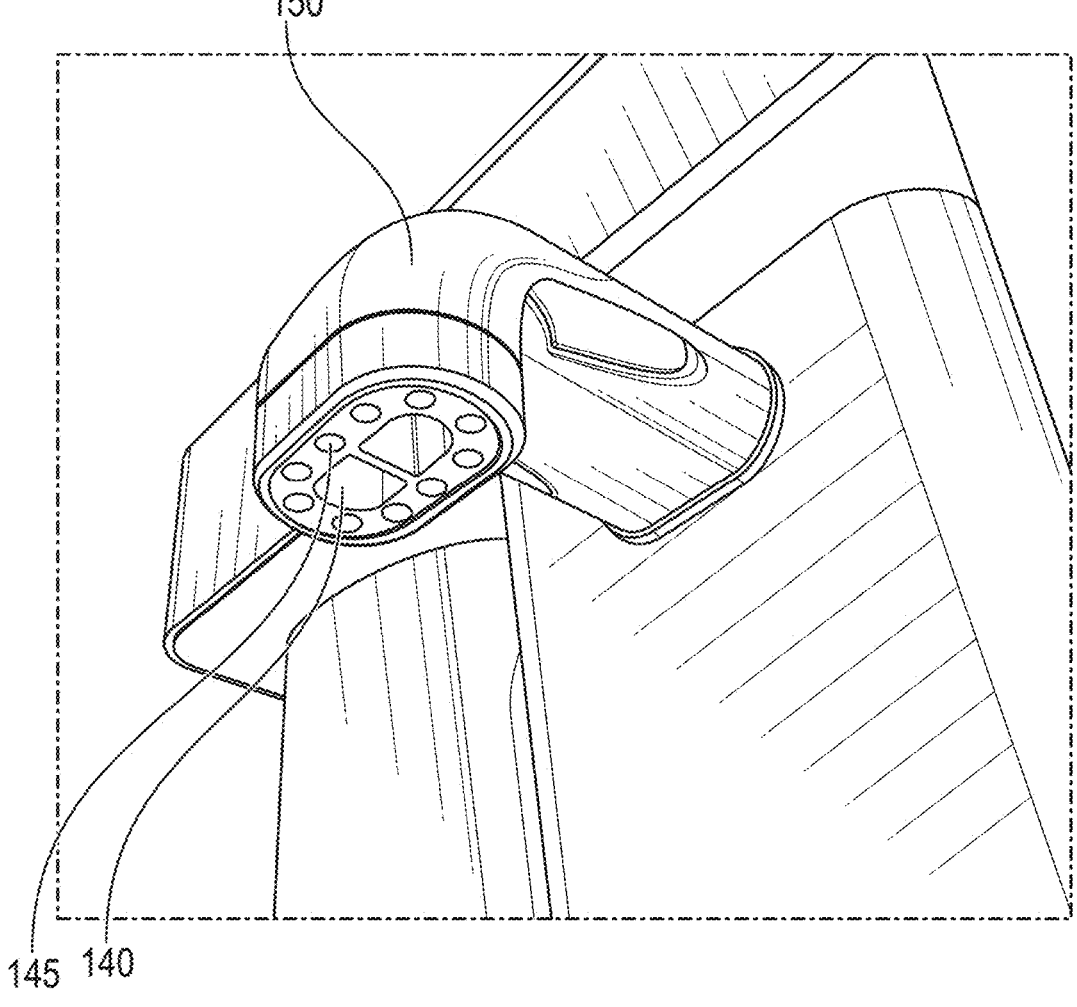
FIG. 31 illustrates a close-up perspective bottom view of a central dispenser spout of an automated dispensing system.

When the modular dispensing system 76 is connected to a motherboard or centralized processing unit (e.g., main controller 38), the modular dispensing system 76 can advantageously prepare any color drink via color or flavor concentrate cartridges 81 of any or all of the primary colors or most common coffee or tea beverage colors. Additionally, endless flavor mixing profiles are possible when connected to the motherboard or centralized processing unit (e.g., main controller 38). The flavors are dispensed simultaneously and dispense at a single point (e.g., a central dispenser spout 150), as shown in FIG. 31. The central dispenser spout 150 may be fluidically coupled to one or more of the dispenser modules, or modular dispensers. As shown, the central dispenser spout 150 may include multiple outlet orifices to facilitate simultaneous delivery of ingredients or modifiers (e.g., syrups, sauces, flavors, color concentrates, sweeteners) along with a base beverage. Larger central outlets 140 may facilitate delivery of the base beverage (including water) into a cup or other vessel and smaller outer outlets 145 may facilitate delivery of the ingredients or modifiers. As one example, smoked flavor plus caramel syrup may result in a customized smoked caramel coffee beverage. The modular dispensing system 76 may incorporate any or all of the structural and functional components and features of the dispensing systems 9 described herein, and vice-versa.

Figure 32:
FIG. 32 schematically illustrates operation of a granular cleaning cartridge with a valve that can be used to facilitate cleaning of the dispenser modules of the automated dispensing system.
Figure 32:
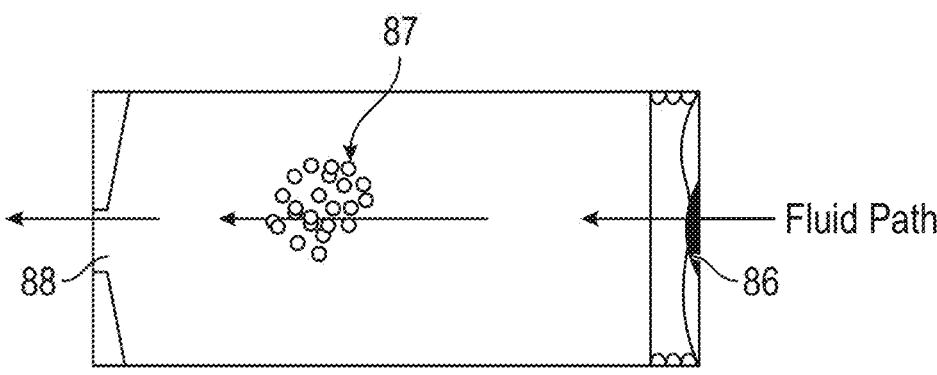
Figure 33:
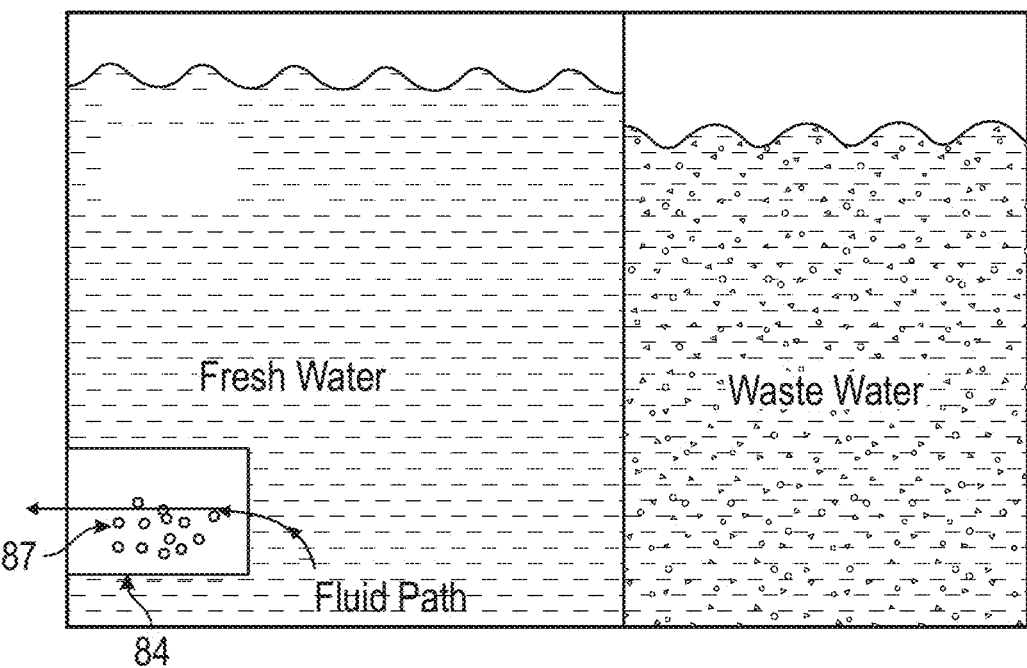
FIG. 33 illustrates an example implementation of a cleaning tray or cartridge that can be inserted into a dispenser module to facilitate cleaning.
Figure 34:
FIG. 34 schematically illustrates a cleaning operation that may include a cleaning cycle, a rinse cycle and a drying cycle.

FIGS. 32-34 schematically illustrate cleaning configurations or implementations of the automated modular dispensing systems 9, 76. With reference to FIGS. 32 and 33, the dispensing systems 9, 76 may be cleaned using an automated process utilizing a granular cleaning cartridge 84 (schematically illustrated in FIG. 32) and a designated cleaning tray 85 (schematically illustrated in FIG. 33). The granular cleaning cartridge 84 is refillable and includes a one-way fluid flow path as illustrated. The granular cleaning cartridge 84 includes a one-way inlet valve 86 at an inlet end of the granular cleaning cartridge 84. An outlet end of the granular cleaning cartridge 84 may include a female fitment 88 for a male probe or tubing fitment/connector to transport cleaning solution out of the granular cleaning cartridge 84 and through tubing or supply lines of the pumping assembly and then out the dispenser spout 21. Granular cleaning product 87 may be inserted within the granular cleaning cartridge 84. The granular cleaning product 87 may be concentrated as required and/or desired by a unit volume and/or sanitation target.

Turning to FIG. 33, the designated cleaning trays 85 may comprise a two-compartment system or unit, with one compartment or chamber for clean (or fresh) water and one compartment or chamber for waste water. The two compartments or chambers may be physically and fluidically isolated from each other to avoid contamination. The granular cleaning cartridge 84 is configured to be positioned inside the clean water compartment or chamber of the cleaning tray 85. The granular cleaning cartridge 84 may be mechanically coupled to an outlet mechanism of the cleaning tray 85.

The cleaning trays 85 may be sized and adapted to be inserted after removal of an ingredient tray 22 from a modular dispenser 45. When the cleaning trays 85 are correctly inserted into the modular dispenser 45, a sensor and/or switch of the modular dispenser 45 may recognize or detect the cleaning tray 85 as a unique or dedicated cleaning tray instead of an ingredient tray 22 to prevent a barista from accidentally serving cleaner to a customer. The sensor and/or switch may also trigger a "clean mode" activation option on the display screen of the dispenser module. With one touch press of button (e.g., user input device 20), a barista may turn on, or activate, cleaning.

FIG. 34 schematically illustrates an embodiment of a cleaning cycle using the granular cleaning cartridge 84 positioned in a designated cleaning tray 85. The cleaning cycle starts with all of the water in the fresh water compartment or chamber. As the cleaning cycle proceeds, enough fresh, clean water may flow through the granular cleaning cartridge 84 (which includes the granular cleaning product 87) to create a desired cleaning solution and then into the modular dispenser unit 45 (e.g., through the pump and tubing (e.g., supply lines) of the pump assembly) for cleaning. The fluid then exits the dispenser spout 21 of the modular dispenser 45 and into the waste water compartment or chamber of the cleaning tray 85. After a certain period of time (e.g., after about 50% of the fresh water in the fresh water compartment chamber has been drained out), the granular cleaning product 87 is depleted and any remaining fresh, clean water may flow through the modular dispenser unit 45 as part of a rinsing cycle (as shown in the middle figure of FIG. 34). Eventually, all the liquid may end up in the waste water compartment or chamber of the cleaning tray 85 (as shown at the bottom of FIG. 34), which triggers an end of a cleaning cycle and a beginning of a dry cycle. A barista may then be prompted (e.g., via a textual prompt or graphical icon on the display or via an indicator light) to remove the cleaning tray 85 and replace it with a new ingredient tank 22.

In some cases, a customer may want to customize the color of a beverage. Further, the customer may want to customize the color of individual layers of the beverage. In traditional systems, the customer may be limited to selecting a beverage with a predetermined color. For example, the customer may be limited to selecting iced coffee with a dark brown color. In some cases, the customer may not be provided an indication of the color of the beverage. Instead, a system may provide the customer with only a general description of the beverage. It may be disadvantageous for the system to not provide a customer with multiple color options for the customer to select a particular color of the beverage. This is inherently problematic to the customer experience as customers want more customization with precise control.

In certain cases, a customer may indicate a desired color of the beverage. However, because the beverage may have a particular naturally occurring color and/or particular color ingredients may or may not be available, particular colors may not be available for particular beverages. Additionally, as the number of potential combinations of beverages (all or a portion of the beverages having different naturally occurring colors) and color ingredients (including different ratios of color ingredients) may be large (e.g., over 1,000 combinations), a user and/or a customer may be unable to efficiently manually determine the colors that are available for particular beverages. Further, it would be inefficient and time consuming for a system to manually determine colors for a beverage by conducting a piecemeal process to iteratively add different combinations of particular colors to a naturally occurring color of a beverage to identify color ingredients for a requested beverage color in response to a request from a customer. Further, when the manual process is completed, the available color ingredients may have changed. Therefore, such traditional systems may lead to inaccuracies. Further, the use of such traditional systems can increase memory demands and processing usage by computing devices due to the iterative process.

Some aspects of this disclosure address the problems noted above, among others by generating three-dimensional color maps and identifying color mappings from the three-dimensional color maps for a particular beverage color. A system can utilize the identified color mappings to generate instructions for producing a beverage with the particular beverage color. To generate the three-dimensional color maps, the system can obtain one or more color mappings for a beverage and/or a layer of a beverage. The color mappings may include previously generated color mappings (e.g., color mappings from a prior color map, manual color mappings, etc.). All or a portion of the color mappings can identify a particular color (e.g., a desired beverage color) and identify a ratio of one or more color ingredients used to create the particular color. The system can generate a three-dimensional color map for the beverage and/or a layer of the beverage based on the one or more color mappings. The three-dimensional color map may include the color mappings and additional color mappings. Further, the system can identify a desired beverage and a desired beverage color. For example, the system can obtain a data signal from a computing device (e.g., a customer computing device, a point of sale system, etc.) identifying the desired beverage and the desired beverage color. The system can obtain, from the three-dimensional color map, a particular color mapping for the desired beverage and the desired beverage color. Based on the particular color mapping, the system can identify a ratio of one or more color ingredients and generate and/or output an instruction set identifying the ratio of the one or more color ingredients.

Figure 35:
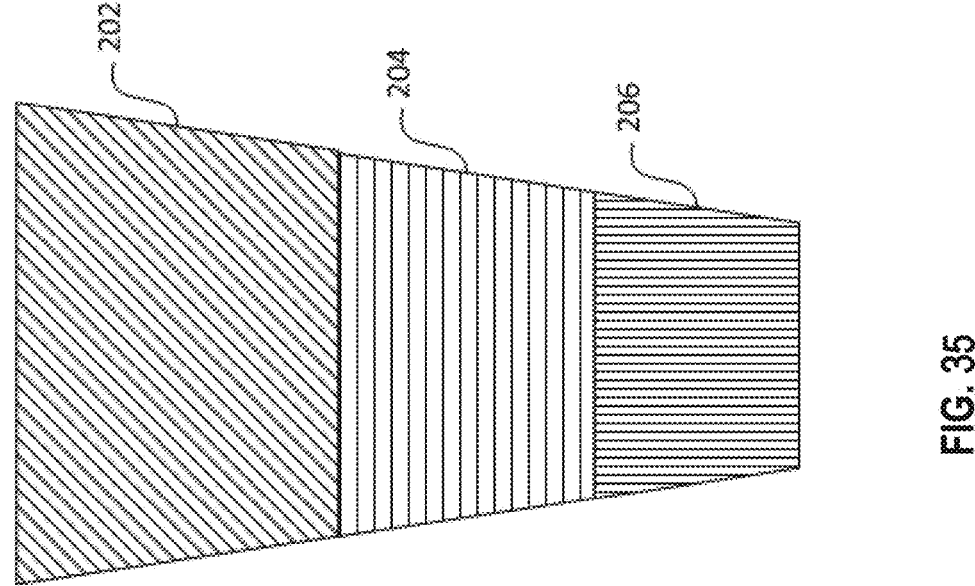
FIG. 35 illustrates an example beverage that may include a base, a modifier, and a topping.

FIG. 35 schematically illustrates an example of a customized beverage 200. The customized beverage 200 can include one or more components or layers. For example, the customized beverage 200 can include a base layer 202, an additive layer 204, and/or a topping layer 206. In some embodiments, the customized beverage 200 may not include one or more of the base layer 202, the additive layer 204, or the topping layer 206. The customized beverage 200 may include more, less, or different layers. For example, the customized beverage 200 may include a single layer.

As discussed above, the controller 38, 55 of the dispensing system 9 may execute stored program instructions to implement color customization of a beverage. The controller can be configured to control the dispensing system 9 to output recipes for preparing customized drinks of any color. The color customization recipes can be generated by a color customization system. The color customization system can be executed by the controller and/or a remote server to perform the color customization process. The controller can cause the color customization system to build the recipes based on a particular color for a particular beverage. For example, a customer computing device may select a particular color (e.g., from a set of available colors) and a particular beverage. In response, the color customization system can build a recipe and output the recipe (via a set of instructions). The color customization system can cause the recipe to be printed on a label and/or output the recipe to an automated ingredient dispenser to cause the automated ingredient dispenser to automatically build the drink. Therefore, the color customization system may be used to customize the color of the components for the customized beverage 200.

All or a portion of the layers or components of the customized beverage 200 may be individually customized based on customer preference. For example, all or a portion of the base layer 202, the additive layer 204, and/or the topping layer 206 may be customized with a particular color (e.g., the base layer 202 may have a first color, the additive layer 204 may have a second color, and the topping layer 206 may have a third color). In some embodiments, the base layer 202, the additive layer 204, and/or the topping layer 206 may have different colors. Further, all or a portion of the base layer 202, the additive layer 204, and/or the topping layer 206 may have different colors if not mixed together (e.g., a first color, a second color, a third color) and may have the same color if mixed together (e.g., a fourth color). In other embodiments, the base layer 202, the additive layer 204, and/or the topping layer 206 may have the same color.

A customer may designate a certain color pattern (e.g., scheme, arrangement, etc.) for the customized beverage 200 by specifying a color scheme for the customized beverage 200 and/or a color scheme for each component of the customized beverage 200. For example, the customer may request an iced coffee with an indigo color and/or a customer may request an iced coffee with an indigo base layer, a golden additive layer, and a silver toppings layer. The color customization system (or a separate system) may provide a customer computing device with an application. The customer computing device, via the application, may identify a particular color(s) (e.g., a color of the beverage, a color of one or more layers of the beverage, one or more colors of the mixed beverage, one or more colors of the unmixed beverage, etc.). For example, the customer computing device, via the application, may select color(s) from a color wheel, a color spectrum, etc., identify a color from an image (e.g., the application may utilize a camera of the customer computing device to capture an image and identify a color in the image), or otherwise indicate a color. The customer computing device may provide the color(s) to the color customization system and request the color customization system implement color customization for a beverage according to the provided color(s).

In some embodiments, the color of the customized beverage 200 may be obtained by combining (e.g., mixing) the components of the customized beverage 200. In some embodiments, the components of the customized beverage 200 may not be combined, and instead, the components of the customized beverage 200 may be layered. Further, the color customization system may provide instructions (e.g., by printing a label (e.g., instructions) that can be affixed to the beverage or provided with beverage, by transmitting and causing display of the instructions at a customer computing device, etc.) indicating that the beverage should or should not be combined to achieve a particular color customization.

The base layer 202 may include the base of the customized beverage 200 (e.g., the majority of the customized beverage 200). For example, the base layer 202 may include the majority of the weight of the customized beverage 200. Further, the base layer 202 may include a base beverage or base component. The base layer 202 may include any edible liquid or extract (e.g., a coffee, tea, water, juice, etc.). For example, the customized beverage 200 may be a customized iced coffee and the base beverage may be a base iced coffee. In some examples, the base layer 202 may include white coffee. For example, white coffee may be prepared using white coffee beans. White coffee beans may be roasted for less time and/or at a lower temperature than black coffee beans. Due to the less roasting time and/or the lower roasting temperature of the white coffee beans as compared to the black coffee beans, the white coffee beans may produce white coffee that have a lighter color as compared to black coffee. For example, white coffee may have a white color (e.g., a cloudy color, a milky color, etc.) The white color of the white coffee may enable a greater range of color customization as compared to black coffee (e.g., with a black or brown color). For example, the use of white coffee in the base layer may enable the color of the base layer to be customized to match any color in a range of colors (e.g., from a black color to a white color) while the use of black coffee in the base layer may enable the color of the base layer to be customized to match a subset of the range of colors (e.g., from a black color to a tan color). Further, the use of white coffee may enable the color of a particular layer to be customized using less color ingredients as compared to black coffee. Therefore, the use of white coffee can enable a greater color customization as compared to black coffee. Therefore, the base layer 202 may include the base beverage for the customized beverage 200.

The additive layer 204 may include additives or modifiers to the base beverage. Each of the additives or modifiers may add flavor and/or texture to the beverage. The additive layer 204 may include any edible liquid or extract. For example, the additive layer 204 may include water, full fat milk, low fat milk, carbonated water, lemonade, etc. In some embodiments, the base layer 202 and the additive layer 204 may be mixed together such that the color of the base layer 202 and the color of the additive layer 204 combine to generate a desired color of the customized beverage 200. In other embodiments, the base layer 202 and the additive layer 204 may not be mixed together and each of the base layer 202 and the additive layer 204 may have a different desired color of the customized beverage 200.

The toppings layer 206 may include toppings to the base layer 202 and/or the additive layer 204. For example, the toppings layer 206 may include edible foams, creams, fruit pieces, fruit powders, whipped cream, milk foam, freeze dried strawberry, cinnamon powder, caramel sauce, chocolate, etc. The color and/or visual appearance of the customized beverage 200 may be modified by adding different color ingredients to one or more of the base layer 202, the additive layer 204, and/or the toppings layer 206. Further, the color of the customized beverage 200 may be based at least in part on a naturally occurring color of the base layer 202, the additive layer 204, and/or the toppings layer 206.

Each of the base layer 202, the additive layer 204, and/or the toppings layer 206 may have a naturally occurring or an "as manufactured" color. For example, the base layer 202 may be coffee, and therefore, the base layer 202 may have a naturally occurring color (e.g., a brown/black color if using black coffee or a white color if using white coffee). Further, the additive layer 204 may be almond milk, and therefore, the additive layer 204 may have a different naturally occurring color (e.g., an off-white color). The color customization system can use the naturally occurring colors of each component of the customized beverage 200 to customize the color of the customized beverage 200 to particular desired colors (either the customized beverage 200 as a whole or individual components of the customized beverage 200). For example, the color customization system can identify a first set of color ingredients to add to white coffee to customize the color of the customized beverage 200 to a particular color and a second set of color ingredients to add to black coffee to customize the color of the customized beverage to the same particular color. Therefore, the color customization system may identify different color ingredients to customize a beverage to a particular color based on the naturally occurring color of the beverage and/or a naturally occurring color of a layer of the beverage.

The color customization system can receive a request for customizing a beverage using desired colors to generate the customized beverage 200. Further, in order to produce a customized beverage with a base layer of a first color, the color customization system may identify color ingredients to be added to the base layer in order to produce the first color from the naturally occurring color of the base layer. It will be understood that the color customization system, in identifying color ingredients to achieve a desired color, may also identify color ingredients to produce additional edible components with a desired color. For example, the system may identify color ingredients to produce a soup with the desired color.

Figure 36:
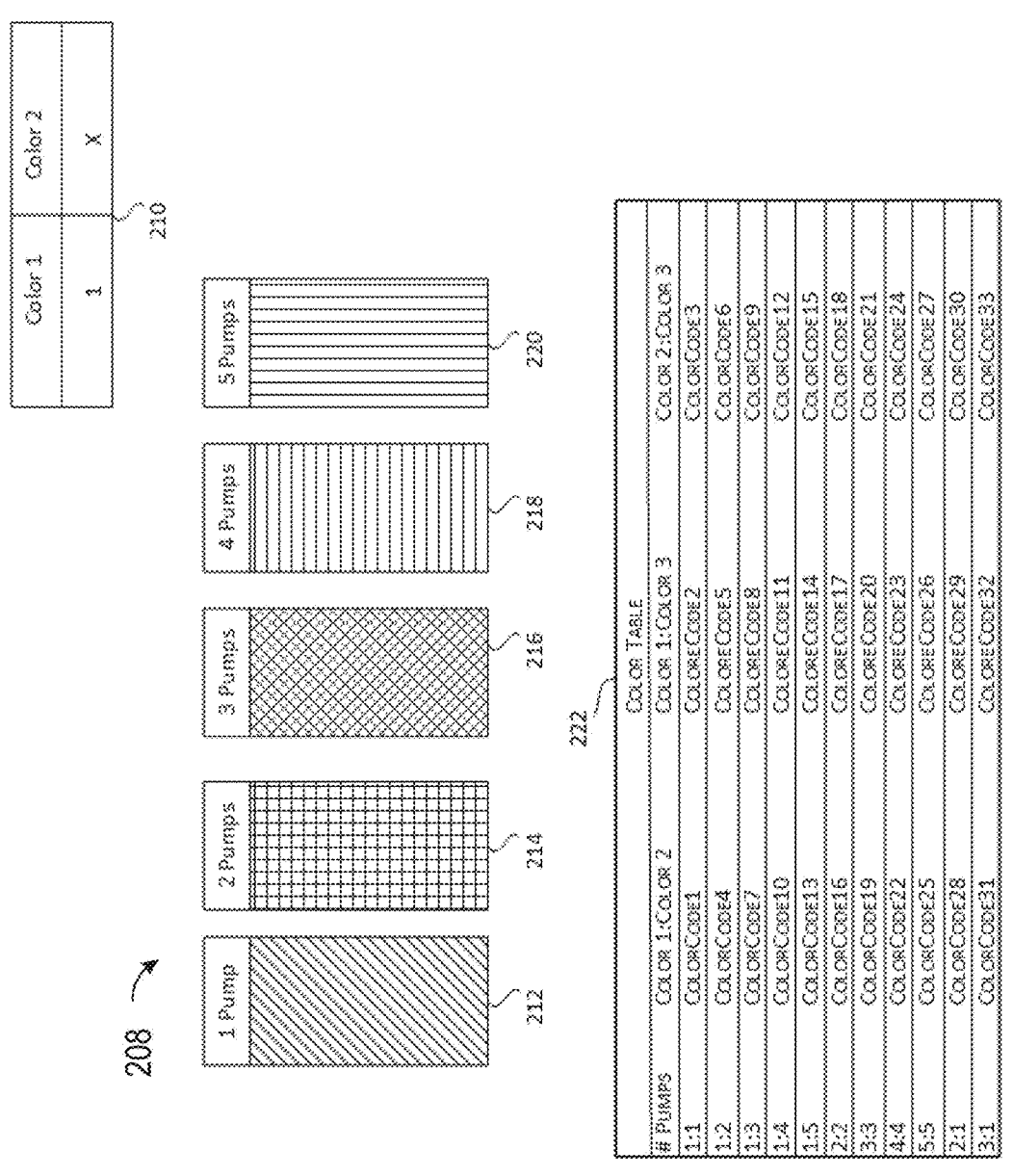
FIG. 36 illustrates various examples of color mappings linking various ratios of color ingredients to particular color codes.

FIG. 36 schematically illustrates example color mapping data for a particular beverage. The color mapping data may identify particular quantities or ratios of particular color ingredients and the resulting color of the customized beverage. For example, the color mapping data may identify a ratio of two or more color ingredients and a resulting color of the customized beverage. Further, the color mapping data may identify a plurality of quantities or ratios of various color ingredients and a plurality of resulting colors of the customized beverage.

The color mapping data may be received by the color customization system from a developer. For example, the color mapping data may be received via a customer computing device. The color mapping data may include color mapping data that is applicable to building one or more beverages. In some embodiments, the color mapping data may include color mapping data for a singular beverage. A customer may generate the color mapping data for one or more colors and one or more customized beverages by manually mixing the colors. The customer may then transmit the resulting color mapping data to the color customization system. In some embodiments, the color customization system may build the color mapping data. For example, the color customization system may identify a set of color ingredients and associated colors. The color customization system may build the color mapping data based on the identified set of color ingredients and associated colors.

The color mapping data may identify example mappings of ratios of color ingredients for particular beverages. The color mapping data may identify a limited number of ratios.

For example, the color mapping data may identify resulting beverage colors for whole number ratios of color ingredients (e.g., the color mapping data may identify a resulting customized color of the beverage fora 1:1, 1:2, 2:1, 2:2, 3:1, 3:2, 3:3, 2:3, 1:3, etc. ratio of a first color and a second color). While the color mapping data may identify a mapping of particular colors ingredients to particular colors, the color mapping data may not identify a mapping of color ingredients for every potential color for a beverage and may be limited due to the manual nature of the collection of the color mapping data.

In the example of FIG. 36, the color mapping data 208 identifies potential colors mappings for a particular beverage. The color mapping data 208 contains a limited number of mappings of color ingredients to beverage colors. It will be understood that the color mapping data 208 may include more, less, or different color mappings.

The color mapping data 208 may include a color ingredient ratio 210. The color ingredient ratio 210 may identify a ratio of one or more color ingredients. The color ingredient ratio 210 identifies that the ratio of color ingredient 1 with color 1 to color ingredient 2 with color 2 is variable based on the amount of the color ingredient 2. For example, the color ingredient ratio 210 may identify that the ratio between color ingredient 1 and color ingredient 2 is 1:X where X can be any number. The ratio between color ingredient 1 and color ingredient 2 may correspond to standard measurements units (e.g., servings, pumps, scoops, cups, tablespoons, milliliters, ounces, or any other measurement unit). For example, the color ingredient ratio 210 may identify that the ratio is for each measurement of color ingredient 1, X measurements of color ingredient 2 are to be used. In the example of FIG. 36, the color ingredient ratio 210 may correspond to pumps of color ingredient 1 and color ingredient 2.

Based on the color ingredient ratio 210, different ratios of the color ingredient 1 and the color ingredient 2 may be mapped (e.g., manually mapped by a user and/or a customer) to different beverage colors. For example, one pump of color ingredient 1 and one pump of color ingredient 2 may be mapped to beverage color 212; one pump of color ingredient 1 and two pumps of color ingredient 2 may be mapped to beverage color 214; one pump of color ingredient 1 and three pumps of color ingredient 2 may be mapped to beverage color 216; one pump of color ingredient 1 and four pumps of color ingredient 2 may be mapped to beverage color 218; and one pump of color ingredient 1 and five pumps of color ingredient 2 may be mapped to beverage color 220. It will be understood that more, less, or different color mappings may be mapped for color ingredient 1 and color ingredient 2. In some embodiments, the color customization system may identify a hexadecimal color code for a color that is mapped to particular ratios of color ingredients. For example, one pump of color ingredient 1 and five pumps of color ingredient 2 may be mapped to a hexadecimal color code that is representative of beverage color 220.

Color mapping data may be received for each component of a beverage (e.g., base layer 202, the additive layer 204, and/or the toppings layer 206). The color mapping data may be received for all or a portion of the potential combinations of color ingredients for the particular beverage component. It will be understood that the beverage component may include one or more layers of the beverage and/or the beverage. As a beverage component may have a particular naturally occurring color, the color mapping data may be particular to the particular beverage component. In some embodiments, some beverage components may have the same or similar naturally occurring colors and a portion or all of the color mapping data may be shared between the beverages. In the example of FIG. 36, the color table 222 is received for particular beverage components and may identify color mapping data for the beverage components. Color ingredient 1 with color 1, color ingredient 2 with color 2, and color ingredient 3 with color 3 may be available to be mixed with the beverage, and the color mapping data identified by the color table 222 may identify different combinations of each of the color ingredients. It will be understood that the color table 222 and the corresponding color mapping data may include more, less, or different color ingredients and/or more, less, or different combinations of color ingredients.

In the example of FIG. 36, the color table 222 identifies that a ratio of one pump of color ingredient 1 to one pump of color ingredient 2 produces a beverage color corresponding to colorcode1 for the beverage component, a ratio of one pump of color ingredient 1 to one pump of color ingredient 3 produces a beverage color corresponding to colorcode2 for the beverage component, a ratio of one pump of color ingredient 2 to one pump of color ingredient 3 produces a beverage color corresponding to colorcode3 for the beverage component, a ratio of one pump of color ingredient 1 to two pumps of color ingredient 2 produces a beverage color corresponding to colorcode4 for the beverage component, a ratio of one pump of color ingredient 1 to two pumps of color ingredient 3 produces a beverage color corresponding to colorcode5 for the beverage component, a ratio of one pump of color ingredient 2 to two pumps of color ingredient 3 produces a beverage color corresponding to colorcode6 for the beverage component, and so forth. The color table can include any number of manual combinations generated for the beverage component.

Figure 37:
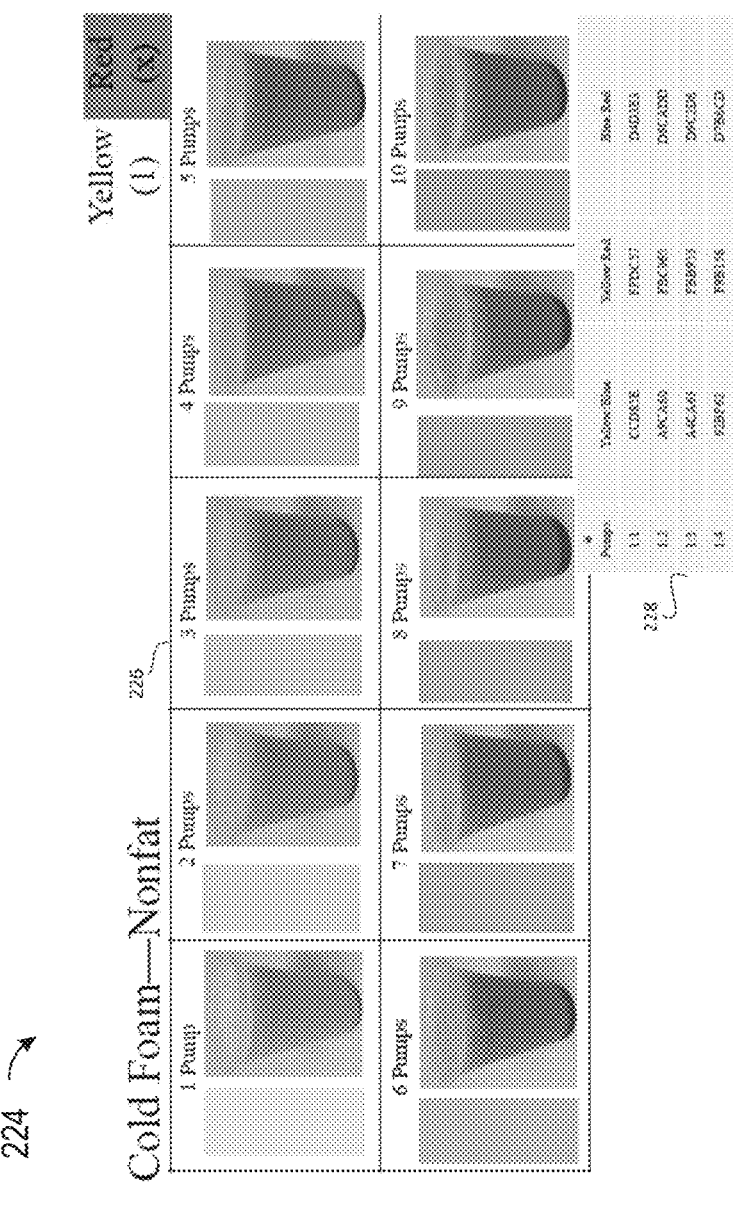
FIG. 37 illustrates a color mapping linking ratios of a yellow color ingredient and a red color ingredient to particular color codes.
Figure 38:
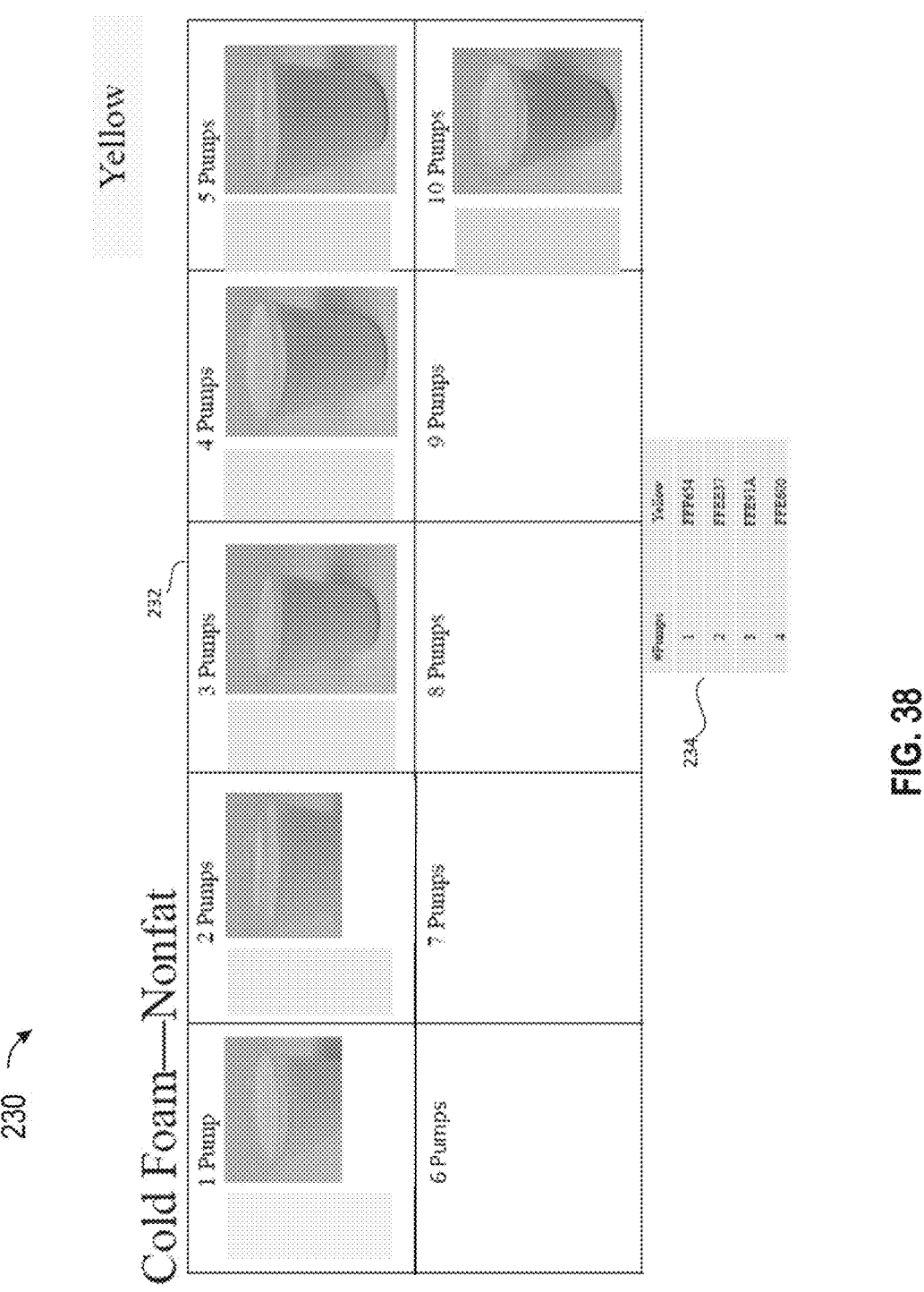
FIG. 38 illustrates a color mapping linking ratios of a yellow color ingredient to particular color codes.

FIGS. 37 and 38 schematically illustrate potential color mappings for different combinations of color ingredients for a component of a beverage and/or a beverage. The color mappings may identify color-mapping data for particular components of a particular beverage and/or for a particular beverage. In the example of FIGS. 37 and 38, the color mappings identify color mapping data for an additive layer (a cold foam—nonfat additive). The additive layer may further be combined with a base layer and/or a toppings layer to produce a beverage with a desired color profile (e.g., a particular beverage color or a particular combination of beverage colors). For example, a customer may request a particular desired color profile for the beverage.

Turning to FIG. 37, the color mapping data 224 identifies color mapping data for a cold foam—nonfat additive. The color mapping data 224 may identify different ratios of a yellow color ingredient and a red color ingredient. The color ingredient ratio may include one pump of the yellow color ingredient and x pumps of the red color ingredient, where x is variable and can be any number. The color mappings 226 map a first color of the cold foam for one pump of the yellow color ingredient and one pump of the red color ingredient, a second color for one pump of the yellow color ingredient and two pumps of the red color ingredient, a third color for one pump of the yellow color ingredient and three pumps of the red color ingredient, and so forth. Each color mapping of the color mappings 226 may visually indicate a color of a beverage (or a color of a layer of a beverage) based on a variation of the number of pumps of the red color ingredient. In the example of FIG. 37, the color mappings 226 may include a first color mapping that includes one pump of the yellow color ingredient and one pump of the red color ingredient and visually indicates a corresponding beverage with a yellow color and a second color mapping that includes one pump of the yellow color ingredient and ten pumps of the red color ingredient and visually indicates a corresponding beverage with an orange color. In the example of FIG. 34, the color mappings 226 may include a range of colors from yellow to orange. Therefore, the color mappings 226 illustrated in FIG. 37 indicates beverages with a color that ranges from a yellow color to an orange color according to the number of pumps of the red color ingredient.

The color mappings 226 may be used to generate a color table 228 for each combination of particular color ingredients at different color ingredient ratios. The color table 228 may identify a particular beverage color for each ratio of particular color ingredients. The particular color may be identified by a hexadecimal format for identifying colors. In some embodiments, a different format may be used to identify each color. In the example of FIGS. 37 and 38, the particular colors may be measured by the red-green-blue values read by a spectrophotometer in a white booth that is converted into the hexadecimal format by combining values representing the amount of red, green, and blue in the particular color. The system may receive color mapping data that identifies a ratio of particular color ingredients and a resulting beverage color and may identify a resulting hexadecimal code in the hexadecimal format for identifying the resulting beverage color by measure the amount of red, green, and blue in the beverage color.

Turning to FIG. 38, the color mapping data 230 identifies additional color mapping data for the cold foam—nonfat additive. The color mapping data 230 may identify different quantities of a yellow color ingredient. The color ingredient ratio may include x pumps of the yellow color ingredient. The color mappings 232 map a first color of the cold foam for one pump of the yellow color ingredient, a second color for two pumps of the yellow color ingredient, a third color for three pumps of the yellow color ingredient, a fourth color for four pumps of the yellow color ingredient, a fifth color for five pumps of the yellow color ingredient, a sixth color for six pumps of the yellow color ingredient, a seventh color for seven pumps of the yellow color ingredient, an eighth color for eight pumps of the yellow color ingredient, a ninth color for nine pumps of the yellow color ingredient, and a tenth color for ten pumps of the yellow color ingredient. The color mappings 232 may be used to generate a color table 234 for each quantity of the yellow color ingredient mapped by a user and/or a customer. The color table 234 may identify a particular beverage color for each quantity of the yellow color ingredient.

Each color mapping of the color mappings 232 may visually indicate a color of a beverage (or a color of a layer of a beverage) based on a variation of the number of pumps of the red color ingredient. In the example of FIG. 38, the color mappings 232 may include a first color mapping that includes one pump of the yellow color ingredient and visually indicates a corresponding beverage with a yellow color and a second color mapping that includes ten pumps of the yellow color ingredient visually indicates a corresponding beverage with a yellow color. In the example of FIG. 38, the color mappings 232 may include a range of yellow colors. Therefore, the color mappings 232 illustrated in FIG. 37 indicates beverages with a color that ranges from a first yellow color to a second yellow color according to the number of pumps of the yellow color ingredient.

Figure 39:
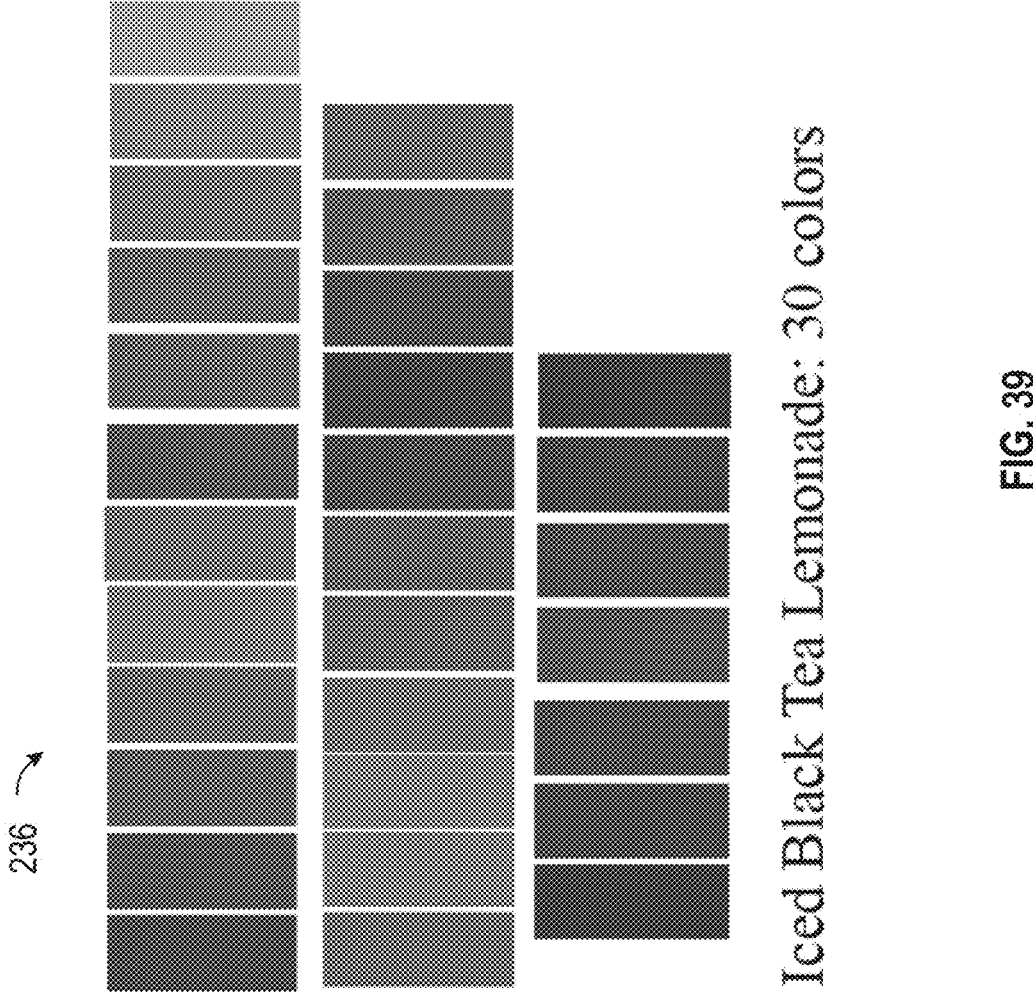
FIG. 39 illustrates potential colors for a beverage.
Figure 40:
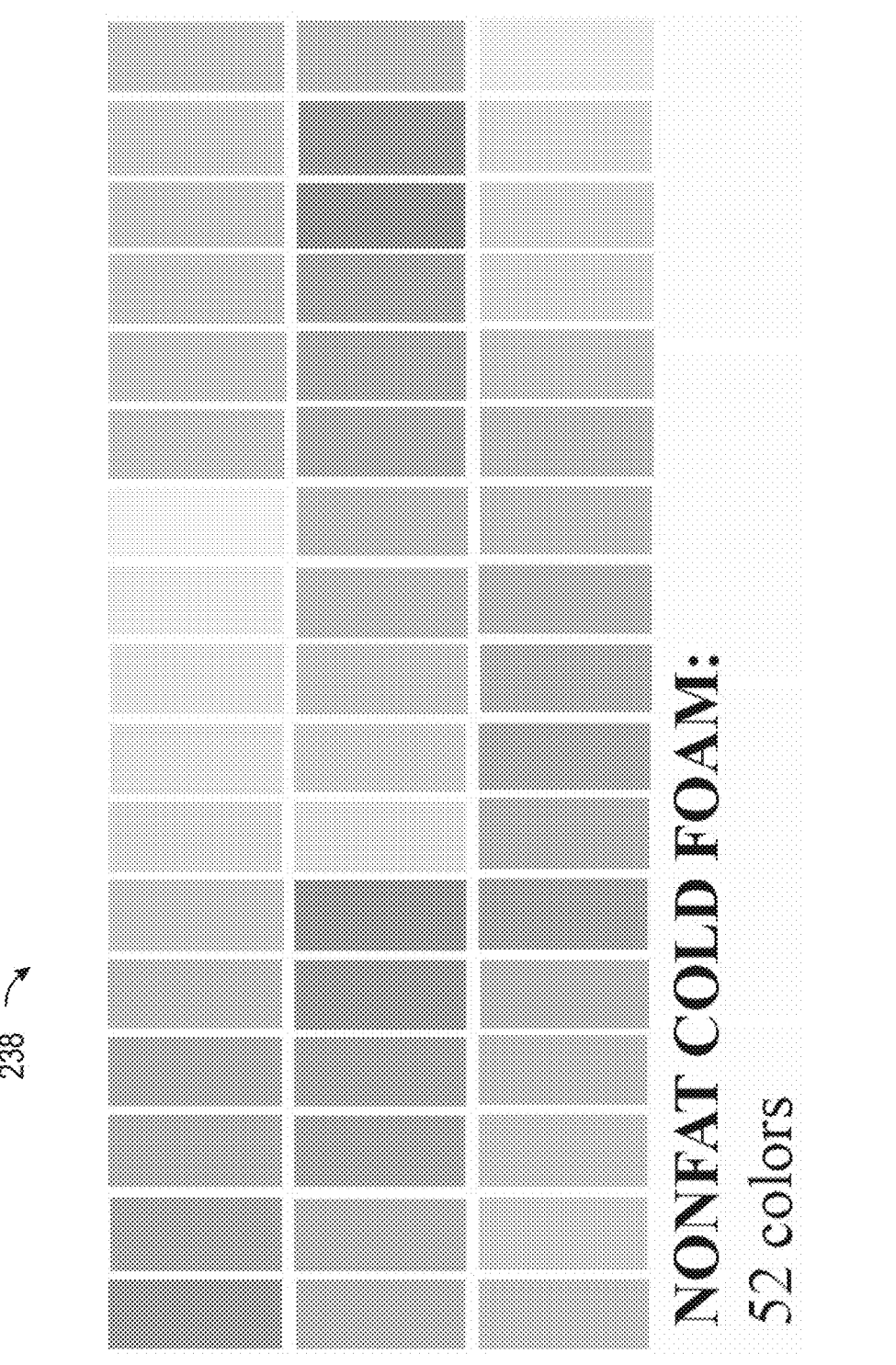
FIG. 40 illustrates potential colors for a beverage.

FIGS. 39 and 40 schematically illustrate an embodiment of beverage component color data identifying different beverage colors for particular beverage components, iced black tea lemonade and nonfat cold foam, respectively. The illustrated color mapping data may be generated for each beverage component (e.g., base, additive, topping, a beverage, etc.). Each beverage color may correspond to a different combination of different color ingredients at different color ingredient ratios. The different beverage colors may be based on the received color mapping data and may identify the beverage colors identified by the color mapping data. Further, the beverage color data may be based on the naturally occurring colors of the particular beverage. As each beverage may have naturally occurring colors (e.g., coffee may have a naturally occurring black or brown color), the beverage color data may be limited to a specific range or number of potential beverage colors. Therefore, the beverage color data may vary for each potential beverage.

In the example of FIG. 39, the beverage color data identifies 30 potential beverage colors for a beverage "iced black tea lemonade." Each potential beverage color may correspond to particular ratios of particular color ingredients and may be based on the naturally occurring colors of the "iced black tea lemonade." As illustrated in the example of FIG. 39, the 30 potential beverage colors include red colors, orange colors, green colors, yellow colors, blue colors, grey colors, and brown colors. In the example of FIG. 40, the beverage color data identifies 52 potential beverage colors for an additive "nonfat cold foam." Similarly, the potential beverage colors may correspond to particular ratios of particular color ingredients and may be based on the naturally occurring colors of the "nonfat cold foam." As illustrated in the example of FIG. 40, the 52 potential beverage colors include orange colors, yellow colors, green colors, blue colors, grey colors, and brown colors.

Figure 41:
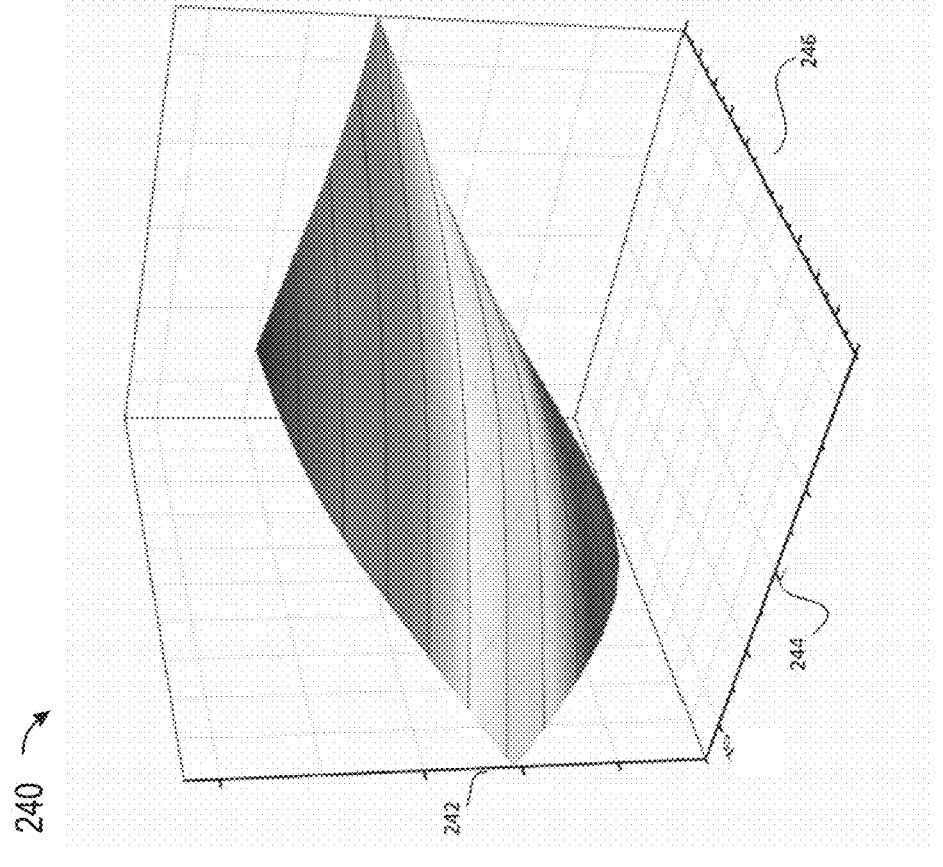
FIG. 41 illustrates an example three-dimensional color map identifying potential colors for a beverage.

FIG. 41 schematically illustrates an example three-dimensional color map 240 (e.g., a color response surface) for a particular beverage and/or a particular component of the beverage. The three-dimensional color map 240 may be particular to the naturally occurring color of the beverage or the beverage component. The color customization system may include multiple three-dimensional color maps that correspond to different beverages or different beverage components that have different naturally occurring colors.

The three-dimensional color map 240 may identify different potential colors for the beverage and/or the beverage component. Further, the three-dimensional color map 240 may identify one or map color ingredients to achieve each potential color. For example, the three-dimensional color map 240 may identify a first color ingredient corresponding to a first beverage color and a combination of the first color ingredient and a second color ingredient corresponding to a second beverage color. In some embodiments, the three-dimensional color map 240 may identify different color ingredient combinations for a particular color based on the naturally occurring color of the beverage component. Therefore, the color customization system may identify a particular combination of color ingredients based on the naturally occurring color of the beverage component.

The three-dimensional color map 240 may be generated based on color mapping data for multiple different color ingredients and multiple different combinations of the color ingredients (e.g., a first color ingredient and a second color ingredient, a first color ingredient and a third color ingredient, a fourth color ingredient, etc.). Three-dimensional color maps may be generated (by the color customization system or by a separate system) for each potential beverage, potential base layer, potential additive layer, and/or potential toppings layers. The three-dimensional color maps can be stored in a computer database in a local server and/or a remote server. For example, the computer database may be located in the point of sale system 54, a store server, dispensing equipment, a vending machine, etc.

The three-dimensional color map 240 may map potential colors based on first quantity of a red color 242, a second quantity of a green color 244, and a third quantity of a blue color 246. Each potential color may be mapped to the three-dimensional color map 240 based on the hexadecimal format for each color. The color customization system can receive the color mapping data and generate the three-dimensional color map 240 from the color mapping data. In some cases, the color mapping data may be manually generated.

The color customization system can extrapolate the color mapping data to identify additional color mapping data not included within the manually generated color mapping data. For example, the color customization system may process the color mapping data to identify that a first ratio of color ingredient 1 and color ingredient 2 (e.g., one pump of color ingredient 1 and one pump of color ingredient 2) results in color 1 and a second ratio of color ingredient 1 and color ingredient 2 (e.g., one pump of color ingredient 1 and two pumps of color ingredient 2) results in color 2. Further, the point of sale system may extrapolate this color mapping data to identify that a third ratio of color ingredient 1 and color ingredient 2 (e.g., one pump of color ingredient 1 and one and a half pumps of color ingredient 2) results in color 3. In some embodiments, the color customization system can extrapolate the color mapping data using a machine learning model, an algorithm (e.g., a computer modelling algorithm), etc. The color customization system can train a machine learning model to identify additional color mapping data from color mapping data using a training data set. The color mapping data may include a piecemeal distribution of color mappings and the color customization system may extrapolate the color mapping data to generate a continuous distribution of color mappings that includes the manual color mappings and predicted color mappings. Further, the color customization system may process the color mapping data to identify boundaries of the color mapping (e.g., whole number ratios of the color ingredients) and may extrapolate the color mapping data to predict additional color mapping data to fill the area between the boundaries of the color mapping data (e.g., partial number ratios of the color ingredients). Therefore, the three-dimensional color map 240 may utilize the color mapping data to identify potential beverage colors for a beverage based on obtained color mappings and predicted color mappings. The three-dimensional color map 240 may be stored in association with an identifier of a particular beverage or a particular beverage component.

The color customization system may generate the three-dimensional color map 240 and store the three-dimensional color map 240 in a server (e.g., a local server, a remote server), A plurality of color customization systems (or a plurality of instances of the color customization system) may access the three-dimensional color map 240 and utilize the three-dimensional color map 240 to identify color ingredients for a beverage without separately generating the three-dimensional color map 240.

In some embodiments, when ordering a beverage, a customer may be provided with different color options identified by the three-dimensional color map 240. The customer may select a color for all or a portion of the beverage, the base layer, the additive layer, the toppings layer, etc. via a mobile terminal, a customer computing device, color menu cards, etc. The color customization system may receive the color in the hexadecimal format, and based on the corresponding hexadecimal code, the color customization system may access the three-dimensional color map 240 and identify a color corresponding to the hexadecimal code.

In response to identifying the color(s) for the beverage, the color customization system can automatically generate instructions to produce a beverage having the requested colors. The instructions can identify an amount or ratio of color ingredients for the beverage. The color customization system can route the instructions to a separate system (e.g., a printing system) and the cause the system to print the instructions for creating the beverage on a label for the beverage. Further, the color customization system can route all or a portion of the instructions to the ingredient dispenser (e.g., an automated ingredient dispenser) for automatic dispensing of the ingredients at the particular quantities to build a beverage with the particular color. Therefore, the color customization system can route the instructions to an automated device, a robot, etc. and cause the automated device, the robot, etc. to prepare the beverage.

In some embodiments, after the beverage is prepared, the beverage color may be compared with the desired color. Further, the three-dimensional color map 240 may be updated (e.g., automatically) based on this comparison or feedback. In some embodiments, a percentage of color matching between the beverage color and the desired color may be compared to a threshold value (e.g., 90%, 95%, etc.). If the percentage of color matching does not exceed and/or meet the threshold value, the beverage may be denied and the system may request that the beverage may be remade. If the percentage of color matching does exceed and/or meet the threshold value, the beverage may be accepted.

In some embodiments, a customer may provide a particular desired beverage color. For example, the customer may identify a particular color for the beverage. Further, the customer may identify the desired color from an image provided by the customer (e.g., a picture of another beverage) or any other item (e.g., the customer may request a beverage that matches the color of a particular clothing item). The color customization system may receive non-standardized information from the customer via a customer computing device. The color customization system can convert (e.g., standardize) the non-standardized information to generate and/or identify standardized information (e.g., a hexadecimal color code). Therefore, the color customization system may receive the color and identify a hexadecimal color code associated with the received color.

The color customization system may parse (e.g., filter) the three-dimensional color map 240 to determine if the desired color is mapped to the beverage based on the identified hexadecimal color code. If the desired color is mapped to the beverage, the color customization system may provide a confirmation and cause the beverage to be produced. If the desired color is not mapped to the beverage, the color customization system may provide the beverage with a color similar to the desired color or a color closest to the desired color based on the hexadecimal format. If there is not a match for the desired beverage color, the color customization system may identify similar beverage colors and allow the customer to select an alternate color. Further, the color customization system may provide an alternative beverage that can be produced with the desired color (based on three-dimensional color map of the alternative beverage). For example, the color customization may assign all or a portion of a plurality of beverages a respective value. The respective value may be based on the naturally occurring color (e.g., black, white, green, brown, etc.), flavor (e.g., dark coffee, light coffee, white coffee, matcha, pumpkin, strawberry, chai, blueberry, etc.), type and/or brewing process of the beverage (e.g., cold brew coffee, drip coffee, pour over coffee, espresso, smoothie, milkshake, lemonade based drink, etc.), etc. The respective value may be a value on a linear scale (e.g., a value from 1 to 10), a value on a two-dimensional graph (e.g., an x value from 1 to 10 and a y value from 1 to 10), a value on a three-dimensional graph (e.g., an x value from 1 to 10, a y value from 1 to 10, and a z value from 1 to 10), etc. In some embodiments, the respective value may include a numerical representation, an alphabetical representation, an alphanumerical representation, and/or a symbolical representation. To identify the alternative beverage, the color customization system can identify alternative beverages that are associated with a particular value that is within a particular proximity of the value of the beverage. For example, the beverage may have a value of 10 on a scale of 1 to 100 points and the color customization system may identify alternative beverages that are within one proximity point of the value of the beverage (e.g., beverages having of 9, 10, 11, or any value in between).

Figure 42:
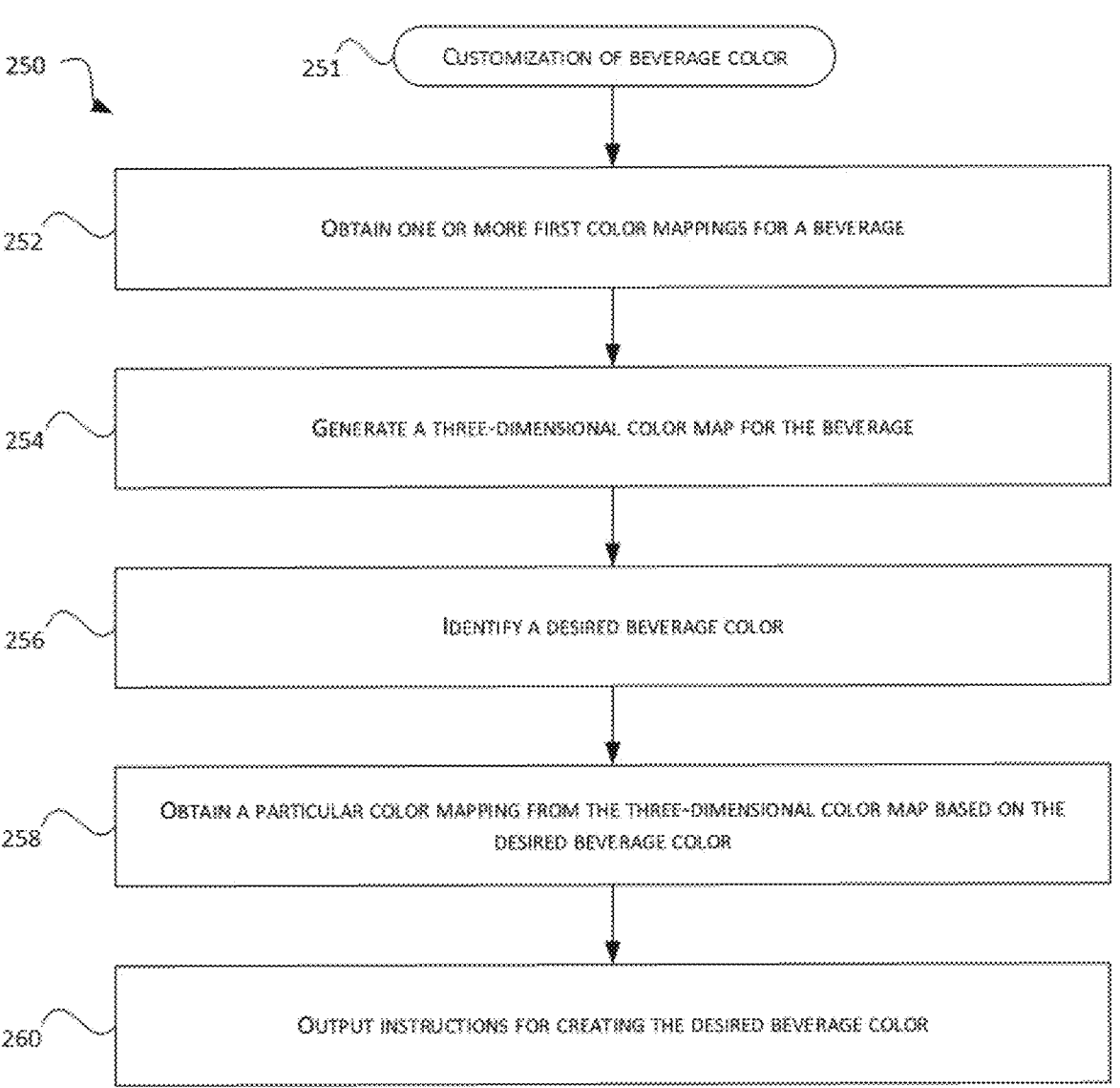
FIG. 42 shows a flow diagram of a process for automated customization of a beverage color.

FIG. 42 illustrates an embodiment of an example flowchart for a process 250 for identifying a color mapping to customize the color of an edible mixture (e.g., a beverage, a food item, etc.). The process 250 can be implemented by any system that can produce a three-dimensional color map for a beverage and recommend color mappings for a desired beverage color. For example, the process 250, in whole or in part, can be implemented by color customization system. The color customization system may be implemented, in whole or in part, on an application on a customer computing device or on a point of sale system, and further include one or more processors. Although any number of systems, in whole or in part, can implement the process 250, to simplify discussion, the process 250 will be described with respect to particular systems. Further, although embodiments of the process 250 may be performed with respect to variations of systems to simplify discussion, the process 250 will be described with respect to a particular color customization system.

At block 252, the color customization system can obtain one or more first color mappings for a beverage and/or beverage components. The mapping may be for a beverage as a whole, including one or more beverage components (e.g., a base, a modifier, and/or a topping) or may include individual mappings for each beverage component. The color customization system can obtain color mapping data for a plurality of beverages and/or beverage components. For example, the color customization system may have color mappings for all or a portion of the beverage components offered for sale. Each color mapping provides a set of color mapping data that identifies a plurality of potential colors for the beverage and/or beverage components. The color matching data provides information on how to create the identified colors using defined color ingredients. For example, each of the one or more color mappings may link a ratio of one or more color ingredients to a particular color of a plurality of potential colors. Further, each of the one or more color mappings may link different ratios of different color ingredients to particular colors. In some embodiments, the color ingredients could be red, green, and yellow ingredients that are used to color the beverage component. In some embodiments, each color identified in the color mapping corresponds to a particular hexadecimal color code.

At block 254, the color customization system can generate a three-dimensional color map for the beverage and/or beverage components. based on the one or more first color mappings obtained at block 252. The color customization system can extrapolate the color mapping data to identify additional color mapping data not included within the manually generated color mapping data. The one or more color mappings may be based on a base color or naturally occurring color of the beverage or a layer of the beverage. In some embodiments, the one or more color ingredients may include one or more edible color ingredients. Further, the three-dimensional color map may identify the plurality of a potential colors not included in the original color mapping data and/or different combinations for the same colors. For example, a color may be able to be created using different combinations of color ingredients. The color customization system may further generate three-dimensional color maps for all or a portion of the plurality of beverages and/or beverage components. The color customization system may store the three-dimensional map in a computing device of a local server, a remote server, or other computing system (e.g., a point of sale system, a store server, dispensing equipment, or a vending machine).

At block 256, the point of sale system can identify the desired beverage color. The desired beverage color may include a desired beverage color, a desired base color, a desired additive or modifier color, and/or a desired toppings color. The color customization system may obtain information identifying the desired beverage color from a customer computing device. The color customization system may further identify a particular desired beverage associated with the desired beverage color. For example, the color customization system may receive a data signal from the customer computing device identifying a particular beverage and the desired beverage color for the beverage. In order to identify the desired beverage color, the color customization system may cause the customer computing device to display information identifying the plurality of potential colors for an identified beverage.

At block 258, the color customization system can obtain a particular color mapping from the three-dimensional color map based on the desired beverage color. The particular color mapping may further be based on the plurality of potential colors and/or a desired beverage. In some embodiments, the color customization system may determine that multiple color mappings correspond to the desired beverage color and select the particular color mapping from the multiple color mappings. For example, the color customization system may select the color mapping that utilizes the least quantity, amount, etc. of color ingredients as compared to other color mappings that correspond to the desired beverage color.

At block 260, the color customization system can output instructions to create the desired beverage color for the beverage. The instructions may identify a particular ratio of the one or more color ingredients from the particular color mapping identified for the beverage. The color customization system may output the instructions by printing a label identifying the steps for creating the beverage with the identified color(s) and/or transmitting the instructions to an automated ingredient dispenser to dispense (e.g., automatically) the one or more color ingredients to produce the beverage based on the particular ratio of the one or more color ingredients. The point of sale system may receive feedback identifying the beverage color of the beverage and may compare the beverage color to the desired beverage color. Based on this comparison, the point of sale system can update the three-dimensional color map.

In some embodiments, the color customization system is implemented for use in an application installed on a customer computing device, such as an app on a smart phone or a kiosk at a dispensing location. In such an embodiment, the application can have a customer interface that provides functionality for a customer to create a color customized beverage on a beverage ordering application. In an illustrative embodiment, the customer may select a type of beverage. After the beverage has been selected, the customer may be given options for color customization of the beverage. The selected beverage may have one or more beverage components that can be color customized. Different beverage types may allow for the customer to customize different beverage components. For example, a customer may be able to customize the color for each beverage component, such as a base layer, an additive layer, and/or a topping layer.

The application may provide the customer with various options for customizing the beverage. For example, when a customer selects a beverage component that is to be customized, the customer can receive a different interface that allows for the customer to select the specific color. The interface may be a customized interface. For example, the interface may be customized based on the selected beverage component and may identify the particular beverage colors that are available for the selected beverage component. The interface may include one or more options for selecting a color of the beverage component. One option provides a palette of colors from the which the customer can select a specific color. The colors available for a specific beverage component are based on the individual color mapping associated with the selected beverage component. Alternatively, the interface my provide an option for the customer to upload an image or use the camera of the customer device to take a photo of a desired color. For example, the customer could take a picture of their clothing and request a color for the beverage that matches the color of the clothing. The interface may provide a tool that allows the customer to select a specific color within the image (e.g., an eyedropper tool).

In instances where the customer is inputting a new color, the application can use the color customization system to determine a match for the requested new color. The color customization system can attempt to match the requested color with a color from the three-dimensional color map associated with beverage component. If the requested color does not match the colors of the three-dimensional color map, the application can inform the customer that there is not a match for the requested color. In some embodiments, the color customization system can identify one or more colors that are close to the requested color. In some embodiments, the color customization system may identify a different beverage component that can provide a better match for the color, or in some instances, an entirely different beverage that matches the requested color provided by the customer.

In some embodiments, the application may additionally provide recommended colors for the beverage. The color customization system can determine associated data, identify particular colors, and transmit the recommended colors for display via the application. The recommended colors may be based on a variety of factors, such as the day of the week, time of day, weather, holidays, or colors that are popular in the area. The application may provide a color recommendation based on the location of the beverage dispenser. For example, if the dispenser is located within a sports venue, the recommended color configuration is based on the colors of the teams playing.

Although certain embodiments have been described herein in connection with flavors, sauces, or syrups for coffee or tea beverages, the systems described herein can be used for any type of ingredient or food product. For example, in some embodiments, the systems herein can be used to produce fluid or solid ingredients, such as ketchup, mustard, barbecue sauce, cheese sauce, relish, onions, etc. In some embodiments, the systems herein can be used to produce other types of beverages such as sodas, juices, smoothies, milkshakes, etc.

Conditional language used herein, such as, among others, "can," "might," "may," "e.g.," and the like, unless specifically stated otherwise, or otherwise understood within the context as used, is generally intended to convey that some embodiments include, while other embodiments do not include, certain features, elements, and/or states. Thus, such conditional language is not generally intended to imply that features, elements, blocks, and/or states are in any way required for one or more embodiments or that one or more embodiments necessarily include logic for deciding, with or without author input or prompting, whether these features, elements and/or states are included or are to be performed in any particular embodiment.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently.

The various illustrative logical blocks, modular dispensers, routines, and algorithm steps described in connection with the embodiments disclosed herein can be implemented as electronic hardware, computer software, or combinations of both. To clearly illustrate this interchangeability of hardware and software, various illustrative components, blocks, modular dispensers, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modular dispensers described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

While the above detailed description has shown, described, and pointed out novel features as applied to various embodiments, it can be understood that various omissions, substitutions, and changes in the form and details of the devices or algorithms illustrated can be made without departing from the spirit of the disclosure. For example, although different numbers have been used for similar components or features in different figures (e.g., different numbers have been used for the dispenser modules, displays, controllers, etc.), the structural and functional features described in connection with one figure, embodiment, or numbered element may be incorporated into the different-numbered components or features, and vice-versa. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

Various example embodiments of the disclosure can be described by the following clauses:

Clause 1: A system to customize beverage colors, the system comprising:

one or more processors; and a computer-readable storage medium including machine-readable instructions that, when executed by the one or more processors, cause the one or more processors to:

obtain one or more first color mappings for a beverage component, each color mapping of the one or more first color mappings identifying a particular color and identifying a ratio of one or more color ingredients used to create the particular color;

generate a three-dimensional color map for the beverage component based on the one or more first color mappings, the three-dimensional color map comprising a plurality of potential beverage component colors, the three-dimensional color map comprising the one or more first color mappings and one or more second color mappings, the one or more second color mappings identifying a plurality of colors not included within the one or more first color mappings;

identify a desired beverage component color;

obtain, from the three-dimensional color map, a particular color mapping for the desired beverage component color based on the plurality of potential beverage component colors; and output an instruction set, the instruction set identifying a particular ratio of the one or more color ingredients corresponding to the particular color mapping for the desired beverage component color.

Clause 2: The system of Clause 1, wherein the one or more color ingredients comprise one or more edible color ingredients.

Clause 3: The system of Clause 1 or Clause 2, wherein to identify the desired beverage component color, execution of the machine-readable instructions causes the one or more processors to receive the desired beverage component color from a customer computing device.

Clause 4: The system of any one of Clauses 1 through 3, wherein execution of the machine-readable instructions further causes the one or more processors to:

for each beverage component of a plurality of beverage components, obtain one or more associated first color mappings; and generate an associated three-dimensional color map.

Clause 5: The system of any one of Clauses 1 through 4, wherein execution of the machine-readable instructions further causes the one or more processors to:

obtain, for each beverage component of a plurality of beverage components, one or more associated first color mappings; and generate, for each beverage component of a plurality of beverage components, an associated three-dimensional color map;

wherein to identify the desired beverage component color, execution of the machine-readable instructions causes the one or more processors to identify a particular beverage component of the plurality of beverage components and the desired beverage component color of the particular beverage component, and wherein to obtain, from the three-dimensional color map, the particular color mapping for the desired beverage component color, the execution of the machine-readable instructions causes the one or more processors to identify the three-dimensional color map based on the particular beverage component.

Clause 6: The system of any one of Clauses 1 through 5, wherein execution of the machine-readable instructions further causes the one or more processors to cause display of information identifying the plurality of potential beverage component colors on a customer computing device.

Clause 7: The system of any one of Clauses 1 through 6, wherein execution of the machine-readable instructions further causes the one or more processors to obtain feedback identifying a beverage component color of the beverage component.

Clause 8: The system of any one of Clauses 1 through 7, wherein execution of the machine-readable instructions further causes the one or more processors to:
obtain feedback identifying a beverage component color of the beverage component;
compare the beverage component color of the beverage component to the desired beverage component color; and
adjust the three-dimensional color map based on comparing the beverage component color of the beverage component to the desired beverage component color.

Clause 9: The system of any one of Clauses 1 through 8, wherein each color mapping of the one or more first color mappings and the one or more second color mappings further corresponds to a particular hexadecimal color code.

Clause 10: The system of any one of Clauses 1 through 9, wherein a first color mapping of the one or more first color mappings links a first ratio of the one or more color ingredients to a first beverage component color of the plurality of potential beverage component colors and a second color mapping of the one or more second color mappings links a second ratio of the one or more color ingredients to a second beverage component color of the plurality of potential beverage component colors.

Clause 11: The system of any one of Clauses 1 through 10, wherein a first color mapping of the one or more first color mappings links a first ratio of a first color ingredient and a second color ingredient of the one or more color ingredients to a first beverage component color and a second color mapping of the one or more second color mappings links a second ratio of a third color ingredient and a fourth color ingredient of the one or more color ingredients to a second beverage component color.

Clause 12: The system of any one of Clauses 1 through 11, wherein a first color mapping of the one or more first color mappings and a second color mapping of the one or more second color mappings are associated with different color ingredients.

Clause 13: The system of any one of Clauses 1 through 12, wherein the beverage component comprises a base, a modifier, or a topping.

Clause 14: The system of any one of Clauses 1 through 13, wherein the beverage component comprises a base, a modifier, or a topping, wherein the desired beverage component color comprises a desired base color, a desired modifier color, or a desired topping color.

Clause 15: The system of any one of Clauses 1 through 14, wherein execution of the machine-readable instructions further causes the one or more processors to store the three-dimensional color map in a local server or a remote server.

Clause 16: The system of any one of Clauses 1 through 15, wherein execution of the machine-readable instructions further causes the one or more processors to store the three-dimensional color map in a computing device, wherein the computing device comprises a point of sale system, a store server, dispensing equipment, or a vending machine.

Clause 17: The system of any one of Clauses 1 through 16, wherein to output the instruction set, execution of the machine-readable instructions causes the one or more processors to transmit the instruction set to an automated ingredient dispenser, wherein the automated ingredient dispenser, in response to receiving the instruction set, dispenses the one or more color ingredients to produce the beverage component based on the particular ratio of the one or more color ingredients.

Clause 18: The system of any one of Clauses 1 through 17, wherein to output the instruction set, execution of the machine-readable instructions causes the one or more processors to print a label identifying the instruction set.

Clause 19: The system of any one of Clauses 1 through 18, wherein the three-dimensional color map is based on a base color of the beverage component.

Clause 20: The system of any one of Clauses 1 through 19, wherein execution of the machine-readable instructions further causes the one or more processors to determine a first color mapping and a second color mapping of the one or more first color mappings and the one or more second color mappings correspond to the desired beverage component color, wherein to obtain the particular color mapping, execution of the machine-readable instructions causes the one or more processors to select the first color mapping or the second color mapping.

Clause 21: A computer-implemented method comprising:
obtaining one or more first color mappings for an edible mixture, each color mapping of the first color mappings identifying a particular color and identifying a ratio of one or more edible ingredients used to create the particular color;
generating a three-dimensional color map for the edible mixture based on the one or more first color mappings, the three-dimensional color map comprising a plurality of potential colors, the three-dimensional color map comprising the one or more first color mappings and one or more second color mappings, the one or more second color mappings identifying a plurality of colors not included within the one or more first color mappings;
identifying a desired color;
obtaining, from the three-dimensional color map, a particular color mapping for the desired color based on the plurality of potential colors; and
providing an indication of the particular color mapping, the particular color mapping associated with a particular ratio of the one or more edible ingredients.

Clause 22: The method of Clause 21, wherein the one or more edible ingredients comprise one or more edible color ingredients.

Clause 23: The method of Clause 21 or Clause 22, wherein the edible mixture comprises a beverage or a food item.

Clause 24: The method of any one of Clauses 21 through 23, wherein identifying the desired color comprises receiving the desired color from a customer computing device.

Clause 25: The method of any one of Clauses 21 through 24, further comprising, for each edible mixture of a plurality of edible mixtures:
obtaining one or more associated first color mappings; and
generating an associated three-dimensional color map.

Clause 26: The method of any one of Clauses 21 through 25, further comprising:
obtaining, for each edible mixture of a plurality of edible mixtures, one or more associated first color mappings; and
generating, for each edible mixture of a plurality of edible mixtures, an associated three-dimensional color map;

wherein identifying the desired color comprises identifying a particular edible mixture of the plurality of edible mixtures and the desired color of the particular edible mixture, and wherein obtaining the particular color mapping, comprises identifying the three-dimensional color map based on the particular edible mixture.

Clause 27: The method of any one of Clauses 21 through 26, further comprising causing display of information identifying the plurality of potential colors on a customer computing device.

Clause 28: The method of any one of Clauses 21 through 27, further comprising obtaining feedback identifying a color of the edible mixture.

Clause 29: The method of any one of Clauses 21 through 28, further comprising:

obtaining feedback identifying a color of the edible mixture;

comparing the color of the edible mixture to the desired color; and adjusting the three-dimensional color map based on comparing the color of the edible mixture to the desired color.

Clause 30: The method of any one of Clauses 21 through 29, wherein each color mapping of the one or more first color mappings and the one or more second color mappings further corresponds to a particular hexadecimal color code.

Clause 31: The method of any one of Clauses 21 through 30, wherein a first color mapping of the one or more first color mappings and a second color mapping of the one or more second color mappings are associated with different edible ingredients.

Clause 32: The method of any one of Clauses 21 through 31, wherein the edible mixture comprises a base, a modifier, or a topping.

Clause 33: The method of any one of Clauses 21 through 32, wherein the edible mixture comprises a base, a modifier, or a topping, wherein the desired color comprises a desired base color, a desired modifier Clause 21: color, or a desired topping color.

Clause 34: The method of any one of Clauses 21 through 33, further comprising storing the three-dimensional color map in a local server or a remote server.

Clause 35: The method of any one of Clauses 21 through 34, wherein providing the indication of the particular color mapping comprises transmitting the indication of the particular color mapping to an automated ingredient dispenser, wherein the automated ingredient dispenser, in response to receiving the indication, dispenses the one or more edible ingredients to produce the edible mixture based on the particular ratio of the one or more edible ingredients.

Clause 36: The method of any one of Clauses 21 through 35, further comprising printing a label identifying the particular ratio of the one or more edible ingredients.

Clause 37: The method of any one of Clauses 21 through 36, wherein the one or more first color mappings and the one or more second color mappings are based on a base color of the edible mixture.

Clause 38: A dispensing system comprising:

a plurality of modular dispensers, each of the plurality of modular dispensers configured to store an ingredient;

a main controller, the main controller configured to:

obtain one or more first color mappings for a beverage component, each color mapping of the first color mappings identifying a particular color and identifying a ratio of one or more color ingredients used to create the particular color;

generate a three-dimensional color map for the beverage component based on the one or more first color mappings, the three-dimensional color map comprising a plurality of potential beverage component colors, the three-dimensional color map comprising the one or more first color mappings and one or more second color mappings, the one or more second color mappings identifying a plurality of colors not included within the one or more first color mappings;

identify a desired beverage component color;

obtain, from the three-dimensional color map, a particular color mapping for the desired beverage component color based on the plurality of potential beverage component colors; and communicate instructions to at least one of the plurality of modular dispensers, the instructions identifying a particular ratio of the one or more color ingredients corresponding to the particular color mapping to be dispensed from the at least one of the plurality of modular dispensers.

Clause 39: The dispensing system of Clause 38, wherein the one or more color ingredients comprise one or more edible color ingredients.

Clause 40: The dispensing system of Clause 38 or Clause 39, wherein the main controller is configured to obtain feedback identifying a beverage component color of the beverage component;

compare the beverage component color of the beverage component to the desired beverage component color; and adjust the three-dimensional color map based on comparing the beverage component color of the beverage component to the desired beverage component color.

Clause 41: The dispensing system of any one of Clauses 38 through 40, wherein a first color mapping of the one or more first color mappings and a second color mapping of the one or more second color mappings are associated with different color ingredients.

Clause 42: The dispensing system of any one of Clauses 38 through 41, wherein the one or more first color mappings and the one or more second color mappings are based on a base color of the beverage component.

What is claimed:

1. A system to customize beverage colors, the system comprising:

one or more processors; and a computer-readable storage medium including machine-readable instructions that, when executed by the one or more processors, cause the one or more processors to:

obtain one or more first color mappings for a beverage component with a predetermined color, each color mapping of the one or more first color mappings identifying a particular color and identifying a ratio of one or more color ingredients used to create the particular color from the predetermined color;

generate, from the one or more first color mappings, a three-dimensional color map particular to the beverage component with the predetermined color, the three-dimensional color map comprising a plurality of potential beverage component colors, the three-dimensional color map comprising the one or more first color mappings and one or more second color mappings based on the predetermined color, the one or more second color mappings identifying a plurality of colors not included within the one or more first color mappings, each color mapping of the one or more second color mappings identifying a particular color and identifying a particular ratio of one or more color ingredients used to create the particular color from the predetermined color;

provide, via a computing device, one or more color options for the beverage component based on the plurality of potential beverage component colors identified by the three-dimensional color map;

obtain, from the computing device, a selection of a desired beverage component color from the plurality of potential beverage component colors identified by the three-dimensional color map;

obtain, for the desired beverage component color, from the three-dimensional color map, a particular color mapping of the one or more first color mappings and the one or more second color mappings; and automatically generate and output an instruction set, the instruction set identifying a particular ratio of the one or more color ingredients corresponding to the particular color mapping for the beverage component.

2. The system of claim 1, wherein the one or more color ingredients comprise one or more edible color ingredients.

3. The system of claim 1, wherein to identify the desired beverage component color, execution of the machine-readable instructions causes the one or more processors to receive the desired beverage component color from a user computing device.

4. The system of claim 1, wherein execution of the machine-readable instructions further causes the one or more processors to:

for each beverage component of a plurality of beverage components, obtain one or more associated first color mappings; and generate an associated three-dimensional color map.

5. The system of claim 1, wherein execution of the machine-readable instructions further causes the one or more processors to:

obtain, for each beverage component of a plurality of beverage components, one or more associated first color mappings; and generate, for each beverage component of a plurality of beverage components, an associated three-dimensional color map;

wherein to identify the desired beverage component color, execution of the machine-readable instructions causes the one or more processors to identify a particular beverage component of the plurality of beverage components and the desired beverage component color of the particular beverage component, and wherein to obtain, from the three-dimensional color map, the particular color mapping for the desired beverage component color, the execution of the machine-readable instructions causes the one or more processors to identify the three-dimensional color map based on the particular beverage component.

6. The system of claim 1, wherein execution of the machine-readable instructions further causes the one or more processors to cause display of information identifying the plurality of potential beverage component colors on a user computing device.

7. The system of claim 1, wherein execution of the machine-readable instructions further causes the one or more processors to obtain feedback identifying a beverage color of the beverage component.

8. The system of claim 1, wherein execution of the machine-readable instructions further causes the one or more processors to:

obtain feedback identifying a beverage color of the beverage component;

compare the beverage color of the beverage component to the desired beverage color; and adjust the three-dimensional color map based on comparing the beverage component color of the beverage component to the desired beverage component color.

9. The system of claim 1, wherein each color mapping further corresponds to a particular hexadecimal color code.

10. The system of claim 1, wherein a first particular color mapping of the one or more first color mappings and the one or more second color mappings for the beverage component links a first ratio of the one or more color ingredients to a first color of the plurality of potential beverage component colors for the beverage component and a second particular color mapping of the one or more first color mappings and the one or more second color mappings for the beverage component links a second ratio of the one or more color ingredients to a second color of the plurality of potential beverage component colors for the beverage component.

11. The system of claim 1, wherein a first particular color mapping of the one or more first color mappings and the one or more second color mappings for the beverage component links a first ratio of a first color ingredient and a second color ingredient of the one or more color ingredients to a first color for the beverage component and a second particular color mapping of the one or more first color mappings and the one or more second color mappings for the beverage component links a second ratio of a third color ingredient and a fourth color ingredient of the one or more color ingredients to a second color for the beverage component.

12. The system of claim 1, wherein a first particular color mapping of the one or more first color mappings and the one or more second color mappings, and a second particular color mapping of the one or more first color mappings and the one or more second color mappings are associated with different color ingredients.

13. The system of claim 1, wherein the beverage component comprises a base, a modifier, or a topping.

14. The system of claim 1, wherein the beverage component comprises a base, a modifier, or a topping, wherein the desired beverage component color comprises a desired base color, a desired modifier color, or a desired topping color.

15. The system of claim 1, wherein execution of the machine-readable instructions further causes the one or more processors to store the three-dimensional color map in a local server or a remote server.

16. The system of claim 1, wherein execution of the machine-readable instructions further causes the one or more processors to store the three-dimensional color map in the computing device, wherein the computing device comprises a point of sale system, a store server, dispensing equipment, or a vending machine.

17. The system of claim 1, wherein to output the instruction set, execution of the machine-readable instructions causes the one or more processors to transmit the instruction set to an automated ingredient dispenser, wherein the automated ingredient dispenser, in response to receiving the instruction set, dispenses the one or more color ingredients to produce the beverage component based on the particular ratio of the one or more color ingredients.

18. The system of claim 1, wherein to output the instruction set, execution of the machine-readable instructions causes the one or more processors to print a label identifying the instruction set.

19. The system of claim 1, wherein the one or more first color mappings and the one or more second color mappings are based on a base color of the beverage component.

20. The system of claim 1, wherein execution of the machine-readable instructions further causes the one or more processors to determine a first particular color mapping and a second particular color mapping of the one or more first color mappings and the one or more second color mappings corresponding to the desired beverage component color, wherein to obtain the particular color mapping, execution of the machine-readable instructions causes the one or more processors to select the first particular color mapping or the second particular color mapping.

21. A computer-implemented method comprising:

obtaining, one or more first color mappings for a beverage component with a predetermined color, each color mapping of the one or more first color mappings identifying a particular color and identifying a ratio of one or more color ingredients used to create the particular color from the predetermined color;

generating, from the one or more first color mappings, a three-dimensional color map particular to the beverage component with the predetermined color, the three-dimensional color map comprising a plurality of potential beverage component colors, the three-dimensional color map comprising the one or more first color mappings and one or more second color mappings based on the predetermined color, the one or more second color mappings identifying a plurality of colors not included within the one or more first color mappings, each color mapping of the one or more second color mappings identifying a particular color and identifying a particular ratio of one or more color ingredients used to create the particular color from the predetermined color;

providing, via a computing device, one or more color options for the beverage component based on the plurality of potential beverage component colors identified by the three-dimensional color map;

obtaining, from the computing device, a selection of a desired beverage component color from the plurality of potential beverage component colors identified by the three-dimensional color map;

obtaining, for the desired beverage component color, from the three-dimensional color map, a particular color mapping of the one or more first color mappings and the one or more second color mappings; and automatically generating and outputting an instruction set, the instruction set identifying a particular ratio of the one or more color ingredients corresponding to the particular color mapping for the beverage component.

22. The method of claim 21, wherein the one or more color ingredients comprise one or more edible color ingredients.

23. The method of claim 21, wherein the computing device comprises a user computer device.

24. The method of claim 21, further comprising, for each beverage component of a plurality of beverage components:

obtaining one or more associated first color mappings; and generating an associated three-dimensional color map.

25. The method of claim 21, further comprising:

obtaining, for each beverage component of a plurality of beverage components, one or more associated first color mappings; and generating, for each beverage component of a plurality of beverage components, an associated three-dimensional color map;

wherein identifying the desired beverage component color comprises identifying a particular beverage component of the plurality of beverage components and the desired beverage component color of the particular beverage component, and wherein obtaining the particular color mapping for the desired beverage component color, comprises identifying the three-dimensional color map based on the particular beverage component.

26. The method of claim 21, further comprising causing display of information identifying the plurality of potential beverage component colors on a user computing device.

27. The method of claim 21, further comprising obtaining feedback identifying a color of the beverage component.

28. The method of claim 21, further comprising:

obtaining feedback identifying a color of the beverage component;

comparing the color of the beverage component to the desired beverage component beverage component color; and adjusting the three-dimensional color map based on comparing the color of the beverage component to the desired beverage component beverage component color.

29. The method of claim 21, wherein each color mapping further corresponds to a particular hexadecimal color code.

30. The method of claim 21, wherein a first particular color mapping of the one or more first color mappings and the one or more second color mappings, and a second particular color mapping of the one or more first color mappings and the one or more second color mappings are associated with different color ingredients.

31. The method of claim 21, wherein the beverage component comprises a base, a modifier, or a topping.

32. The method of claim 21, wherein the beverage component comprises a base, a modifier, or a topping, wherein the desired beverage component color comprises a desired base color, a desired modifier color, or a desired topping color.

33. The method of claim 21, further comprising storing the three-dimensional color map in a local server or a remote server.

34. The method of claim 21, outputting the instruction set comprises transmitting the instruction set to an automated ingredient dispenser, wherein the automated ingredient dispenser, in response to receiving the instruction set, dispenses the one or more color ingredients to produce the beverage component based on the particular ratio of the one or more color ingredients.

35. The method of claim 21, further comprising printing a label identifying the instruction set.

36. The method of claim 21, wherein the one or more first color mappings and the one or more second color mappings are based on a base color of the beverage component.

37. A dispensing system comprising:

a plurality of modular dispensers, each of the plurality of modular dispensers configured to store an ingredient;

a main controller, the main controller comprising one or more processors, and a computer-readable storage medium including machine-readable instructions that, when executed by the one or more processors, cause the one or more processors to:

obtain one or more first color mappings for a beverage component with a predetermined color, each color mapping of the one or more first color mappings identifying a particular color and identifying a ratio of one or more color ingredients used to create the particular color from the predetermined color;

generate, from the one or more first color mappings, a three-dimensional color map particular to the beverage component with the predetermined color, the three-dimensional color map comprising a plurality of potential beverage component colors, the three-dimensional color map comprising the one or more first color mappings and one or more second color mappings based on the predetermined color, the one or more second color mappings identifying a plurality of colors not included within the one or more first color mappings, each color mapping of the one or more second color mappings identifying a particular color and identifying a particular ratio of one or more color ingredients used to create the particular color from the predetermined color;

provide, via a computing device, one or more color options for the beverage component based on the plurality of potential beverage component colors identified by the three-dimensional color map;

identify, obtain, from the computing device, a selection of a desired beverage component color from the plurality of potential beverage component colors identified by the three-dimensional color map;

obtain, for the desired beverage component color, from the three-dimensional color map, a particular color mapping of the one or more first color mappings and the one or more second color mappings; and automatically generate and output an instruction set to at least one of the plurality of modular dispensers, the instruction set identifying a particular ratio of the one or more color ingredients corresponding to the particular color mapping for the beverage component to be dispensed from at least one of the plurality of modular dispensers for the beverage component.

38. The dispensing system of claim 37, wherein the one or more color ingredients comprise one or more edible color ingredients.

39. The dispensing system of claim 37, wherein execution of the machine-readable instructions further causes the one or more processors to:

obtain feedback identifying a beverage component color of the beverage component;

compare the beverage component color of the beverage component to the desired beverage component color, and adjust the three-dimensional color map based on comparing the beverage component color of the component beverage to the desired beverage component color.

40. The dispensing system of claim 37, wherein a first particular color mapping of the one or more first color mappings and the one or more second color mappings and a second particular color mapping of the one or more first color mappings and the one or more second color mappings are associated with different color ingredients.

41. The dispensing system of claim 37, wherein the one or more first color and the one or more second color mappings are based on a base color of the beverage component.

* * * * *